United States Patent
Vaisman et al.

(10) Patent No.: US 11,561,033 B1
(45) Date of Patent: Jan. 24, 2023

(54) THERMAL MANAGEMENT SYSTEMS

(71) Applicant: Booz Allen Hamilton Inc., McLean, VA (US)

(72) Inventors: Igor Vaisman, Carmel, IN (US); Joshua Peters, Knoxville, TN (US); Jacob Swain, East Leroy, MI (US)

(73) Assignee: Booz Allen Hamilton Inc., McLean, VA (US)

( * ) Notice: Subject to any disclaimer, the term of this patent is extended or adjusted under 35 U.S.C. 154(b) by 182 days.

(21) Appl. No.: 16/872,590

(22) Filed: May 12, 2020

Related U.S. Application Data

(60) Provisional application No. 62/862,749, filed on Jun. 18, 2019.

(51) Int. Cl.
*F25B 25/02* (2006.01)
*F25B 40/06* (2006.01)
(Continued)

(52) U.S. Cl.
CPC .......... *F25B 25/02* (2013.01); *B01D 17/0202* (2013.01); *F25B 9/08* (2013.01); *F25B 19/005* (2013.01); *F25B 39/04* (2013.01); *F25B 40/06* (2013.01); *F25B 39/026* (2013.01); *F25B 2341/0012* (2013.01)

(58) Field of Classification Search
CPC ...... B01D 17/0202; F25B 9/08; F25B 19/005; F25B 25/00; F25B 25/005; F25B 25/02; F25B 39/026; F25B 39/04; F25B 40/06; F25B 43/006; F25B 2341/00;
(Continued)

(56) References Cited

U.S. PATENT DOCUMENTS 2,885,864 A 5/1959 Benjamin
3,600,904 A 8/1971 Tilney
(Continued)

OTHER PUBLICATIONS

U.S. Appl. No. 16/448,196, filed Jun. 21, 2019, Vaisman et al.
(Continued)

*Primary Examiner* — Eric S Ruppert
*Assistant Examiner* — Hans R Weiland
(74) *Attorney, Agent, or Firm* — Fish & Richardson P.C.

(57) ABSTRACT

A thermal management system includes a refrigerant receiver having a refrigerant receiver outlet and a refrigerant receiver inlet, with the refrigerant receiver configured to store a refrigerant fluid, an ejector having a primary flow inlet coupled to receive the refrigerant fluid from the receiver, a secondary flow inlet and an outlet. The system also includes a liquid separator having an inlet, a vapor side outlet, and a liquid side outlet, an evaporator arrangement to extract heat from a heat load proximate or in contact with the evaporator arrangement, with the evaporator arrangement coupled to the ejector and the liquid separator, a closed-circuit refrigeration system having a closed-circuit fluid path including the refrigerant receiver, the evaporator arrangement, and the liquid separator, the closed-circuit refrigeration system configured to receive refrigerant fluid from the refrigerant receiver, and an open-circuit refrigeration system having an open-circuit fluid path that includes the receiver, the evaporator arrangement, and the liquid separator, that is configured to receive refrigerant fluid from the refrigerant receiver.

40 Claims, 23 Drawing Sheets

(51) Int. Cl.
  *B01D 17/02* (2006.01)
  *F25B 39/04* (2006.01)
  *F25B 19/00* (2006.01)
  *F25B 9/08* (2006.01)
  *F25B 39/02* (2006.01)

(58) Field of Classification Search
  CPC ........ F25B 2341/001; F25B 2341/0011; F25B 2341/0012; F25B 2400/23
  See application file for complete search history.

(56) References Cited

U.S. PATENT DOCUMENTS

| | | | |
|---|---|---|---|
| 3,685,310 A | 8/1972 | Bitter et al. | |
| 4,123,919 A | 11/1978 | Fehlhaber | |
| 4,466,253 A | 8/1984 | Jaster | |
| 4,539,816 A | 9/1985 | Fox | |
| 5,088,304 A | 2/1992 | Schlichtig | |
| 5,187,953 A | 2/1993 | Mount | |
| 5,191,776 A | 3/1993 | Severance et al. | |
| 6,112,532 A * | 9/2000 | Bakken | F25B 9/008 62/149 |
| 6,331,281 B1 | 12/2001 | Teru et al. | |
| 6,564,578 B1 | 5/2003 | Fischer-Calderon | |
| 8,020,407 B2 | 9/2011 | Viegas | |
| 10,126,022 B1 | 11/2018 | Cooper | |
| 10,907,869 B2 | 2/2021 | Hagh et al. | |
| 11,231,209 B2 | 1/2022 | Cavalieri et al. | |
| 2004/0123624 A1* | 7/2004 | Ohta | F25B 41/00 62/500 |
| 2006/0254308 A1* | 11/2006 | Yokoyama | F25D 21/08 62/500 |
| 2007/0000262 A1* | 1/2007 | Ikegami | F25B 41/00 62/170 |
| 2007/0039349 A1* | 2/2007 | Yamada | F25B 41/00 62/500 |
| 2007/0180852 A1* | 8/2007 | Sugiura | F25B 41/00 62/170 |
| 2008/0087040 A1* | 4/2008 | Oshitani | F25B 41/00 62/500 |
| 2008/0196446 A1* | 8/2008 | Nakamura | F25B 5/04 62/498 |
| 2009/0158727 A1 | 6/2009 | Marsala | |
| 2009/0266100 A1 | 10/2009 | Viegas | |
| 2013/0111934 A1* | 5/2013 | Wang | F25B 43/00 62/115 |
| 2016/0200175 A1* | 7/2016 | Nakajima | F25B 43/00 62/500 |
| 2017/0167767 A1* | 6/2017 | Shi | F25B 9/08 |
| 2018/0023805 A1 | 1/2018 | Qin et al. | |
| 2019/0393525 A1 | 12/2019 | Diethelm et al. | |

OTHER PUBLICATIONS

U.S. Appl. No. 16/448,271, filed Jun. 21, 2019, Vaisman et al.
U.S. Appl. No. 16/448,283, filed Jun. 21, 2019, Vaistman et al.
U.S. Appl. No. 16/448,332, filed Jun. 21, 2019, Vaisman et al.
U.S. Appl. No. 16/448,388, filed Jun. 21, 2019, Vaisman et al.
U.S. Appl. No. 16/666,851, filed Oct. 29, 2019, Davis et al.
U.S. Appl. No. 16/666,859, filed Oct. 29, 2019, Davis et al.
U.S. Appl. No. 16/666,865, filed Oct. 29, 2019, Davis et al.
U.S. Appl. No. 16/666,881, filed Oct. 29, 2019, Davis et al.
U.S. Appl. No. 16/666,899, filed Oct. 29, 2019, Davis et al.
U.S. Appl. No. 16/666,940, filed Oct. 29, 2019, Vaisman et al.
U.S. Appl. No. 16/666,950, filed Oct. 29, 2019, Vaisman et al.
U.S. Appl. No. 16/666,954, filed Oct. 29, 2019, Vaisman et al.
U.S. Appl. No. 16/666,959, filed Oct. 29, 2019, Vaisman et al.
U.S. Appl. No. 16/666,962, filed Oct. 29, 2019, Vaisman et al.
U.S. Appl. No. 16/666,966, filed Oct. 29, 2019, Vaisman et al.
U.S. Appl. No. 16/666,973, filed Oct. 29, 2019, Vaisman et al.
U.S. Appl. No. 16/666,977, filed Oct. 29, 2019, Vaisman et al.
U.S. Appl. No. 16/666,986, filed Oct. 29, 2019, Vaisman et al.
U.S. Appl. No. 16/666,992, filed Oct. 29, 2019, Vaisman et al.
U.S. Appl. No. 16/666,995, filed Oct. 29, 2019, Vaisman et al.
U.S. Appl. No. 16/684,775, filed Nov. 15, 2019, Peters et al.
U.S. Appl. No. 16/807,340, filed Mar. 3, 2020, Vaisman.
U.S. Appl. No. 16/807,353, filed Mar. 3, 2020, Vaisman.
U.S. Appl. No. 16/807,411, filed Mar. 3, 2020, Vaisman.
U.S. Appl. No. 16/807,413, filed Mar. 3, 2020, Vaisman.
U.S. Appl. No. 16/807,582, filed Mar. 3, 2020, Vaisman.
U.S. Appl. No. 16/872,584, filed May 12, 2020, Vaisman et al.
U.S. Appl. No. 16/872,592, filed May 12, 2020, Vaisman et al.
NASA History Office, "Quest for Performance: The Evolution of Modern Aircraft, Part II: The Jet Age, Chapter 10: Technology of the Jet Airplane, Turbojet and Turbofan Systems," NASA Scientific and Technical Information Branch, originally published in 1985, last updated Aug. 6, 2004, 21 pages.
Wojtan et al., "Investigation of flow boiling in horizontal tubes: Part I—A new diabatic two-phase flow pattern map. International journal of heat and mass transfer," Jul. 2005, 48(14):2955-69.
Wojtan et al., "Investigation of flow boiling in horizontal tubes: Part II—Development of a new heat transfer model for stratified-wavy, dryout and mist flow regimes," International journal of heat and mass transfer, Jul. 2005, 48(14):2970-85.

* cited by examiner

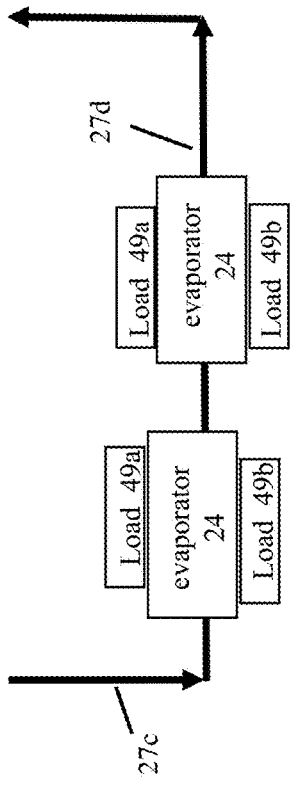
FIG. 1A
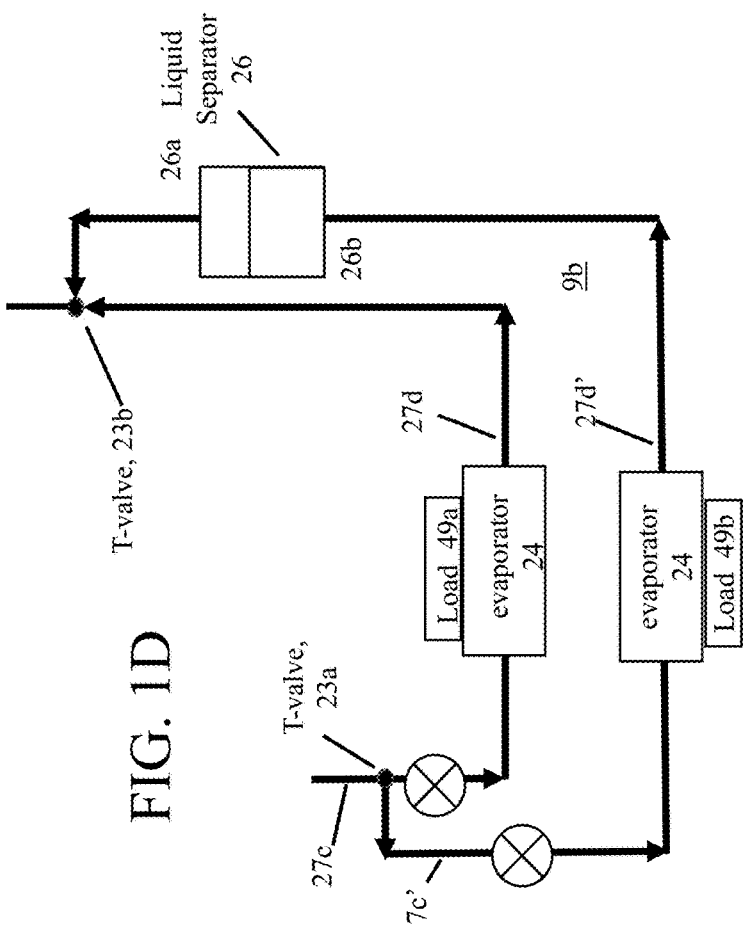
FIG. 1B
FIG. 1D
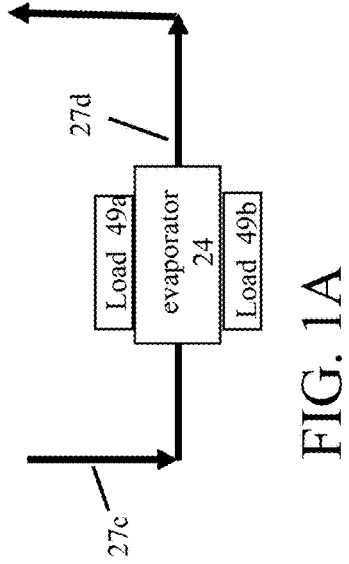
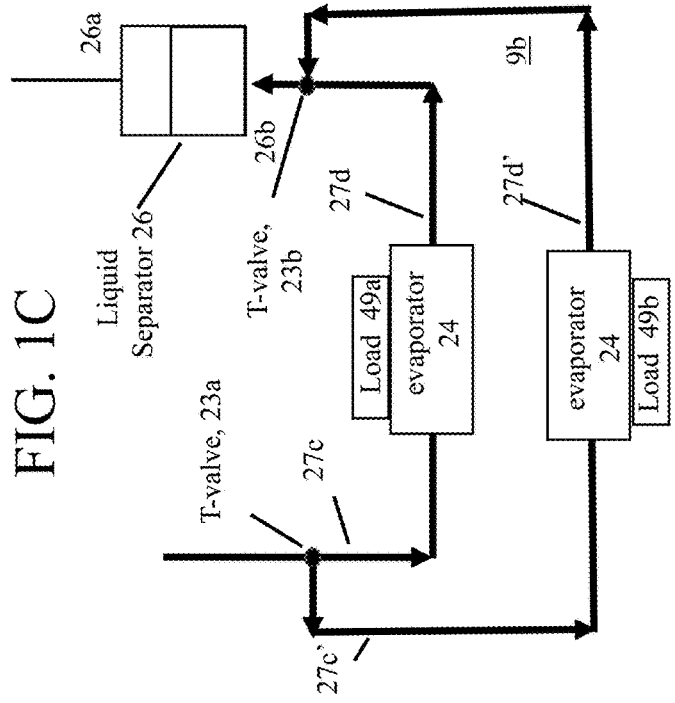
FIG. 1C

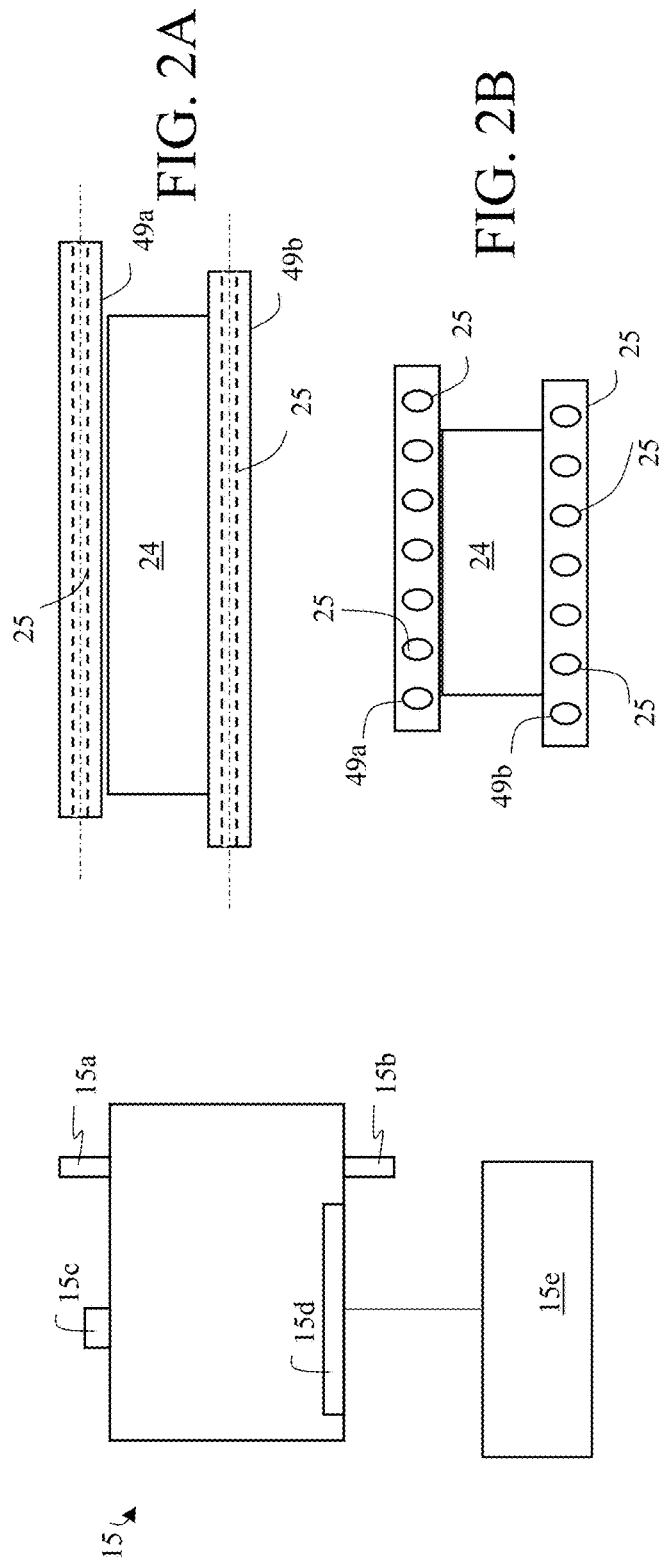

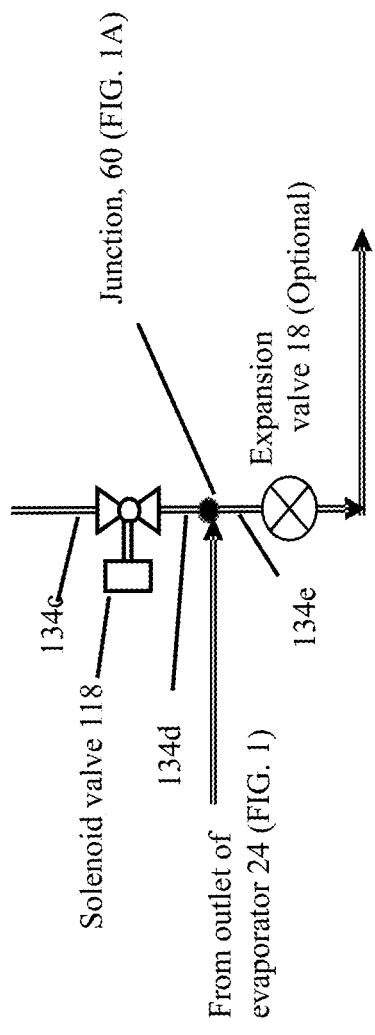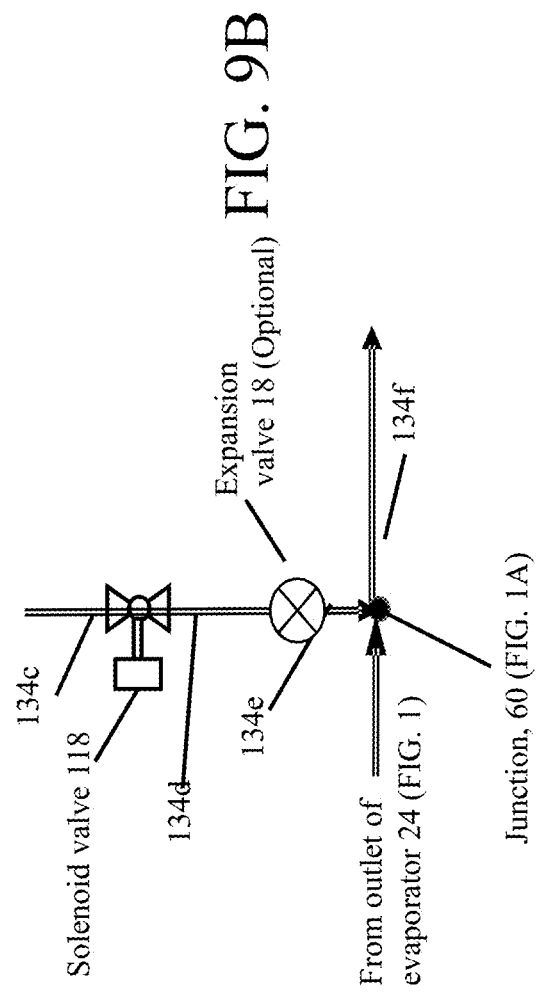

THERMAL MANAGEMENT SYSTEMS

CLAIM OF PRIORITY

This application claims priority under 35 USC § 119(e) to U.S. Provisional Patent Application Ser. No. 62/862,749, filed on Jun. 18, 2019, and entitled "Thermal Management Systems," the entire contents of which are hereby incorporated by reference.

BACKGROUND

This disclosure relates to refrigeration.

Refrigeration systems absorb thermal energy from the heat sources operating at temperatures below the temperature of the surrounding environment, and discharge thermal energy into the surrounding environment.

Conventional refrigeration systems can include a compressor, a heat rejection exchanger (i.e., a condenser), a liquid refrigerant receiver, an expansion device, and a heat absorption exchanger (i.e., an evaporator). Such systems can be used to maintain operating temperature set points for a wide variety of cooled heat sources (loads, processes, equipment, systems) thermally interacting with the evaporator. Closed-circuit refrigeration systems may pump significant amounts of absorbed thermal energy from heat sources into the surrounding environment. In closed circuit systems compressors are used to compress vapor from the evaporation and condensers are used to condense the vapor to cool the vapor into a liquid. The combination of condensers and compressors can add significant amount of weight and can consume relatively large amounts of electrical power. In general, the larger the amount of absorbed thermal energy that the system is designed to handle, the heavier the refrigeration system and the larger the amount of power consumed during operation, even when cooling of a heat source occurs over relatively short time periods.

SUMMARY

According to an aspect a thermal management system includes a refrigerant receiver having a refrigerant receiver outlet and a refrigerant receiver inlet, with the refrigerant receiver configured to store a refrigerant fluid, an ejector having a primary flow inlet coupled to the refrigerant receiver outlet, the ejector configured to receive the refrigerant fluid, and with the ejector further having a secondary flow inlet and an outlet, a liquid separator having an inlet, a vapor side outlet, and a liquid side outlet, an evaporator arrangement configured to extract heat from a heat load that is proximate or in contact with the evaporator arrangement, with the evaporator arrangement coupled to the ejector and the liquid separator, a closed-circuit refrigeration system having a closed-circuit fluid path including the refrigerant receiver, the evaporator arrangement, and the liquid separator, the closed-circuit refrigeration system configured to receive refrigerant fluid from the refrigerant receiver, and an open-circuit refrigeration system having an open-circuit fluid path that includes the receiver, the evaporator arrangement, and the liquid separator, with the open-circuit refrigeration system configured to receive refrigerant fluid from the refrigerant receiver.

Embodiments of the thermal management systems may include any one or more of the following features or other features disclosed herein.

The open-circuit refrigeration system further includes a back-pressure regulator having an inlet coupled to the vapor side outlet of the liquid separator and an exhaust line coupled to the back-pressure regulator, with refrigerant vapor from the exhaust line not returning to the refrigerant receiver. The evaporator arrangement is coupled between the secondary flow inlet of the ejector and the liquid side outlet of the liquid separator. The evaporator arrangement is coupled between the outlet of the ejector and the inlet of the liquid separator. The evaporator arrangement has a first evaporator, with the first evaporator coupled between the secondary flow inlet of the ejector and the liquid side outlet of the liquid separator, and the system further includes a second evaporator coupled between the outlet of the ejector and the inlet of the liquid separator. The evaporator arrangement is coupled downstream from and upstream of the ejector.

The system further includes a control device configurable to measure a superheat condition at an outlet of the first evaporator. The system further includes an expansion valve device having an expansion valve device inlet coupled to the liquid side outlet of the liquid separator and an expansion device outlet, with the expansion valve device configured to control a flow of refrigerant liquid from the liquid side outlet to regulate a superheat at an outlet of the first evaporator, a junction device having a first port coupled to the expansion valve device outlet, a second port coupled to an inlet of the first evaporator, and a third port, and a third evaporator having an inlet and an outlet, with the inlet coupled to the third port of the junction device.

The expansion valve device is a first expansion valve device, the system further includes a second expansion valve device coupled between the third port of the junction device and the inlet of the third evaporator. The system further includes a sensor device that senses temperature to provide a measure of a superheat at the outlet of the third evaporator to control the second expansion valve device to regulate superheat at the outlet of the third evaporator.

The system further includes an expansion valve device configured to control a flow of the refrigerant liquid from the refrigerant receiver through the primary flow inlet of the ejector. The expansion valve device controls vapor quality of the refrigerant fluid emerging from the evaporator arrangement by regulating mass flow rate of the refrigerant fluid through the expansion valve device.

The system further includes a first heat load coupled to or proximate to the evaporator arrangement from which heat is removed by the closed-circuit refrigerant system, and a second heat load coupled to or proximate to the evaporator arrangement from which heat is removed by the open-circuit refrigerant system. The second heat load is a high heat load, relative to the first heat load, which high heat load has one or more characteristics of being a high heat flux load or a highly temperature sensitive load or is operative for short periods of time, relative to one or more corresponding characteristics of the first heat load.

The refrigerant is ammonia. The open-circuit refrigeration system is configured to operate with a controlled vapor quality at an outlet of the evaporator arrangement, where vapor quality is a ratio of mass of vapor to mass of liquid plus mass of vapor. The vapor quality is in a range of 0.5 to 1.0. The vapor quality is substantially 1.0.

The system further includes a back-pressure regulator, and a controller device that receives sensor signals from the thermal management system and is configured to generate control signals to control one or more of the back-pressure regulator and the expansion valve device.

The closed-circuit refrigeration system further includes a compressor having an inlet and an outlet, the inlet coupled to the vapor side outlet of the liquid separator, and a condenser coupled to the outlet of the compressor, with refrigerant from the condenser returning to the refrigerant receiver.

According to an additional aspect, a thermal management method includes transporting a refrigerant fluid from a refrigerant receiver that stores refrigerant fluid, through a closed-circuit refrigeration system having a closed-circuit fluid path with the refrigerant receiver, through an ejector, and a liquid separator that are disposed in the closed fluid circuit path, and upon receiving a control signal, transporting the refrigerant fluid from the refrigerant receiver through an open-circuit refrigeration system that has an open-circuit fluid path with the refrigerant receiver, the ejector, the evaporator arrangement, and the liquid separator to an exhaust line, extracting heat from a heat load contacting an evaporator arrangement, with the heat being transferred to the refrigerant fluid converting at least a portion of the refrigerant fluid to a refrigerant vapor, and discharging a portion of the refrigerant vapor from the exhaust line so that the discharged refrigerant vapor is not returned to the closed-circuit fluid path.

Embodiments of the thermal management systems may include any one or more of the following features or other features disclosed herein.

The thermal management method further includes transporting a primary flow of the refrigerant fluid along the refrigerant fluid flow path that extends from the refrigerant receiver through a primary inlet of the ejector, and transporting a secondary flow of the refrigerant fluid into a secondary inlet of the ejector within which the primary flow and secondary flow are mixed to provide a mixed flow.

The thermal management method further includes transporting the mixed flow towards the liquid separator. Transporting the mixed flow further includes transporting the mixed flow towards the liquid separator through the evaporator arrangement. Transporting refrigerant liquid received by the evaporator arrangement from a liquid side outlet of the liquid separator to the secondary inlet of the ejector. The evaporator arrangement is a first evaporator arrangement, the method further including transporting refrigerant liquid received by a second evaporator arrangement at the liquid side outlet of the liquid separator to the secondary inlet of the ejector.

The closed-circuit refrigeration system is configured to cool a first heat load and the open-circuit refrigeration system is configured to cool a second heat load on demand. The first heat load is a low heat flux load and the second heat load is a high flux heat load relative to the first heat flux load. The method further includes receiving a control signal by a back-pressure regulator that is coupled to the exhaust line. The refrigerant is ammonia.

The above aspect or another of the disclosed aspects may include one or more of the following advantages.

The aspects enable cooling of large loads and high heat flux loads that are also highly temperature sensitive that overcome more conventional closed-cycle refrigeration systems. Such cooling of large and high heat flux loads typically involves circulating refrigerant fluid at a relatively high mass flow rate. The closed-cycle system components required by such systems include relatively large and heavy compressors to compress vapor at a low pressure to vapor at a high pressure and relatively large and heavy condensers to remove heat from the compressed vapor. In addition to being large and heavy these components typically consume significant amounts of electrical power.

As a result, many closed-cycle systems are not well suited for deployment in mobile platforms—such as on small vehicles or in space—where size and weight constraints may make the use of large compressors and condensers impractical. Some examples of temperature sensitive loads such as electronic components and devices may require temperature regulation within a relatively narrow range of operating temperatures.

The thermal management system described herein is an open-circuit refrigeration system that is integrated with a closed-circuit refrigeration system, the presence of the open-circuit refrigeration system allows the thermal management system to maintain a temperature of a load within a relatively small tolerance of a temperature set point. Directed energy systems that are mounted to mobile vehicles, such as trucks, or that exist in space may be ideal candidates for cooling by the thermal management system presented, as such systems may include high heat flux, and temperature sensitive components that require precise cooling during operation in a relatively short time. The thermal management systems disclosed herein, while generally applicable to the cooling of a wide variety of thermal loads, are particularly well suited for operation with such directed energy systems.

The disclosed thermal management system (TMS) may be specified to cool two different kinds of heat loads—high heat loads (high heat flux, highly temperature sensitive components) operative for short periods of time and low heat loads (relative to the high heat loads) operative continuously or for relatively long periods (relative to the high heat loads). The TMS avoids the need for a relatively large and heavy refrigeration system with a concomitant need for a large and heavy power system to sustain operation of the refrigeration system).

The details of one or more embodiments are set forth in the accompanying drawings and the description below. Other features and advantages will be apparent from the description, drawings, and claims.

DESCRIPTION OF DRAWINGS

FIGS. 1A-1D are schematic diagrams showing alternative configurations for arrangement of evaporators/loads on the integrated open-circuit/closed-circuit refrigeration system, generally applicable to described embodiments.

FIGS. 2A and 2B are schematic diagrams showing side and end views, respectively, of an example of the thermal load that includes refrigerant fluid channels.

FIG. 2C is a diagram of a junction device.

FIG. 3 is a schematic diagram of an example of a receiver for refrigerant fluid in the thermal management system.

FIG. 4 is diagrammatical views of a three-port liquid separator.

FIGS. 9A-9B are schematics of arrangements of a junction in the thermal management system configurations of FIGS. 8A-8E.

DETAILED DESCRIPTION

I. General Introduction

Figure 1:
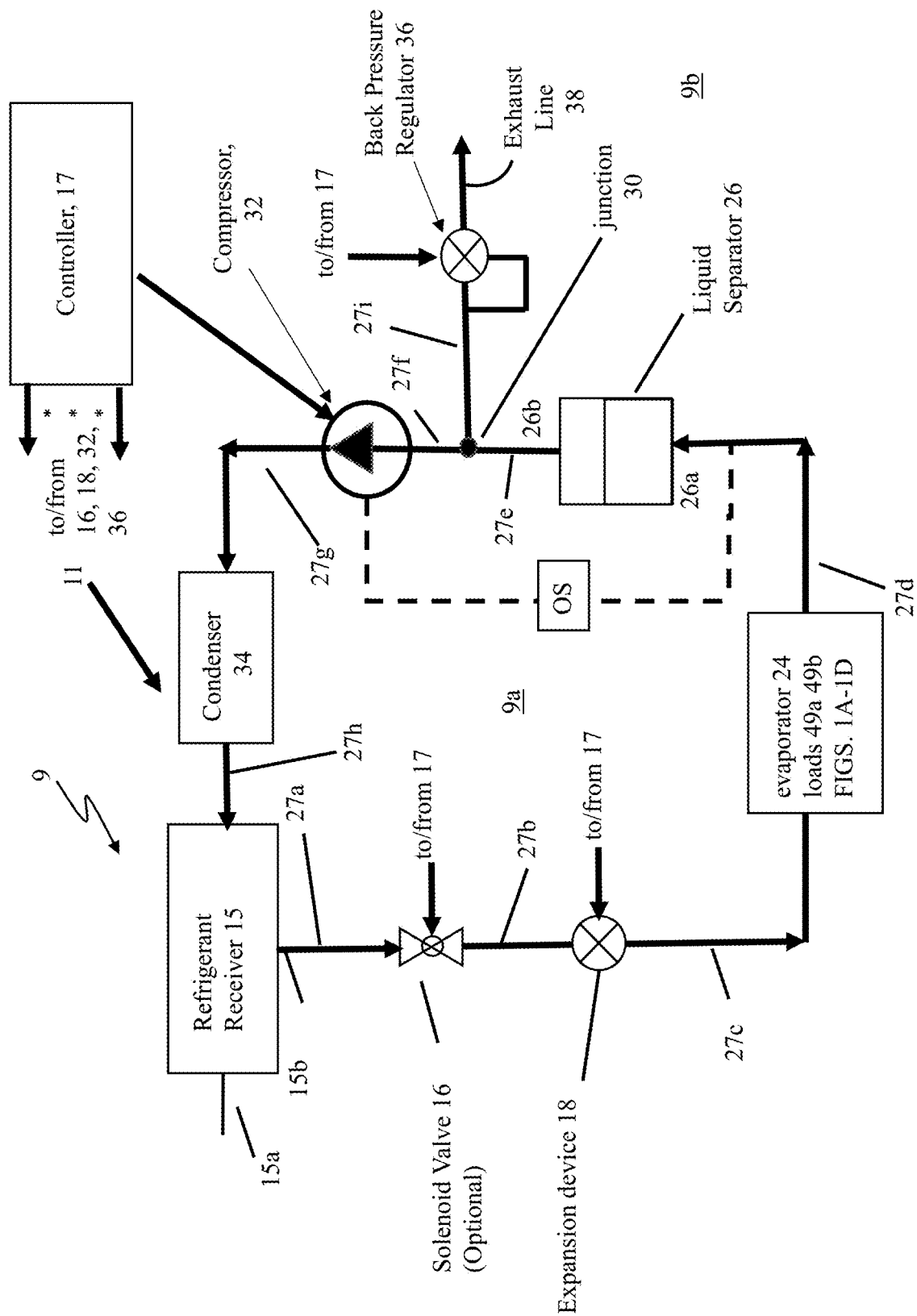
FIG. 1 is a schematic diagram of an example of a thermal management system that includes an integrated open-circuit/closed-circuit refrigeration system.

Cooling of large loads and high heat flux loads that are also highly temperature sensitive can present a number of challenges. On one hand, such loads generate significant quantities of heat that is extracted during cooling. In conventional closed-cycle refrigeration systems, cooling high heat flux loads typically involves circulating refrigerant fluid at a relatively high mass flow rate. However, closed-cycle system components that are used for refrigerant fluid circulation—including large compressors to compress vapor at a low pressure to vapor at a high pressure and condensers to remove heat from the compressed vapor at the high pressure and convert to a liquid—are typically heavy and consume significant power. As a result, many closed-cycle systems are not well suited for deployment in mobile platforms—such as on small vehicles or in space—where size and weight constraints may make the use of large compressors and condensers impractical.

On the other hand, temperature sensitive loads such as electronic components and devices may require temperature regulation within a relatively narrow range of operating temperatures. Maintaining the temperature of such a load to within a small tolerance of a temperature set point can be challenging when a single-phase refrigerant fluid is used for heat extraction, since the refrigerant fluid itself will increase in temperature as heat is absorbed from the load.

Directed energy systems that are mounted to mobile vehicles, such as trucks, or that exist in space may present many of the foregoing operating challenges, as such systems may include high heat flux and temperature sensitive components that require precise cooling during operation in a relatively short time. The thermal management systems disclosed herein, while generally applicable to the cooling of a wide variety of thermal loads, are particularly well suited for operation with such directed energy systems.

In some cases, a thermal management system (TMS) may be specified to cool two different kinds of heat loads—high heat loads (high heat flux, highly temperature sensitive components) operative for short periods of time and low heat loads (relative to the high heat loads) operative continuously or for relatively long periods (relative to the high heat loads). However, to specify a refrigeration system for the high thermal load may result in a relatively large and heavy refrigeration system with a concomitant need for a large and heavy power system to sustain operation of the refrigeration system.

Such systems may not be acceptable for mobile applications. Also, start-up and/or transient processes may exceed the short period in which cooling duty is applied for the high heat loads that are operative for short periods of time. Transient operation of such systems cannot provide precise temperature control. Therefore, thermal energy storage (TES) units are integrated with small refrigeration systems and recharging of such TES units are used instead. Still TES units may be too heavy and too large for mobile applications. In addition, such systems are complex devices and reliability may present problems especially for critical applications.

In particular, the thermal management systems and methods disclosed herein include a number of features that reduce both overall size and weight relative to conventional refrigeration systems, and still extract excess heat energy from both high heat flux, highly temperature sensitive components and relatively temperature insensitive components, to accurately match temperature set points for the components.

At the same time, the disclosed thermal management systems that use the compressor would in general require less power than conventional closed circuitry systems for a given amount of refrigeration over a specified period(s) of operation. Whereas certain conventional refrigeration systems used closed-circuit refrigerant flow paths, the systems and methods disclosed herein use modified closed-circuit refrigerant flow paths in combination with open-cycle refrigerant flow paths to handle a variety of heat loads. Depending upon the nature of the refrigerant fluid, exhaust refrigerant fluid may be incinerated as fuel, chemically treated, and/or simply discharged at the end of the flow path.

II. Thermal Management Systems with Closed Circuit Refrigeration Systems Integrated with Open Circuit Refrigeration Systems Referring to FIG. 1, an example of a thermal management system (TMS) 9 that includes an Open-Circuit Refrigeration System integrated with a Closed-Circuit System (OCRSC-CRS) 11 is shown. TMS 9 provides closed-circuit refrigeration for low heat loads over long time intervals and open-circuit refrigeration for refrigeration of high heat loads over short time intervals (relative to the interval of refrigeration of low heat load). More specifically, the OCRSCCRS 11 includes an Open-Circuit Refrigeration System portion (OCRS) 9a and a Closed-Circuit Refrigeration System (CCRS) portion 9b.

The CCRS portion 9b includes a receiver 15 that includes an inlet port 15a and an outlet port 15b (see FIG. 3 for further details), an optional solenoid valve 16, a control device 18 (i.e., an expansion valve device), an evaporator arrangement 24 (evaporator 24) with detailed examples shown in FIGS. 1A-1D, a liquid separator 26 having an inlet port 26a and a vapor side outlet port 26b, a junction device 30, a compressor 32, and a condenser 34, all of which are coupled via conduits 27a-27h. The solenoid valve 16 can be used when the control device 18 is not configured to completely stop refrigerant flow when the TMS 9 is in an off state.

In some implementations of the CCRS portion 9b, an oil is used for lubrication of the compressor 32 and the oil travels with the refrigerant in the closed-circuit portion of the OCRSCCRS 11. The oil is removed from the refrigerant to be recirculated back to the compressor 32. The oil can be removed from the inlet 26a of the liquid separator 26, within the liquid separator 26 or elsewhere within the system 11. The system 9 has a mechanism to return oil from the liquid separator 26, particularly, from the bottom of the liquid separator 26 to the compressor 32. In addition, the CCRS portion 9b may include an oil separator. As shown in FIG. 1, an oil separator (denoted as OS) is disposed in an oil return path (denoted by phantom e.g., dashed lines). The oil return path also includes conduit (not referenced).

The OCRS portion 9b includes components of the CCRS 9a, including the receiver 15, the optional solenoid valve 16, the optional control device 18 (i.e., expansion valve device), the evaporator 24, the liquid separator 26, and the junction device 30 coupled via conduits 27a-27e. The OCRS portion 9b also includes a conduit 27i that is coupled to the junction device 30 and a back-pressure regulator 36 that is coupled to an exhaust line 38.

TMS 9 includes the OCRSCCRS 11 and heat loads 49a, 49b (shown with the evaporator 24). The heat load 49a is a low heat load 49a that operates over long (or continuous) time intervals and is cooled by the CCRS 9a, whereas the heat load 49b is a high heat load 49b that operates short time intervals of time relative to the operating interval of the low heat load 49a.

FIGS. 1A-1D (discussed below) illustrate specific configurations for the evaporator arrangement 24 (also referred to herein as evaporator 24) and heat loads 49a, 49b. Each of these specific configurations are generally applicable to the various as embodiments discussed herein. As will be used herein evaporator arrangement includes any of the specific configurations mentioned. In addition, when used herein "evaporator" can referred to an evaporator arrangement as well unless otherwise specifically noted.

A. Closed-Circuit Refrigeration Operation

When the low heat load 49a is applied, the TMS 9 is configured to have the CCRS 9a provide refrigeration to the low heat load 49a. In this instance, a controller 17 produces signals to cause the back-pressure regulator 36 to be placed in an OFF state (i.e., closed). With the back pressure regulator 38 closed, the CCRS 9a provides cooling duty to handle the low load.

In the closed-circuit refrigeration configuration, circulating refrigerant enters the compressor 32 as a saturated or superheated vapor and is compressed to a higher pressure at a higher temperature (a superheated vapor). This superheated vapor is at a temperature and pressure at which it can be condensed in the condenser 34 by either cooling water or cooling air flowing across a coil or tubes in the condenser 34. At the condenser 34, the circulating refrigerant loses heat and thus removes heat from the system, which removed heat is carried away by either the water or air (whichever may be the case) flowing over the coil or tubes, providing a condensed liquid refrigerant.

The condensed and sub-cooled liquid refrigerant is routed into the refrigerant receiver 15, exits the refrigerant receiver 15, and enters the control device, e.g., the expansion valve 18 (through the optional solenoid valve 16, if used.) The refrigerant is enthalpically expanded in the control device 18 and the high pressure sub-cooled liquid refrigerant turns into liquid-vapor mixture at a low pressure and temperature. The temperature of the liquid and vapor refrigerant mixture (evaporating temperature) is lower than the temperature of the low heat load 49a. The mixture is routed through a coil or tubes in the evaporator arrangement, i.e., "evaporator 24."

The heat from the heat load 49a, in contact with or proximate to the evaporator 24, partially or completely evaporates the liquid portion of the two-phase refrigerant mixture, and may superheat the mixture. The refrigerant leaves the evaporator 24 and enters the liquid separator 26. The saturated or superheated vapor exits the liquid separator 26 and enters the compressor 32. The evaporator 24 is where the circulating refrigerant absorbs and removes heat from the applied low heat load 49a, which heat is subsequently rejected in the condenser 34 and transferred to an ambient by water or air used in the condenser 34. To complete the refrigeration cycle, the refrigerant vapor from the evaporator 24 is stored in the liquid separator 26 and again a saturated vapor portion of the refrigerant in the liquid separator 26 is routed back into the compressor 32.

B. Open/Closed Circuit Refrigeration Operation

On the other hand, when a high heat load 49b is applied, a mechanism such as the controller 17 causes the OCRSC-CRS 11 to operate in both a closed and open cycle configuration.

The closed-circuit portion is similar to that described above, except that the evaporator 24 in this case may operate within a threshold of a vapor quality, (e.g., the evaporator may operate with a superheat provided that the liquid separator captures incidental non-evaporated liquid), the liquid separator 26 receives two-phase mixture, and the compressor 32 receives saturated vapor from the liquid separator 26. When the OCRSCCRS 11 operates with the open cycle, this causes the controller 17 to be configured to cause the back-pressure regulator 36 to be placed in an ON position, thus opening the back-pressure regulator 36 to permit the back-pressure regulator 36 to exhaust vapor through the exhaust line 38. The back-pressure regulator 36 maintains a back pressure at an inlet to the back-pressure regulator 36, according to a set point pressure, while allowing the back-pressure regulator 36 to exhaust refrigerant vapor through the exhaust line 38.

The OCRS 9b operates like a thermal energy storage (TES) system, increasing cooling capacity of the TMS 9 when a pulsing heat load is activated, but without a duty cycle cooling penalty commonly encountered with TES systems. The cooling duty is executed without the concomitant penalty of conventional TES systems provided that the receiver 15 has enough refrigerant charge and the refrigerant flow rate flowing through the evaporator 24 matches the rate needed by the high load 49b. The back-pressure regulator 36 exhausts the refrigerant vapor less the refrigerant vapor recirculated by the compressor 32. The rate of exhaust of the refrigerant vapor through the exhaust line 38 is governed by the set point pressure used at the input to the back-pressure regulator 36.

When the high load 49b is no longer in use or its temperature is reduced, this occurrence is sensed by a sensor (not shown) and a signal from the sensor (or otherwise, such as communicated directly by the high heat load 49b) is sent to the controller 17. The controller 17 is configured to partially or completely close the back-pressure regulator 36 by changing the set point pressure (or otherwise), partially or totally closing the exhaust line 38 to reduce or cut off exhaust refrigerant flow through the exhaust line 38. When the high heat load 49b reaches a desired temperature or is no longer being used, the back-pressure regulator 36 is placed in the OFF status and is thus closed, and CCRS 9a continues to operate as needed.

The provision of the CCRS 9a helps to reduce amount of exhausted refrigerant. Generally, the TMS 9 uses the compressor 32 to save ammonia, and in general it may not be desirable to shut the compressor 32 off. For instance, the compressor 32 can help to keep a high pressure in the refrigerant receiver 15 if a head pressure control valve is applied.

On the other hand, in some embodiments, the OCRSC-CRS 11 could be configured to operate in modes where the compressor 32 is turned off and the OCRSCCRS 11 operates in open-circuit mode only (such as in fault conditions in the circuit or cooling requirements).

The OCRSCCRS 11 would generally also include the controller 17 (see FIG. 13 for an exemplary embodiment) that produces control signals (based on sensed thermodynamic properties) to control operation of the various ones of devices 16, 18, etc., as needed, as well as the compressor 32 and back-pressure regulator 36. Controller 17 may receive signals, process received signals and send signals (as appropriate) from/to the expansion valve device 18, the optional solenoid valve 16, and a motor of the compressor 32 changing its speed, shutting compressor 32 off or starting it, etc.

As used herein the compressor 32 is, in general, a device that increases the pressure of a gas by reducing the gas' volume. Usually, the term compressor refers to devices operating at and above ambient pressure, (some refrigerant compressors may operate inducing refrigerant at pressures below ambient pressure, e.g., desalination vapor compression systems employ compressors with suction and discharge pressures below ambient pressure).

In general, the solenoid control valve 16 includes a solenoid that uses an electric current to generate a magnetic field to control a mechanism that regulates an opening in a valve to control fluid flow. The control device 16 is configurable to stop refrigerant flow as an on/off valve, if the expansion valve cannot shut off fluid flow robustly.

Expansion valve device 18 functions as a flow control device and in particular as an refrigerant expansion valve device. In general, expansion valve device 18 can be implemented as any one or more of a variety of different mechanical and/or electronic devices. For example, in some embodiments, expansion valve device 18 can be implemented as a fixed orifice, a capillary tube, and/or a mechanical or electronic expansion valve. In general, fixed orifices and capillary tubes are passive flow restriction elements which do not actively regulate refrigerant fluid flow.

Mechanical expansion valves (usually called thermostatic or thermal expansion valves) are typically flow control devices that enthalpically expand a refrigerant fluid from a first pressure to an evaporating pressure, controlling the superheat at the evaporator exit. Mechanical expansion valves generally include an orifice, a moving seat that changes the cross-sectional area of the orifice and the refrigerant fluid volume and mass flow rates, a diaphragm moving the seat, and a bulb at the evaporator exit. The bulb is charged with a fluid and it hermetically fluidly communicates with a chamber above the diaphragm. The bulb senses the refrigerant fluid temperature at the evaporator exit (or another location) and the pressure of the fluid inside the bulb transfers the pressure in the bulb through the chamber to the diaphragm and moves the diaphragm and the seat to close or to open the orifice.

Typical electrically controlled expansion valves include an orifice, a moving seat, a motor or actuator that changes the position of the seat with respect to the orifice, a controller, and pressure and temperature sensors at the evaporator exit.

Examples of suitable commercially available expansion valves that can function as expansion valve device 18 include, but are not limited to, thermostatic expansion valves available from the Sporlan Division of Parker Hannifin Corporation (Washington, Mo.) and from Danfoss (Syddanmark, Denmark).

The controller 17 calculates the superheat for the expanded refrigerant fluid based on pressure and temperature measurements at the evaporator exit. If the superheat is above a set-point value, the seat moves to increase the cross-sectional area and the refrigerant fluid volume and mass flow rates to match the superheat set-point value. If the superheat is below the set-point value the seat moves to decrease the cross-sectional area and the refrigerant fluid flow rates. The controller 17 may be configured to control vapor quality at the evaporator exit as disclosed below.

Referring now to FIGS. 1A-1D additional evaporator arrangements that are alternative configurations of the evaporator arrangement 24 and heat loads 49a, 49b are shown.

In the configuration of FIG. 1A, both the low heat load 49a and the high heat load 49b are coupled to (or are in proximately to) a single, i.e., the same, evaporator 24.

In the configuration of FIG. 1B, each of a pair of evaporators (generally 24) have the low heat load 49a and the high heat load 49b coupled or proximate thereto. In an alternative configuration of FIG. 1B, (not shown), the low heat load 49a would be coupled (or proximate) to to a first one of the pair of evaporators (generally 24) and the high heat load 49b would be coupled (or proximate) to a second one of pair of evaporators (generally 24).

In the configurations of FIGS. 1C and 1D, the low heat load 49a and the high heat load 49b are coupled (or proximate) to corresponding ones of the pair of evaporators (generally 24). In the configurations of FIGS. 1C and 1D, a T-valve 23a (passive or active), as shown, splits refrigerant flow from the receiver 15, into two paths (conduit 27c and conduit 27c') that feed two evaporators (generally 24). One of these evaporators 24 is coupled (or proximate) to the low heat load 49a and the other of these evaporators is coupled (or proximate to) the high heat load 49b. As also shown in FIG. 1D expansion valves are coupled at inlet sides of the evaporators 24. At least one expansion valve would be configured to control a vapor quality at the evaporator 24 exit to allow discharging liquid into the liquid separator, while the other would controls a superheat. Other configurations are possible.

In the configuration of FIG. 1C, the outputs of the evaporators (generally 24) are coupled via conduits 27d and 27d' to a second T-valve 23b (active or passive) that has an output that feeds the inlet 26a of the liquid separator 26.

On the other hand, in the configuration of FIG. 1D, the outputs of the evaporators (generally 24) are coupled differently. The output of the evaporator 24 that has low heat load 49a feeds an inlet of the T-valve 23b, whereas the output of the evaporator 24 that has high heat load 49b feeds inlet 26a of the liquid separator 26. This arrangement in effect, removes the liquid separator from the CCRS portion 9b. in some configurations, the T valves can be switched (meaning that they can be controlled (automatically or manually) to shut off either or both inlets) or passive meaning that they do not shut off either inlet and thus can be T junctions.

Evaporator

Referring to FIGS. 2A and 2B, the evaporator 24 can be implemented in a variety of ways. In general, evaporator 24 functions as a heat exchanger, providing thermal contact between the refrigerant fluid and heat load(s) 49a, 49b. Typically, evaporator 24 includes one or more flow channels extending internally between an inlet and an outlet of the evaporator 24, allowing refrigerant fluid to flow through the evaporator 24 and absorb heat from heat load(s) 49a, 49b.

A variety of different evaporators can be used in TMS 9. In general, any cold plate may function as the evaporator 24 of the open circuit refrigeration systems disclosed herein. Evaporator 24 can accommodate any refrigerant fluid channels 25 (including mini/micro-channel tubes), blocks of printed circuit heat exchanging structures, or more generally, any heat exchanging structures that are used to transport single-phase or two-phase fluids. The evaporator 24 and/or components thereof, such as fluid transport channels 25, can be attached to the heat load(s) 49a, 49b mechanically, or can be welded, brazed, or bonded to the heat load in any manner.

In some embodiments, evaporator 24 (or certain components thereof) can be fabricated as part of heat load(s) 49a, 49b or otherwise integrated into one or more of the heat load(s) 49a, 49b, as is generally shown in FIGS. 2A and 2B, in which heat load 49b has one or more integrated refrigerant fluid channels 25. The portion of heat load 49b with the refrigerant fluid channel(s) 25 effectively functions as the evaporator 24 for the OCRSCCRS 11. The evaporator 24 can be implemented as plurality of evaporators connected in parallel and/or in series or as individual evaporators, as shown for evaporator 24 for heat load 49b (FIG. 2B).

FIG. 2C shows the junction device 30 having three ports.

Receiver

FIG. 3 shows a schematic diagram of an example of receiver 15. Receiver 15 includes the inlet port 15a and the outlet port 15b, and may include an optional pressure relief valve 15c. To charge receiver 15, refrigerant fluid is typically introduced into receiver 15 via the inlet port 15a, and this can be done, for example, at service locations. Operating in the field the refrigerant exits receiver 15 through outlet port 15b that is connected to conduit 27a (FIG. 1). In case of emergency, if the fluid pressure within receiver 15 exceeds a pressure limit value, pressure relief valve 15c opens to allow a portion of the refrigerant fluid to escape through valve 15c to reduce the fluid pressure within receiver 15. Receiver 15 is typically implemented as an insulated vessel that stores a refrigerant fluid at relatively high pressure. Receiver 15 can also include insulation (not shown in FIG. 3) applied around the receiver to reduce thermal losses.

In general, receiver 15 can have a variety of different shapes. In some embodiments, for example, the receiver is cylindrical. Examples of other possible shapes include, but are not limited to, rectangular prismatic, cubic, and conical. In certain embodiments, receiver 15 can be oriented such that outlet port 15b is positioned at the bottom of the receiver. In this manner, the liquid portion of the refrigerant fluid within receiver 15 is discharged first through outlet port 15b, prior to discharge of refrigerant vapor. In certain embodiments, the refrigerant fluid can be an ammonia-based mixture that includes ammonia and one or more other substances. For example, mixtures can include one or more additives that facilitate ammonia absorption or ammonia burning.

While, in the OCRSCCRS 11, the compressor 32 consumes power, the discharge pressure can be lower than the discharge pressure of an equivalent CCRS 9a to handle both heat loads 49a, 49b and, therefore, the power consumed by the compressor 32 can be less than the power consumed by a compressor of the equivalent closed-circuit refrigerant system.

FIG. 4 depicts a configuration for the liquid separator 26 (implemented as a coalescing liquid separator or a flash drum for example), which has the vapor side port 26b and the inlet 26a coupled to conduits (not referenced) and has a liquid side outlet port 26c. In FIG. 1, the inlet 26a is connected to the liquid side outlet 26c. In other embodiments discussed below, inlet 26a is the input port to the liquid separator 26 and the vapor side outlet 26b and the liquid side outlet 26c are outlets. Other conventional details such as membranes, coalescing filters, or meshes, etc. are not shown.

Described herein are several alternative types of OCRS configurations that can be used with corresponding OCRSCCRS 11a-11n. These alternatives are: compressor assisted exhaust types 12a, 12b (FIGS. 5A, 5B); ejector assisted types 13a-13f (FIGS. 6A-6G); and pump assisted types 14a-14e (FIGS. 8A-8E).

Figure 5A:
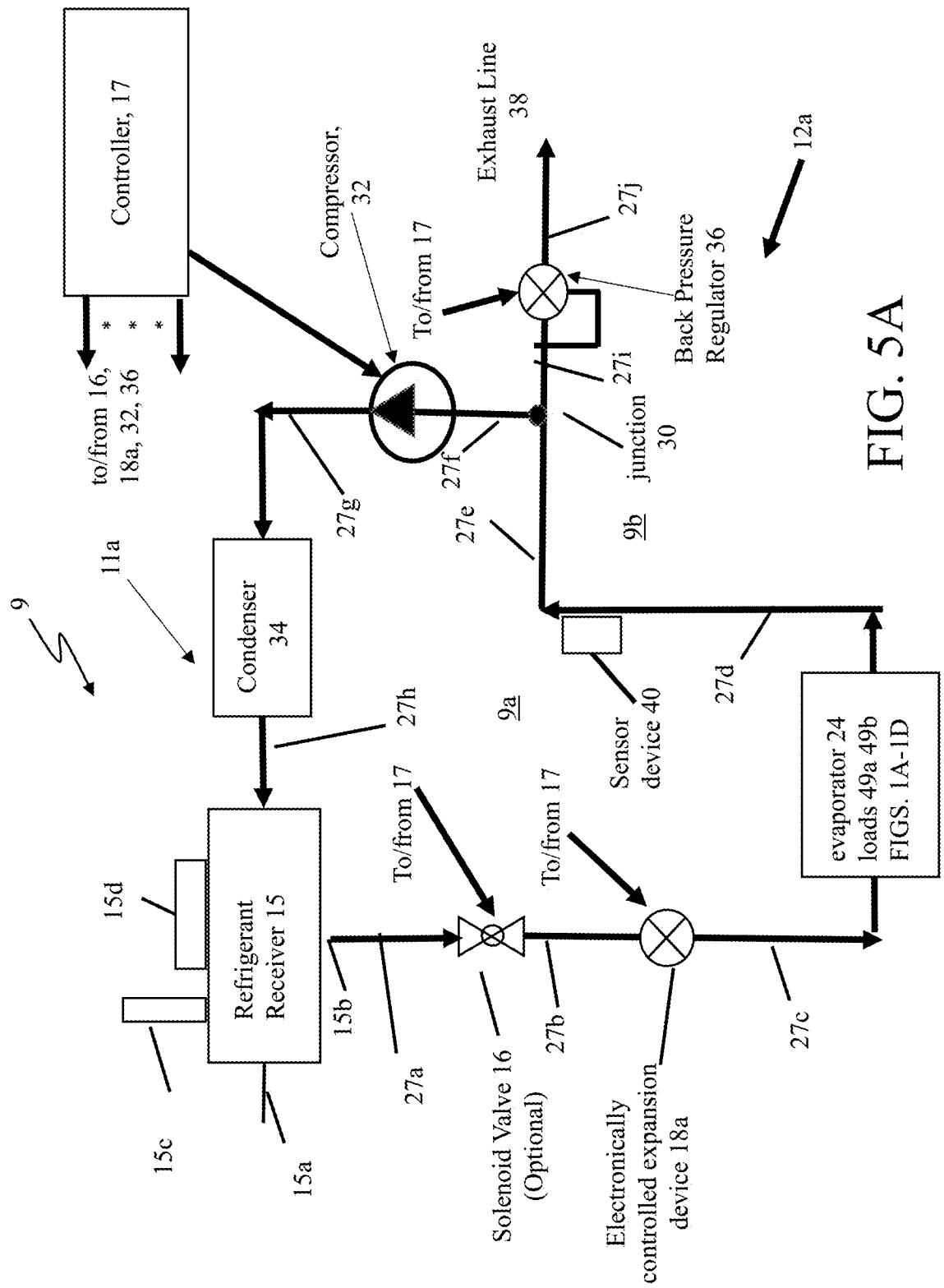
FIGS. 5A and 5B are schematic diagrams of other examples of a thermal management system that includes an open-circuit/closed-circuit refrigeration system.
Figure 5B:
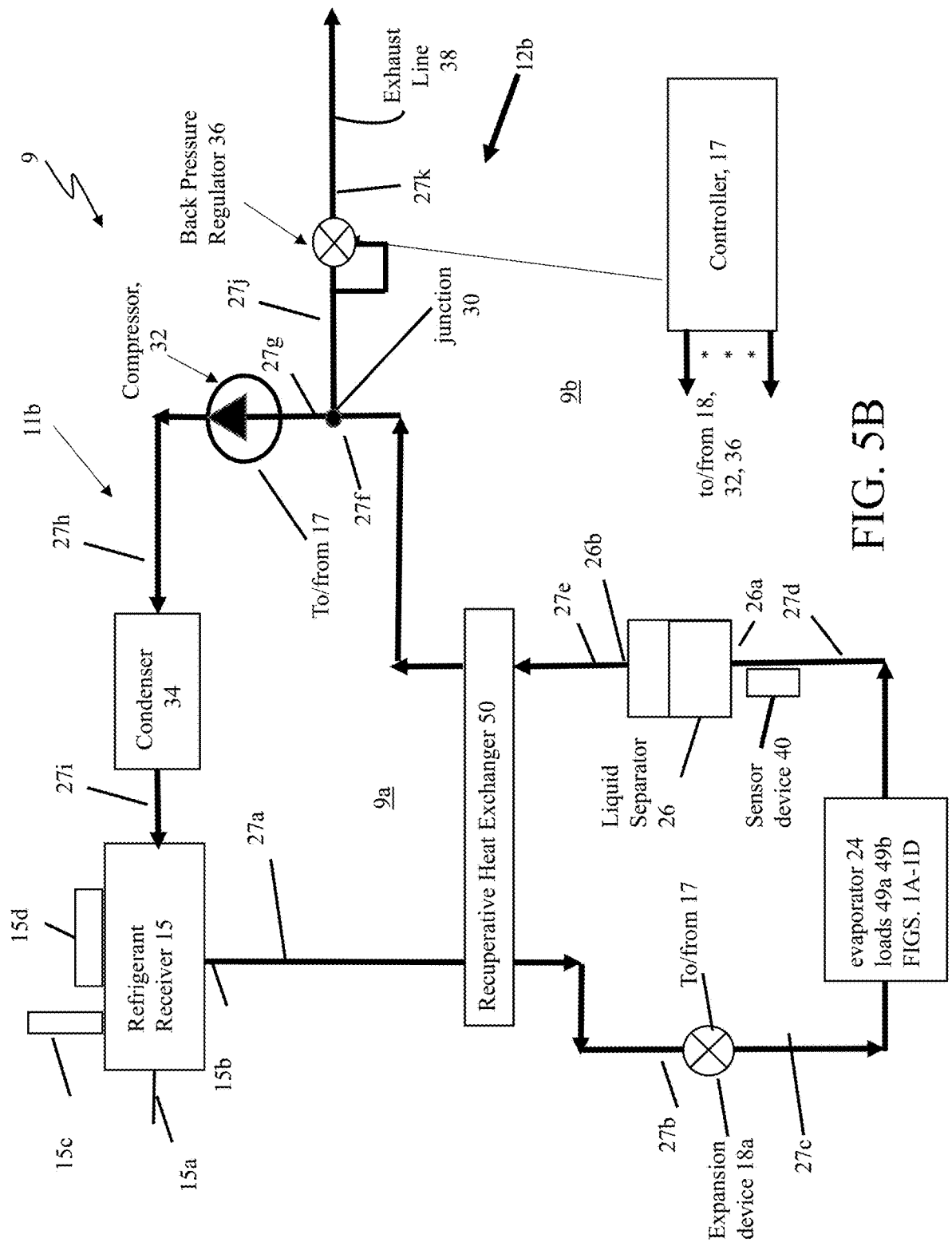

III. Thermal Management Systems with Closed Circuit Refrigeration Systems Integrated with Open Circuit Refrigeration Systems Alternative Configurations FIGS. 5A, 5B show alternative configurations 12a, 12b for the OCRS portion of an alternative OCRSCCRS 11a. Items illustrated and referenced, but not mentioned in the discussion below are discussed and referenced in FIG. 1.

Referring now to FIG. 5A, the OCRSCCRS 11a includes the OCRS 12a integrated with the CCRS 9a. The configuration 12a has the control device 18 (FIG. 1) being an electronically controlled expansion valve device 18a. The expansion valve device 18a can be operated with a sensor device 40 that controls the expansion valve device 18a either directly or through controller 17 (FIG. 1). The evaporator 24 operates in two phase (liquid/gas) and superheated regions with controlled superheat. The sensor-controlled expansion device 18a and the sensor 40 provide a mechanism to measure and control superheat.

The CCRS 9a is generally as discussed above in FIG. 1. The CCRS 9a provides cooling for low heat loads over long time intervals while the OCRS 13a provides cooling for high heat loads over short time intervals is shown, as generally discussed above in FIG. 1.

The TMS 9 includes the OCRSCCRS 11a and heat loads 49a, 49b. The heat load 49a is a low heat load 49a whereas the heat load 49b is a high heat load 49b, as discussed above. Any of the configurations of evaporator and heat loads of FIGS. 1A-1D can be used.

The CCRS 9a of the OCRSCCRS 11a includes the receiver 15, the optional valve 16, the electrically controlled expansion valve device 18a (i.e., the control device), the evaporator 24, and the junction device 30. One port of the junction device 30 is coupled to the evaporator 24 and another port is coupled to the compressor 32 that is coupled to the condenser 34. The CCRS 9a is coupled via conduits 27a-27h.

The OCRS 12a includes the receiver 15, the optional solenoid valve 16, the electrically controlled expansion valve device 18a (i.e., the control device), the evaporator 24, and the junction device 30 having a third port coupled to the back-pressure regulator 36 and an output of the back-pressure regulator 36 coupled to the exhaust line 38. The OCRS 12a is coupled via conduits 27a-27e, and 27i, 27j.

When the low heat load 49a is applied, the TMS 9 is configured to have the CCRS 9a provide refrigeration to the low heat load 49a. In this instance, controller 17 produces signals to cause the back-pressure regulator 36 to be placed in an OFF state (i.e., closed). With the back-pressure regulator 36 or off, the CCRS 9a provides cooling duty to handle the low heat load 49a. Operation of the OCRSCCRS 11a in the CCRS configuration, thus is similar to the operation of OCRSCCRS 11 discussed above under the heading "Closed-Circuit Refrigeration Operation."

A. Open/Closed Circuit Refrigeration Operation

On the other hand, when a high heat load 49b is applied, a mechanism such as the controller 17 causes the OCRSCCRS 11a to operate in both a closed and open cycle configuration. The closed cycle portion would be similar to that described above for OCRSCCRS 11 (FIG. 1) under the heading "Closed-Circuit Refrigeration Operation."

The OCRS 12a has the controller 17 configured to cause the back-pressure regulator 36 to be placed in an ON position, opening the back-pressure regulator 36 to permit the back-pressure regulator 36 to exhaust vapor through the exhaust line 38. The back-pressure regulator 36 maintains a back pressure at an inlet to the back-pressure regulator 36, according to a set point pressure, while allowing the back-pressure regulator 36 to exhaust refrigerant vapor to the exhaust line 38.

The OCRSCCRS 11a operates as a TES, as discussed above, provided that the receiver 15 has enough refrigerant charge and the refrigerant flow rate flowing through the evaporator 24 matches the rate needed by the high load 49b. The back-pressure regulator 36 exhausts the refrigerant vapor less the refrigerant vapor recirculated by the compressor 32. The rate of exhaust of the refrigerant vapor through the exhaust line 38 is governed by the set point pressure used at the input to the back-pressure regulator 36.

When the high heat load 49b is no longer in use or its temperature is reduced, this occurrence is sensed by the sensor 40 (or otherwise, such as communicated directly by the high heat load 49b) and is sent to the controller 17. The controller 17 is configured to partially or completely close the back-pressure regulator 36 by changing the set point pressure (or otherwise), and thus partially or totally close the exhaust line 38 to reduce or cut off exhaust refrigerant flow through the exhaust line 38. When the high heat load 49b reaches a desired temperature or is no longer being used, the back-pressure regulator 36 is placed in the OFF status and is thus closed, and CCRS 9a takes over the control. Both the low heat load 49a and the high heat load 49b can be coupled to the evaporator 24 or are in proximately to each other and the evaporator 24.

OCRSCCRS 11a would generally also include the controller 17 (see FIG. 13 for an exemplary embodiment) that produces control signals (based on sensed thermodynamic properties) to control operation of the various ones of devices 16, 18, 32, etc., as needed, as well as back-pressure regulator 36. That is, controller 17 may receive signals and send signals (as appropriate) as discussed above for system 11.

In FIG. 5A, the OCRSCCRS 11a includes the electronically controlled expansion device 18a. The expansion valve device 18a is operated with the sensor device 40 that measures a superheat at the exit from the evaporator 24. The electronically controlled expansion device 18a is either controlled directly by the sensor device 40 or indirectly by the controller 17 operating according to the sensor device 40, and the back-pressure regulator 36 disposed in line with the exhaust line 38 to control superheat at the evaporator 24 exit.

The junction device 30 is disposed among the evaporator 24, the back-pressure regulator 36 and the input to the compressor 32. Compressor discharge is used to control pressure in the receiver 15 so that the pressure remains high enough to extend operation of the OCRSCCRS 11a, as the amount of liquid refrigerant in receiver 15 is consumed, reducing refrigerate pressure. If applied, the back-pressure regulator 36 can maintain a relatively constant pressure in the receiver 15 during entire period of operation of the OCRS 12a.

Referring now to FIG. 5B, the OCRSCCRS 11b includes the OCRS 12b integrated with the CCRS 9a. Unlike the configuration 12a type of FIG. 5A, OCRS 12b allows for a lower vapor quality at the evaporator 24 exit because of the presence of a recuperative heat exchanger 50 that evaporates any remaining liquid prior to being fed to the inlet of the compressor 32. In some implementations, the presence of the recuperative heat exchanger 50 can eliminate the need for the liquid separator 26.

OCRSCCRS 11b includes the CCRS 9a that provides cooling for low heat loads 49a over long time intervals and the OCRS 12b that provides cooling for high heat loads 49b over short time intervals, as generally discussed above for FIG. 1. The CCRS 9a includes the receiver 15, the optional solenoid valve 16, the expansion valve device 18a, the evaporator 24, the junction device 30, the liquid separator 26, the compressor 32, and the condenser 34. One port of the junction device 30 is coupled to the compressor 32. An output of the compressor 32 is coupled to the condenser 34 that has an output coupled to the inlet to the receiver 15. The CCRS 9a is coupled via conduits 27a-27i.

The OCRS 12b provides cooling for high heat loads over short time intervals, as generally discussed above in FIG. 1, and includes the receiver 15, the optional solenoid valve 16, the expansion valve device 18a, the evaporator 24, the junction device 30, and the back pressure regulator 36 whose output is coupled to the exhaust line 38. The OCRS 12b is coupled via conduits 27a-27f, and 27j, 27k.

The recuperative heat exchanger 50 is coupled in an input path between the receiver 15 and the expansion valve device 18 and in an output path from vapor side outlet 26c of the liquid separator 26 to a port of the junction device 30. In FIG. 5B, the OCRSCCRS 11b has the electronically controlled expansion device 18a operated with the sensor device 40 (as discussed for FIG. 5A) that controls the expansion valve device 18a either directly or indirectly via the controller 17, and the back-pressure regulator 36 disposed in line with the exhaust line 38. The back-pressure regulator 36 can maintain a relatively constant pressure in the receiver 15 during entire period of operation of the OCRSCCRS 11b.

The recuperative heat exchanger 50 transfers heat energy from the refrigerant fluid emerging from liquid separator 26 to refrigerant fluid upstream from the expansion device 18. Inclusion of the recuperative heat exchanger 50 reduces mass flow rate demand and allows operation of evaporator 24 within threshold of vapor quality. In some examples the recuperative heat exchanger 50 transfers heat energy from the refrigerant fluid emerging from evaporator 24, and the liquid separator 26 is not needed. That is, the recuperative heat exchanger 50 obviates the need for the liquid separator 26.

The discussion below regarding vapor quality presumes that the recuperative heat exchanger 50 is configured to generate a sufficient superheat and is used with the liquid separator 26. The vapor quality of the refrigerant fluid after passing through evaporator 24 can be controlled either directly or indirectly with respect to a vapor quality set point by the controller 17. The evaporator 24 may be configured to maintain exit vapor quality substantially below the critical vapor quality defined as "1."

Vapor quality is the ratio of mass of vapor to mass of liquid+vapor and is generally kept in a range of approximately 0.5 to almost 1.0; more specifically 0.6 to 0.95; more specifically 0.75 to 0.9 more specifically 0.8 to 0.9 or more specifically about 0.8 to 0.85. "Vapor quality" is thus defined as mass of vapor/total mass (vapor+liquid). In this sense, vapor quality cannot exceed "1" or be equal to a value less than "0." In practice vapor quality may be expressed as "equilibrium thermodynamic quality" that is calculated as follows:

$$X = (h-h')/(h''-h'),$$

where h is specific enthalpy, specific entropy or specific volume, h' is of saturated liquid and " is of saturated vapor. In this case X can be mathematically below 0 or above 1, unless the calculation process is forced to operate differently. Either approach is acceptable.

During operation of the TMS 9, cooling can be initiated by a variety of different mechanisms. In some embodiments, for example, TMS 9 includes temperature sensors attached to loads 49a-49b (as will be discussed subsequently). When the temperature of loads 49a-49b exceeds a certain temperature set point (i.e., threshold value), the controller 17 connected to the temperature sensor can initiate cooling of loads 49a-49b. Alternatively, in certain embodiments, TMS 9 operates essentially continuously—provided that the refrigerant fluid pressure within receiver 15 is sufficient—to cool low heat load 49a and a temperature sensor attached to high heat load 49b will cause the controller 17 to switch in the OCRS 12b when the temperature of high heat load 49b exceeds a certain temperature set point (i.e., threshold value). As soon as receiver 15 is charged with refrigerant fluid, refrigerant fluid is ready to be directed into evaporator 24 to cool loads 49a-49b. In general, cooling is initiated when a user of the system or the heat load issues a cooling demand.

Upon initiation of a cooling operation, refrigerant fluid from receiver 15 is discharged from outlet 15b, through optional solenoid valve 16, if present, and is transported through conduit 27b to control device 18, which directly or indirectly controls vapor quality (or superheat) at the evaporator outlet. In the following discussion, control device 18 is implemented as an electronic expansion valve device 18a. However, it should be understood that more generally, control device 18 can be implemented as any component or device that performs the functional steps described below and provides for vapor quality control (or superheat) at the evaporator outlet.

Once inside the expansion valve device 18a, the refrigerant fluid undergoes constant enthalpy expansion from an initial pressure $p_r$ (i.e., the receiver pressure) to an evaporation pressure pc at the outlet of the expansion valve device 18a. In general, the evaporation pressure pc depends on a variety of factors, e.g., the desired temperature set point value (i.e., the target temperature) at which loads 49a-49b is/are to be maintained and the heat input generated by the respective heat loads. Set points will be discussed below.

The initial pressure in the receiver 15 tends to be in equilibrium with the surrounding temperature and is different for different refrigerants. (Operational conditions of the compressor 32 and condenser 34 may be configured to maintain a higher condensing pressure.) The pressure in the evaporator 24 depends on the evaporating temperature, which is lower than the heat load temperature and is defined during design of the TMS 9. The TMS 9 is operational as long as the receiver-to-evaporator pressure difference is sufficient to drive adequate refrigerant fluid flow through the expansion valve device 18a. After undergoing constant enthalpy expansion in the expansion valve device 18a, the liquid refrigerant fluid is converted to a mixture of liquid and vapor phases at the temperature of the fluid and evaporation pressure $p_e$. The two-phase refrigerant fluid mixture is transported via conduit 27c to evaporator 24.

Most of the discussion below pertains to cooling of the high heat load 49b. When the two-phase mixture of refrigerant fluid is directed into evaporator 24, the liquid phase absorbs heat from loads 49a and/or 49b, driving a phase transition of the liquid refrigerant fluid into the vapor phase. Because this phase transition occurs at (nominally) constant temperature, the temperature of the refrigerant fluid mixture within evaporator 24 remains unchanged, provided at least some liquid refrigerant fluid remains in evaporator 24 to absorb heat.

Further, the constant temperature of the refrigerant fluid mixture within evaporator 24 can be controlled by adjusting the pressure $p_e$ of the refrigerant fluid, since adjustment of $p_e$ changes the boiling temperature of the refrigerant fluid. Thus, by regulating the refrigerant fluid pressure $p_e$ upstream from evaporator 24, the temperature of the refrigerant fluid within evaporator 24 (and, nominally, the temperature of heat load 49b) can be controlled to match a specific temperature set-point value for heat load 49b, ensuring that loads 49a-49b are maintained at, or very near, a target temperature.

The pressure drop across the evaporator 24 causes drop of the temperature of the refrigerant mixture (which is the evaporating temperature), but still the evaporator 24 can be configured to maintain the heat load temperature within the set tolerances.

In some embodiments, for example, the evaporation pressure of the refrigerant fluid can be adjusted by pressure of the back-pressure regulator 36 to ensure that the temperature of thermal loads 49a-49b is maintained to within ±5 degrees C. (e.g., to within ±4 degrees C., to within ±3 degrees C., to within ±2 degrees C., to within ±1 degree C.) of the temperature set point value for load 49.

As discussed above, within evaporator 24, a portion of the liquid refrigerant in the two-phase refrigerant fluid mixture is converted to refrigerant vapor by undergoing a phase change. As a result, the refrigerant fluid mixture that emerges from evaporator 24 has a higher vapor quality (i.e., the fraction of the vapor phase that exists in refrigerant fluid mixture) than the refrigerant fluid mixture that enters evaporator 24.

As the refrigerant fluid mixture emerges from evaporator 24, a portion of the refrigerant fluid can optionally be used to cool one or more additional thermal loads. Typically, for example, the refrigerant fluid that emerges from evaporator 24 is nearly in the vapor phase. The refrigerant fluid vapor (or, more precisely, high vapor quality fluid vapor) can be directed into a heat exchanger coupled to another thermal load, and can absorb heat from the additional thermal load during propagation through the heat exchanger.

For open circuit operation, the refrigerant fluid emerging from evaporator 24 is transported through conduit 27e to the recuperative heat exchanger 50. After passing through the recuperative heat exchanger 50, the refrigerant fluid is discharged as exhaust, via back-pressure regulator 36 through conduit 27k, which functions as an exhaust line 38 for TMS 9.

Refrigerant fluid discharge can occur directly into the environment surrounding the TMS 9. Alternatively, in some embodiments, the refrigerant fluid can be further processed; various features and aspects of such processing are discussed in further detail below.

It should be noted that the foregoing steps, while discussed sequentially for purposes of clarity, occur simultaneously and continuously during cooling operations. In other words, refrigerant fluid is continuously being discharged from receiver 15, undergoing continuous expansion in control device 18, flowing continuously through evaporator 24, and being discharged from the TMS 9, while thermal loads 49a-49b are being cooled.

During operation of the TMS 9, as refrigerant fluid is drawn from receiver 15 and used to cool high heat load 49b, the receiver pressure $p_r$ falls. If the refrigerant fluid pressure $p_r$ in receiver 15 is reduced to a value that is too low, the pressure differential $p_r$-$p_e$ may not be adequate to drive sufficient refrigerant fluid mass flow to provide adequate cooling of the high heat load 49b. Accordingly, when the refrigerant fluid pressure $p_r$ in receiver 15 is reduced to a value that is sufficiently low, the capacity of TMS 9 to maintain a particular temperature set point value for loads 49a-49b may be compromised. Therefore, the pressure in the receiver 15 or pressure drop across the expansion valve 18a (or any related refrigerant fluid pressure or pressure drop in system 9) can be an indicator of the remaining operational time. An appropriate warning signal can be issued (e.g., by the controller 17) to indicate that, in a certain period of time, the system may no longer be able to maintain adequate cooling performance; operation of the system can even be halted if the refrigerant fluid pressure in receiver 15 reaches the low-end threshold value.

It should be noted that while in FIG. 5B only a single receiver 15 is shown, in some embodiments, TMS 9 can include multiple refrigerant receivers to allow for operation of the system over an extended time period. Each of the multiple receivers can supply refrigerant fluid to the system to extend to total operating time period. Some embodiments may include plurality of evaporators connected in parallel, which may or may not be accompanied by a plurality of expansion valves and plurality of evaporators.

B. System Operational Control

As discussed in the previous section, by adjusting the pressure $p_e$ of the refrigerant fluid, the temperature at which the liquid refrigerant phase undergoes vaporization within evaporator 24 can be controlled. Thus, in general, the temperature of heat loads 49a-49b can be controlled by a device or component of TMS 9 that regulates the pressure of the refrigerant fluid within evaporator 24. System operating parameters include the superheat and the vapor quality of the refrigerant fluid emerging from evaporator 24.

The vapor quality, which is a number from 0 to 1, represents the fraction of the refrigerant fluid that is in the vapor phase. Considering the high heat load 49b individually, because heat absorbed from heat load 49b is used to drive a constant-temperature evaporation of liquid refrigerant to form refrigerant vapor in evaporator 24, it is generally important to ensure that, for a particular volume of refrigerant fluid propagating through evaporator 24, at least some of the refrigerant fluid remains in liquid form right up to the point at which the exit aperture of evaporator 24 is reached to allow continued heat absorption from heat load 49b without causing a temperature increase of the refrigerant fluid. If the fluid is fully converted to the vapor phase after propagating only partially through evaporator 24, further heat absorption by the (now vapor-phase) refrigerant fluid within evaporator 24 will lead to a temperature increase of the refrigerant fluid and heat load 49b.

On the other hand, liquid-phase refrigerant fluid that emerges from evaporator 24 represents unused heat-absorbing capacity, in that the liquid refrigerant fluid did not absorb sufficient heat from the high heat load 49b to undergo a phase change. To ensure that TMS 9 operates efficiently, the amount of unused heat-absorbing capacity should remain relatively small.

In addition, the boiling heat transfer coefficient that characterizes the effectiveness of heat transfer from the high heat load 49b to the refrigerant fluid is typically very sensitive to vapor quality. When the vapor quality increases from zero to a certain value, called a critical vapor quality, the heat transfer coefficient increases. When the vapor quality exceeds the critical vapor quality, the heat transfer coefficient is abruptly reduced to a very low value, causing dryout within evaporator 24. In this region of operation, the two-phase mixture behaves as superheated vapor.

In general, the critical vapor quality and heat transfer coefficient values vary widely for different refrigerant fluids, and heat and mass fluxes. For all such refrigerant fluids and operating conditions, the systems and methods disclosed herein control the vapor quality at the outlet of the evaporator such that the vapor quality approaches the threshold of the critical vapor quality.

To make maximum use of the heat-absorbing capacity of the two-phase refrigerant fluid mixture for high heat load 49b, the vapor quality of the refrigerant fluid emerging from evaporator 24 should nominally be equal to the critical vapor quality. Accordingly, to both efficiently use the heat-absorbing capacity of the two-phase refrigerant fluid mixture and also ensure that the temperature of heat load 49b remains approximately constant at the phase transition temperature of the refrigerant fluid in evaporator 24, the systems and methods disclosed herein are generally configured to adjust the vapor quality of the refrigerant fluid emerging from evaporator 24 to a value that is less than or equal to the critical vapor quality.

Another important operating consideration for TMS 9 is the mass flow rate of refrigerant fluid within the thermal management system 9. Evaporator can be configured to provide minimal mass flow rate controlling maximal vapor quality, which is the critical vapor quality. By minimizing the mass flow rate of the refrigerant fluid according to the cooling requirements for high heat load 49, TMS 9 operates efficiently. Each reduction in the mass flow rate of the refrigerant fluid (while maintaining the same temperature set point value for heat load 49) means that the charge of refrigerant fluid added to receiver 15 initially lasts longer, providing further operating time for thermal management system 9.

Within evaporator 24, the vapor quality of a given quantity of refrigerant fluid varies from the evaporator inlet 24a (where vapor quality is lowest) to the evaporator outlet 24b (where vapor quality is highest). Nonetheless, to realize the lowest possible mass flow rate of the refrigerant fluid within the system, the effective vapor quality of the refrigerant fluid within evaporator 24—even when accounting for variations that occur within evaporator 24—should match the critical vapor quality as closely as possible.

CCRS power demand and CCRS efficiency are optimal when the evaporating temperature is as high as possible and the condensing pressure is as low as possible. The condenser 34 and evaporator 24 dimensions can be reduced when the evaporating temperature is as low as possible and the condensing pressure is as high as possible.

To ensure that the OCRS 12b operates efficiently and the mass flow rate of the refrigerant fluid is relatively low, and at the same time the temperature of the high heat load 49b is maintained within a relatively small tolerance, TMS 9 adjusts the vapor quality of the refrigerant fluid emerging from evaporator 24 to a value such that an effective vapor quality within evaporator 24 matches, or nearly matches, the critical vapor quality. At the same time requirements for CCRS efficient operation would be taken into consideration as well. In addition, generally compressors 32 do not work well with liquids at their inlets. Accordingly, operation of FIG. 1 or 5A or 5B as close as possible to the critical vapor quality is desirable.

In TMS 9, control device 18 is generally configured to control the vapor quality of the refrigerant fluid emerging from evaporator 24. As an example, when control device 18 is implemented as an expansion valve device, the expansion valve device regulates the mass flow rate of the refrigerant fluid through the valve. In turn, for a given set of operating conditions (e.g., ambient temperature, initial pressure in the receiver, temperature set point value for heat load 49b, the vapor quality determines mass flow rate of the refrigerant fluid emerging from evaporator 24.

Control device 18 typically controls the vapor quality of the refrigerant fluid emerging from evaporator 24 in response to information about at least one thermodynamic quantity that is either directly or indirectly related to the vapor quality.

In general, a wide variety of different measurement and control strategies can be implemented in TMS 9 to achieve the control objectives discussed above. These strategies are presented below. Generally, control device 18 is connected to a measurement device or sensor 40. The first measurement device 40 provides information about the thermodynamic quantities upon which adjustments of the first and second control devices are based. The first and second measurement devices can be implemented in many different ways, depending upon the nature of the first and second control devices.

IV. Thermal Management Systems with Closed Circuit Refrigeration Systems Integrated with Open Circuit Refrigeration Systems with Elector Boost FIGS. 6A-6G show ejector assisted type alternative configurations 13a-13g for the OCRS portion of OCRSCCRS 11c-i. The use of an ejector can assist in reducing a power requirement of the TMS 9. Items illustrated and referenced, but not mentioned in the discussion below are discussed and referenced in FIG. 1.

Figure 6A:
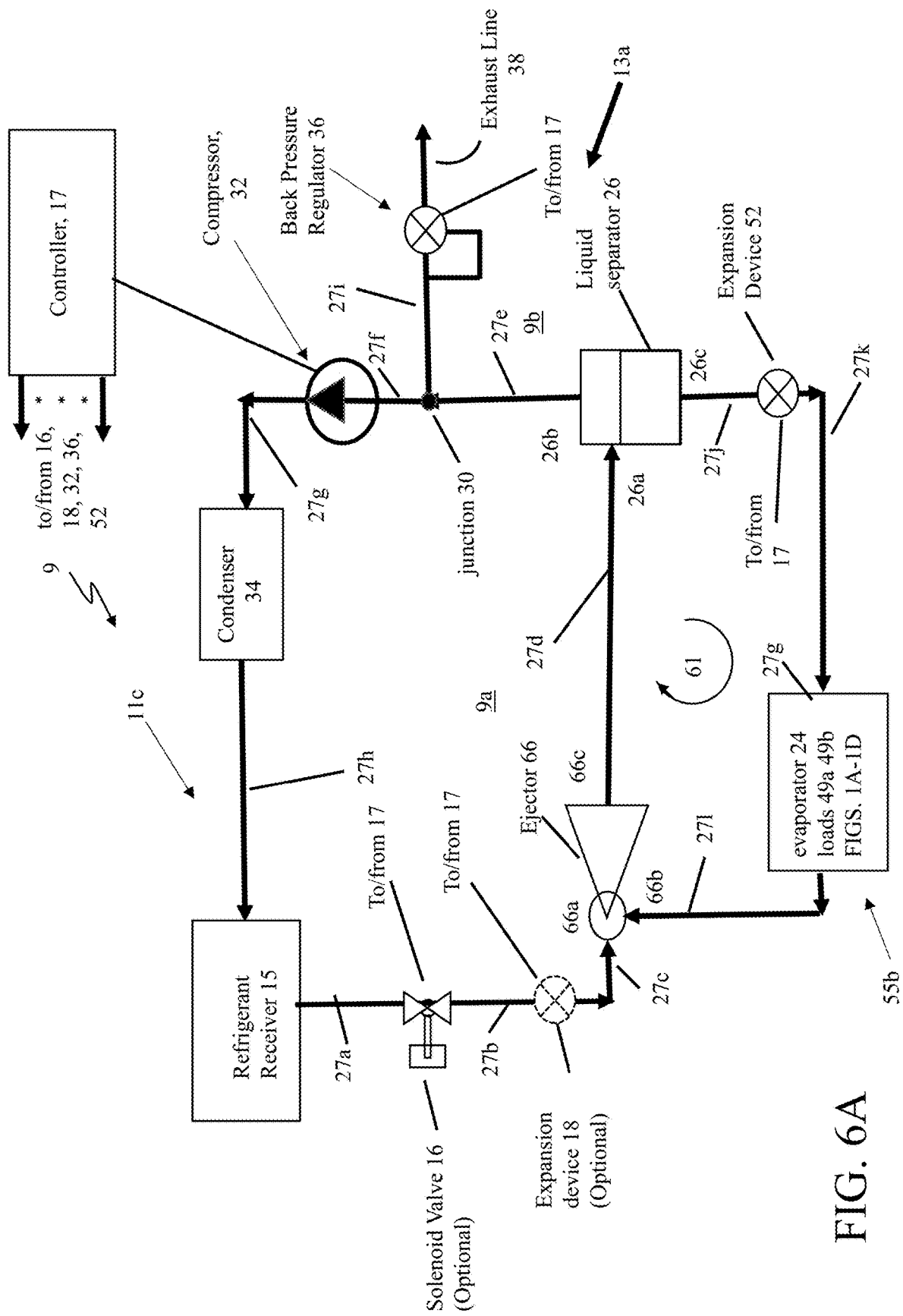
FIGS. 6A-6G are schematic diagrams of examples of a thermal management system that includes an open-circuit/closed-circuit refrigeration system with an ejector.

Referring now to FIG. 6A, the TMS 9 includes the OCRS 13a integrated with the CCRS 9a. The OCRS 13a is an ejector assisted open circuit refrigeration system (E-OCRS). The CCRS 9a is generally, as discussed above in FIG. 1 but includes a loop 61. The CCRS 9a provides cooling for low heat loads 49a over long time intervals while the OCRS 13a provides cooling for high heat loads 49b over short time intervals, as generally discussed above in FIGS. 1A-1D. That is, the TMS 9 includes the OCRSCCRS 11c and the heat loads 49a, 49b. The heat load 49a is a low heat load 49a whereas the heat load 49b is a high heat load 49b, as discussed above for FIGS. 1A-1D. The CCRS 9a is ejector assisted as is the OCRS 13a.

OCRSCCRS 11c includes a receiver 15 that is configured to store sub-cooled liquid refrigerant, as discussed above. OCRSCCRS 11c may include an optional solenoid valve 16 and optional first control device, such as, an expansion valve device 18. Both, either or neither of the optional solenoid valve 16 and the optional expansion valve device 18 are used (i.e., or not used) in each of the embodiments of the OCRSCCRS 11c-i of FIGS. 6A-6F.

The OCRSCCRS 11c includes an ejector 66. The ejector 66 has a primary inlet or high pressure inlet 66a that is coupled to the receiver 15 (either directly or through the optional solenoid valve 16 and/or expansion device 18). Outlet 66c of the ejector 66 is coupled to a third port, e.g., a liquid side outlet 26c of the liquid separator 26. The ejector 66 also has a secondary inlet or low-pressure inlet 66b. The liquid separator 26 in addition to the liquid side outlet 26c has the vapor side port 26b and the inlet port 26a. The inlet port 26a of the liquid separator 26 is coupled to a first port of the junction 30 that has the second port coupled to an inlet (not referenced) of the back-pressure regulator 36. The back-pressure regulator 36 has an outlet (not referenced) that feeds exhaust line 38. The third port of the junction device 30 is coupled to the compressor 32. The compressor 32 is coupled to condenser 34. The OCRSCCRS 11c also includes an optional, second expansion valve device 52, and an evaporator 24. The evaporator 24 is coupled to the low pressure inlet 66b of the ejector 66 and the vapor side port 26b of the liquid separator 26.

The CCRS 9a includes the receiver 15, optional valves 16, 18, ejector 66, liquid separator 26, junction 30, compressor 32 and condenser 34, and has a loop circuit comprised of the evaporator 24 and expansion device 52, all coupled via conduit 27a-27h, 27j-27l. The E-OCRS 13a portion of the OCRSCCRS 11 includes the receiver 15, optional valves 16, 18, ejector 66, liquid separator 26, junction 30, back-pressure regulator 36, exhaust line 38, and the loop circuit comprised of the evaporator 24 and expansion device 52, all coupled via conduit 27a-27e, 27i-27l.

The TMS 9 includes a thermal load 49a and a thermal load 49b, as discussed above, that are coupled to and/or in thermal communication with the evaporator 24. The evaporator 24 is configured to extract heat from the thermal load thermal load 49a and the thermal load 49b that is in contact with the evaporator 24.

A. Closed Circuit Refrigeration Operation

The CCRS 9a is generally, as discussed above in FIG. 1, with the addition of the loop provided by the ejector 66, liquid separator 26, and evaporator 24. The CCRS 9a provides cooling for low heat loads 49a over long time intervals. The ejector 66 acts as a "pump," to "pump" a secondary fluid flow, e.g., liquid/vapor from the evaporator 24 using energy of the primary refrigerant flow from the refrigerant receiver 15. See FIG. 7 for a more detailed description of a typical ejector 66.

B. Open/Closed Circuit Refrigeration Operation

In some embodiments, refrigerant flow through the OCRSCCRS 11c, during open-circuit operation, is controlled in the E-OCRS 13a either solely by the ejector 66 and back-pressure regulator 36 or by those components aided by either one or all of the solenoid valve 16 and expansion valve device 18, depending on requirements of the application, e.g., ranges of mass flow rates, cooling requirements, receiver capacity, ambient temperatures, thermal load, etc. and the expansion device 52.

While both control device 18 and solenoid valve 16 may not typically be used, in some implementations, either or both would be used and would function as a flow control device(s) to control refrigerant flow into the primary inlet 66a of the ejector 66. In some embodiments, the expansion valve device 18 can be integrated with the ejector 66. In various embodiments of the OCRSCCRS 11c, the optional expansion valve device 18 may be required under some circumstances where there are or can be significant changes in, e.g., an ambient temperature, which might impose additional control requirements on the OCRSCCRS 11c.

The back-pressure regulator 36 has an outlet (not referenced) that is disposed at the exhaust line 38, and further has an inlet (not referenced) coupled via junction 30 to the vapor side outlet 28b of the liquid separator 26. The back-pressure regulator 36 functions to control the vapor pressure upstream of the back-pressure regulator 36. In OCRSCCRS 11c, the back-pressure regulator 36 is a control device that controls the refrigerant fluid vapor pressure from the liquid separator 26 and indirectly controls evaporating pressure/temperature when the OCRSCCRS 11c is operating in open circuit mode. In general, back-pressure regulator 36 can be implemented using a variety of different mechanical and electronic flow regulation devices, as mentioned above. The back-pressure regulator 36 regulates fluid pressure upstream from the regulator, i.e., regulates the pressure at the inlet to the back-pressure regulator 36 according to a set pressure point value.

For expansion valve device 18 and expansion valve device 52 mechanical expansion valve and/or electrically controlled expansion valves could be used, as discussed above. Also, in some of the further embodiments discussed below, the controller 17 can be used with electrical expansion valves to calculate a value of superheat for the expanded refrigerant fluid based on pressure and temperature measurements at the liquid separator exit, as discussed above.

Some loads require maintaining thermal contact between the loads 49b and evaporator 24 with the refrigerant being in the two-phase region (of a phase diagram for the refrigerant) and, therefore, the expansion valve device 52 maintains a proper vapor quality at the evaporator exit. Alternatively, a sensor communicating with controller 17 may monitor pressure in the refrigerant receiver 15, as well as a pressure differential across the expansion valve 16, a pressure drop across the evaporator 24, a liquid level in the liquid separator 26, and power input into electrically actuated heat loads, or a combination of the above.

In FIG. 6A, the evaporator 24 is coupled to the secondary inlet 66b (low-pressure inlet) of the ejector 66 and to an outlet of the expansion device 52, such that the expansion device 52 and conduit 27j, 27k couple the evaporator 24 to the liquid side outlet 26c of the liquid separator 26. During open circuit operation, the ejector 66 again acts as a "pump," to "pump" a secondary fluid flow, e.g., liquid/vapor from the evaporator 24 using energy of the primary refrigerant flow from the refrigerant receiver 15.

The evaporator 24 may be configured to maintain exit vapor quality below the critical vapor quality defined as "1." However, the higher the exit vapor quality the better it is for operation of the ejector 66. Vapor quality is the ratio of mass of vapor to mass of liquid+vapor and is generally kept in a range of approximately 0.5 to almost 1.0; more specifically 0.6 to 0.95; more specifically 0.75 to 0.9 more specifically 0.8 to 0.9 or more specifically about 0.8 to 0.85, as discussed above.

The CCRS 9a operates as above, except that refrigerant from receiver 15 enters into the primary inlet 66a of the ejector 66 (see detailed discussion below) and through the loop 61, meaning that refrigerant flows from the ejector 66 into liquid separator 26 and flow from the liquid separator 26 is expanded by the device 52 into the evaporator 24, which cools heat load 49a. The refrigerant is returned to the ejector 66 and to the liquid separator 26, while a vapor fraction of the refrigerant is fed to the compressor 32 and to the condenser 34, as discussed above. The liquid separator 26 is used to insure only vapor exists at the input to the compressor 32.

The E-OCRS 13a operates as follows. The liquid refrigerant from the receiver 15 (primary flow) is fed to the primary inlet 66a of the ejector 66 and expands at a constant entropy in the ejector 66 (in ideal case; in reality the nozzle is characterized by the isentropic efficiency of the ejector) and turns into a two-phase (gas/liquid) state. The refrigerant in the two-phase state from the ejector 66 enters the liquid separator 26, at inlet port 26a with only or substantially only liquid exiting the liquid separator 26 at the liquid side outlet 26c (liquid side port) and only or substantially only vapor exiting the separator 26 at vapor side outlet 28b (vapor side port). The liquid stream exiting at outlet 28b enters and is expanded in the expansion device 52 into a liquid/vapor stream that enters the evaporator 24. The expansion device 52 is configured to maintain suitable vapor quality at the evaporator exit (or a superheat if this is acceptable to operate the heat load 49b) and related recirculation rate.

The evaporator 24 provides cooling duty and discharges the refrigerant in a two-phase state at relatively low exit vapor quality (low fraction of vapor to liquid, e.g., generally below 0.5) into the secondary inlet 66b of the ejector 66. The ejector 66 entrains the refrigerant flow exiting the evaporator 24 and combines it with the primary flow from the receiver 15. Vapor exits from the vapor side outlet 26b of the liquid separator 26 and is exhausted by the exhaust line 38. The back-pressure regulator 36, regulates the pressure upstream of the regulator 36 so as to maintain upstream refrigerant fluid pressure in OCRSCCRS 11c.

Figure 6B:
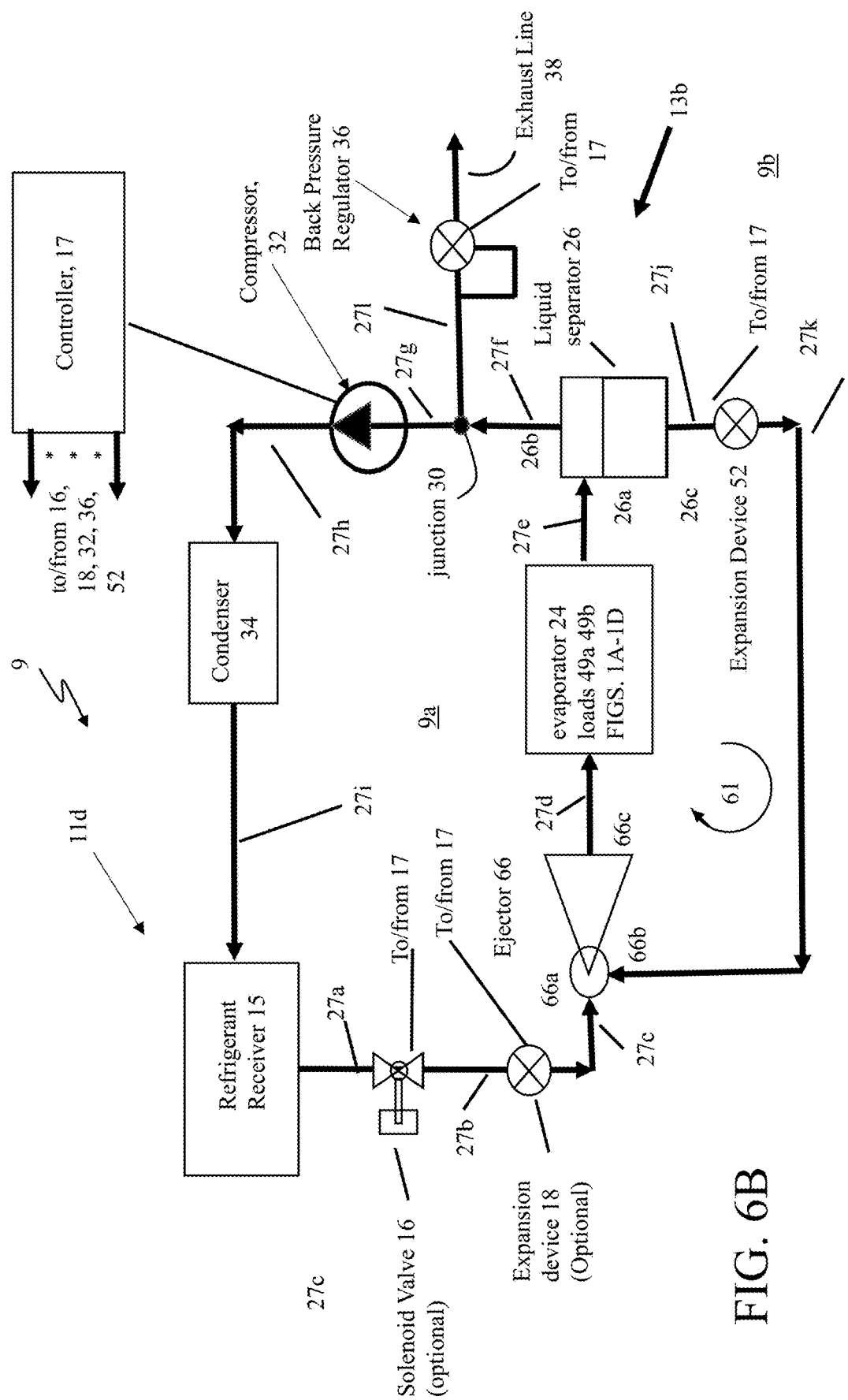

Referring now to FIG. 6B, the TMS 9 includes an E-OCRS 13b integrated with the CCRS 9a to form OCRSC-CRS 11d.

The CCRS 9a includes the receiver 15, optional valves 16, 18, ejector 66, liquid separator 26, junction 30, compressor 32, and condenser 34, as discussed above, and has a loop circuit 61 comprised of the evaporator 24, liquid separator 26, and expansion device 52. Evaporator 24 inlet is coupled to the outlet 66c of the ejector 66 and the evaporator outlet is coupled to the inlet 26a of the liquid separator 26. The E-OCRS 13b portion of the OCRSCCRS 11d includes the receiver 15, optional valves 16, 18, ejector 66, liquid separator 26, junction 30, back-pressure regulator 36, exhaust line 38, and the loop circuit 61 comprised of the evaporator 24, liquid separator 26, and expansion device 52.

The thermal loads 49a-49b are coupled to the evaporator 24. The evaporator 24 is configured to extract heat from the loads 49a-49b that are in proximity to or in contact with the evaporator 24. In OCRSCCRS 11d, the expansion device 52 is coupled between the liquid side port 28b of the liquid separator 26 and the suction or secondary inlet 66b of the ejector 66. The vapor side outlet 26b of the liquid separator 26 is coupled to a first port of the junction 30 and a second port of the junction 30 is coupled to the back-pressure regulator 36 that is coupled to the exhaust line 38. A third port of the junction 30 is coupled to the compressor 32 that in turn is coupled to the condenser 34 that is coupled to an inlet to the receiver 15. Conduits 27a-27l couple the various aforementioned items as shown.

In OCRSCCRS 11d with E-OCRS 13b, the recirculation rate is equal to the vapor quality at the evaporator exit. The expansion device 52 is optional, and when used, is a fixed orifice device. The control valve 18 or other control device can be built in the motive nozzle of the ejector 66 and provides active control of the thermodynamic parameters of refrigerant state at the evaporator exit. This embodiment of the OCRSCCRS 11d operates as follows, with the back-pressure regulator 36 in a closed or off position:

Refrigerant from the receiver 15 is directed into the ejector 66 (optionally through valves 16 and 18) and expands at a constant entropy in the ejector 66 (in an ideal case; in reality the nozzle is characterized by the ejector isentropic efficiency), and turns into a two-phase (gas/liquid) state. The refrigerant in the two-phase state enters the evaporator 24 that provides cooling duty (to loads 49a, 49b) and discharges the refrigerant in a two-phase state at an exit vapor quality (fraction of vapor to liquid) below a unit vapor quality ("1"). The discharged refrigerant is fed to the inlet 26a of the liquid separator 26, where the liquid separator 26 separates the discharge refrigerant with only or substantially only liquid exiting the liquid separator at outlet 28b (liquid side port) and only or substantially only vapor exiting the separator 26 at outlet 28a the (vapor side port). The vapor side may contain some liquid droplets since the liquid separator 26 has a separation efficiency below a "unit" separation. The liquid stream exiting at outlet 28b enters and is expanded in the expansion device 52, if used, into a liquid/vapor stream that enters the suction or secondary inlet 66b of the ejector 66. The ejector 66 entrains the refrigerant flow exiting the expansion valve by the refrigerant from the refrigerant receiver 15.

In closed circuit operation, back-pressure regulator 36 is turned off and vapor from the liquid separator 26 is fed to the compressor 32 and condenser 34, as generally discussed above. In open circuit operation, back-pressure regulator 36 is turned on and a portion of the vapor is exhausted through exhaust line 38, as generally discussed above.

In OCRSCCRS 11d, by placing the evaporator 24 between the outlet of the ejector 66 and the inlet of the liquid separator 26, OCRSCCRS 11d avoids the necessity of having liquid refrigerant pass through the liquid separator 26 during the initial charging of the evaporator 24 with the liquid refrigerant, in contrast with the OCRSCCRS 11c (FIG. 6A). At the same time liquid trapped in the liquid separator 26 may be wasted after the OCRSCCRS 11d shuts down.

When a fixed orifice device is not used, the expansion valve device 18 can be an electrically controlled expansion valve that operate with sensors. For example, the sensors can monitor vapor quality at the evaporator exit, pressure in the refrigerant receiver, pressure differential across the expansion valve device 18, pressure drop across the evaporator 24, liquid level in the liquid separator 26, power input into electrically actuated heat loads or a combination of the above.

Figure 6C:
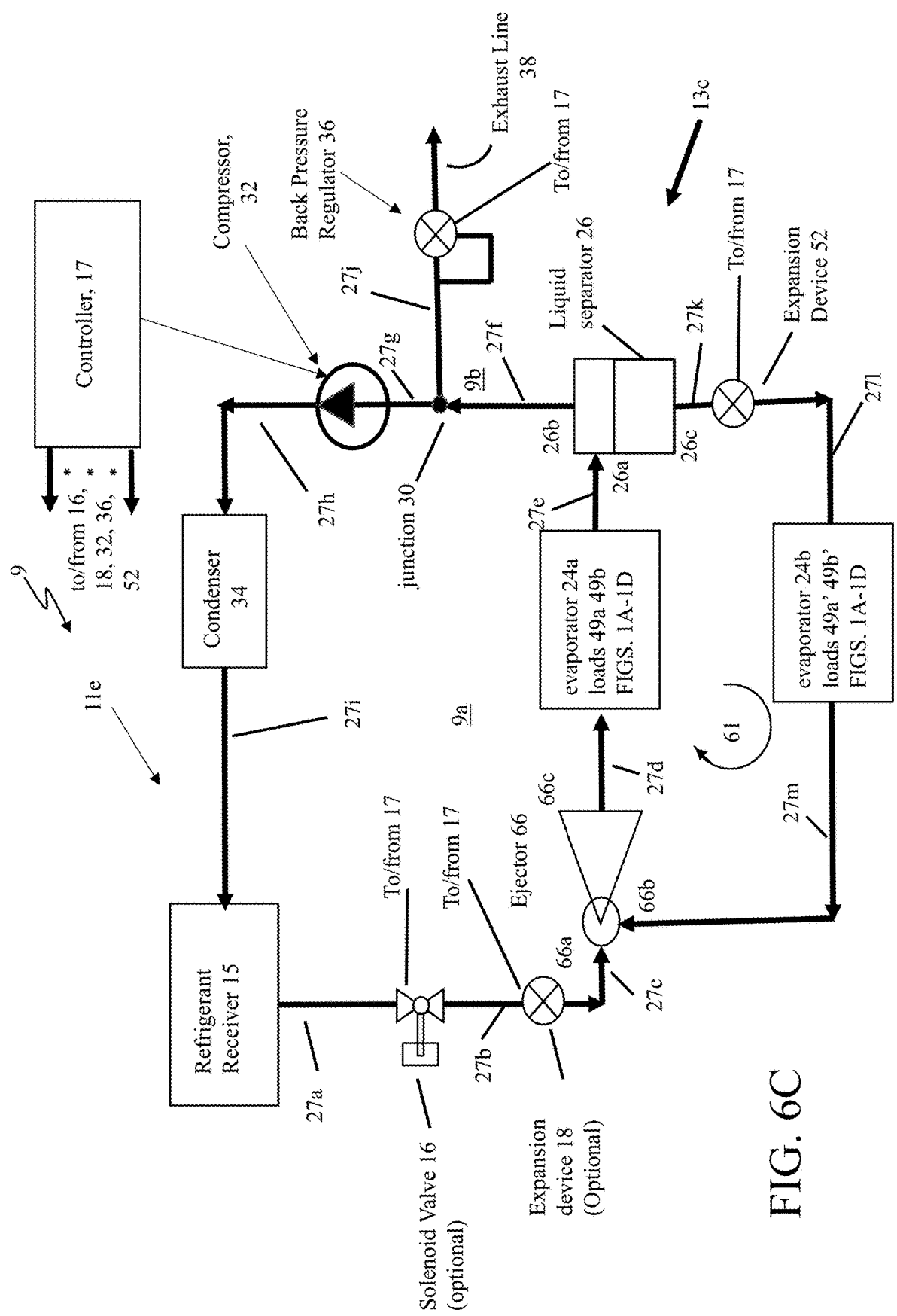

Referring now to FIG. 6C, the TMS 9 includes an E-OCRS 13c integrated with the CCRS 9a to form an OCRSCCRS 11e.

The CCRS 9a includes the receiver 15, optional valves 16, 18, ejector 66, liquid separator 26, junction 30, compressor 32 and condenser 34, as discussed above, and has a loop circuit comprised of evaporators 24a, 24b and expansion device 52. The E-OCRS 13c portion of the OCRSCCRS 11e includes the receiver 15, optional valves 16, 18, ejector 66, liquid separator 26, junction 30, back-pressure regulator 36, exhaust line 38, and the loop circuit 61 comprised of the evaporators 24a, 24b, the liquid separator 26, and expansion device 52.

The CCRS 9a and the E-OCRS 13c are in general as discussed above for the embodiments of FIGS. 6A and 6B, but include an evaporator 24a between outlet 66c of the ejector 66 and inlet to the liquid separator 26 and an evaporator 24b between outlet of expansion device 52 and secondary inlet 66b to the ejector 66. OCRSCCRS 11e otherwise includes the elements discussed in either of the FIGS. 6A, 6B.

Thermal loads 49a, 49b are coupled to the evaporator 24a. The evaporator 24a is configured to extract heat from the load 49a that is in contact with or in proximity to the evaporator 24a. Thermal loads 49a', 49b' are coupled to the evaporator 24b. The evaporator 24b is configured to extract heat from the loads 49a', 49b' that are in contact with the evaporator 24b. Conduits 27a-27m couple the various aforementioned items, as shown.

The cooling capacities of the OCRSCCRS 11c, 11d of FIGS. 6A, 6B, are sensitive to recirculation rates. The OCRSCCRS 11e of FIG. 6C is not sensitive to recirculation rate, which may be beneficial when the heat loads may significantly reduce recirculation rate. An operating advantage of the OCRSCCRS 11e is that by placing evaporators 24a, 24b at both the outlet 66c and the secondary inlet 66b of the ejector 66, it is possible to run the evaporators 24a, 24b combining the features of the configurations mentioned above. Also, in this configuration evaporator 24b can operate with loads 49a', 49b' if those loads allow for operation in superheated regions.

Figure 6D:
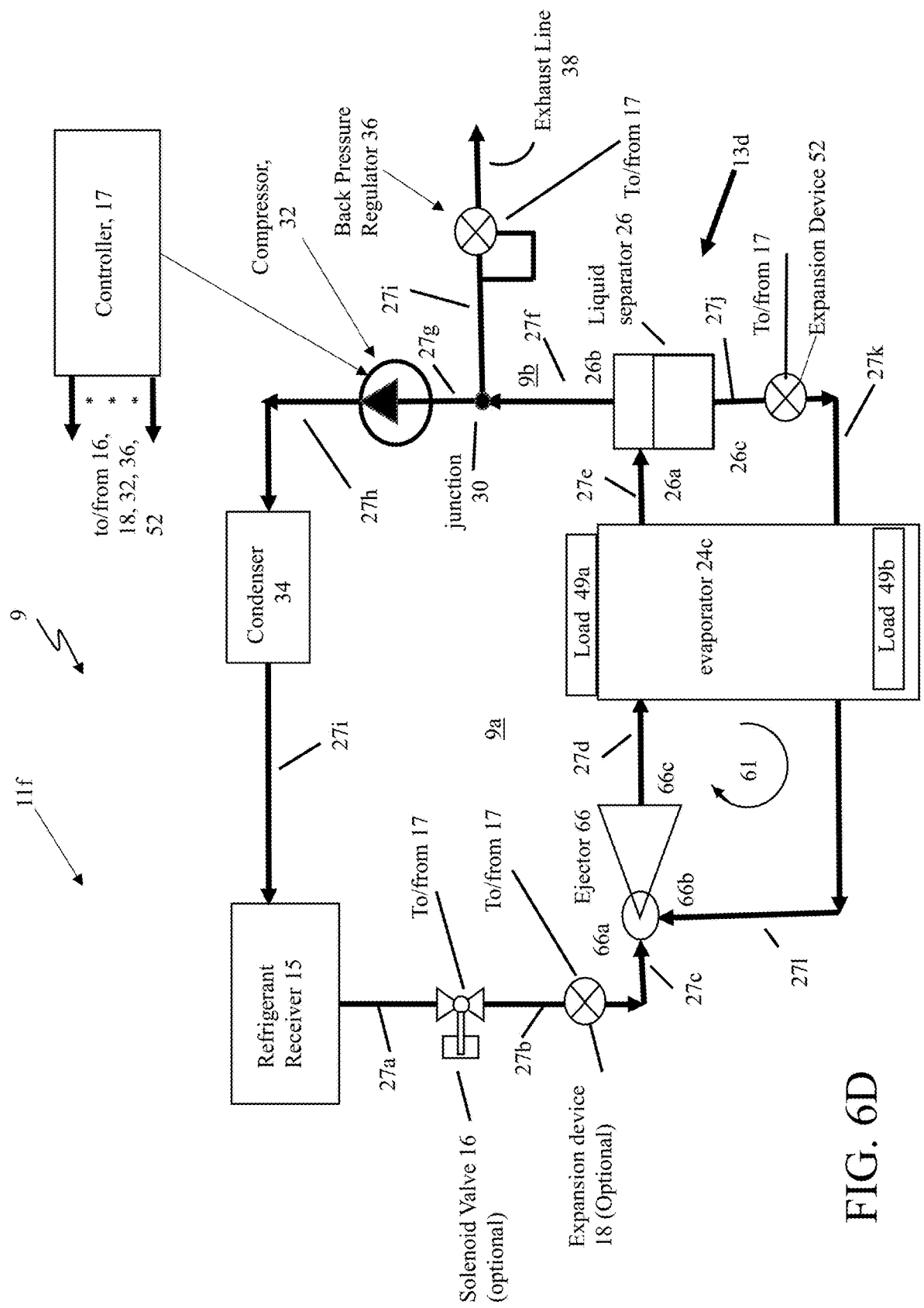

Referring now to FIG. 6D, the TMS 9 includes an E-OCRS 13d integrated with the CCRS 9a to form an OCRSCCRS 11f.

The OCRSCCRS 11f with E-OCRS 13d is generally the same as FIGS. 6A-6C, except that the OCRSCCRS 11f includes a single evaporator 24c that is attached downstream from and upstream of the ejector 66. The CCRS 9a includes the receiver 15, optional valves 16, 18, ejector 66, liquid separator 26, junction 30, compressor 32 and condenser 34, as discussed above, and has a loop circuit comprised of the evaporator 24c and expansion device 52. The E-OCRS 13c portion of the OCRSCCRS 11f includes the receiver 15, optional valves 16, 18, ejector 66, liquid separator 26, junction 30, back-pressure regulator 36, exhaust line 38, and the loop circuit comprised of the evaporator 24c, liquid separator 26, and expansion device 52. Conduits 27a-27l couple the various aforementioned items, as shown.

The evaporator 24c has a first inlet that is coupled to the outlet 66c of the ejector 66 and a first outlet that is coupled to the inlet 26a of the liquid separator 26. The evaporator 24c has a second inlet that is coupled to the outlet of the expansion device 52 and has a second outlet that is coupled to the secondary inlet 66b of the ejector 66. The vapor side outlet 26b of the liquid separator 26 is coupled via the back-pressure regulator 36 to the exhaust line 38.

In this embodiment, the single evaporator 24c is attached downstream from and upstream of the ejector 66 and requires a single evaporator in comparison with the configuration of FIG. 6C having the two evaporators 24a, 24b. In OCRSCCRS 11f, the vapor side outlet 26b of the liquid separator 26 is coupled to a first port of the junction 30 and a second port of the junction 30 is coupled to the back-pressure regulator 36 that is coupled to the exhaust line 38. A third port of the junction 30 is coupled to the compressor 32 that in turn is coupled to the condenser 34 and that has a condenser outlet coupled to the receiver 15. Conduits 27a-27m couple the various aforementioned items as shown.

A first thermal load 49a is coupled to the evaporator 24c. The evaporator 24c is configured to extract heat from the first load 49a. A second thermal load 49b is also coupled to the evaporator 24c and the evaporator 24c is configured to extract heat from the second load 49b.

Figure 6E:
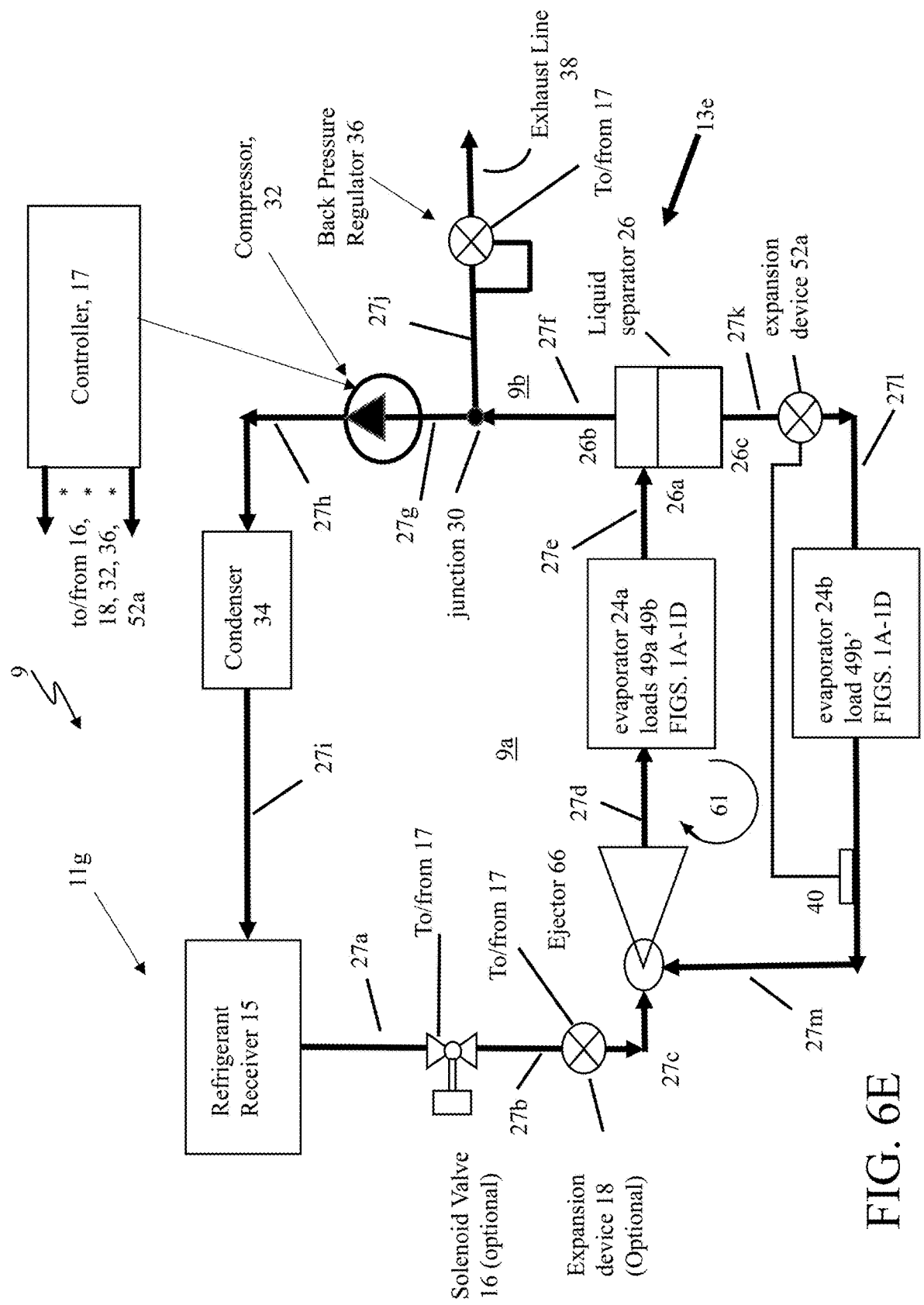

Referring now to FIG. 6E, the TMS 9 includes an E-OCRS 13e integrated with the CCRS 9a to form an OCRSCCRS 11g.

The OCRSCCRS 11g includes the receiver 15, (optional solenoid valve 16 and optional expansion valve 18), ejector 66, liquid separator 26, and the evaporators 24a, 24b, as discussed in FIG. 6C. The evaporators 24a, 24b have the first thermal load 49a, 49a' and the second thermal load 49b, 49b' coupled to the evaporators 24a, 24b respectively, with the evaporators 24a, 24b configured to extract heat from the loads 49a, 49b; 49a', 49b' in contact with the evaporators 24a, 24b. Conduits 27a-27m couple the various aforementioned items, as shown.

In this embodiment, the OCRSCCRS 11g also includes a sensor controllable expansion device 52a, such as the electrically controlled expansion valve 18a discussed above. The evaporators 24a, 24b operate in two phase (liquid/gas) and superheated region with controlled superheat. The expansion device 52a is attached to the liquid side outlet 26c of the liquid separator 26 and the evaporator 24b having a control port that is fed from a sensor 40. The sensor-controlled expansion device 52a and sensor 40 provide a mechanism to measure and control superheat.

Closed circuit and open circuit operation as generally as discussed above for FIG. 6E, except for provision of the sensor 40 to measure and control superheat.

Figure 6F:
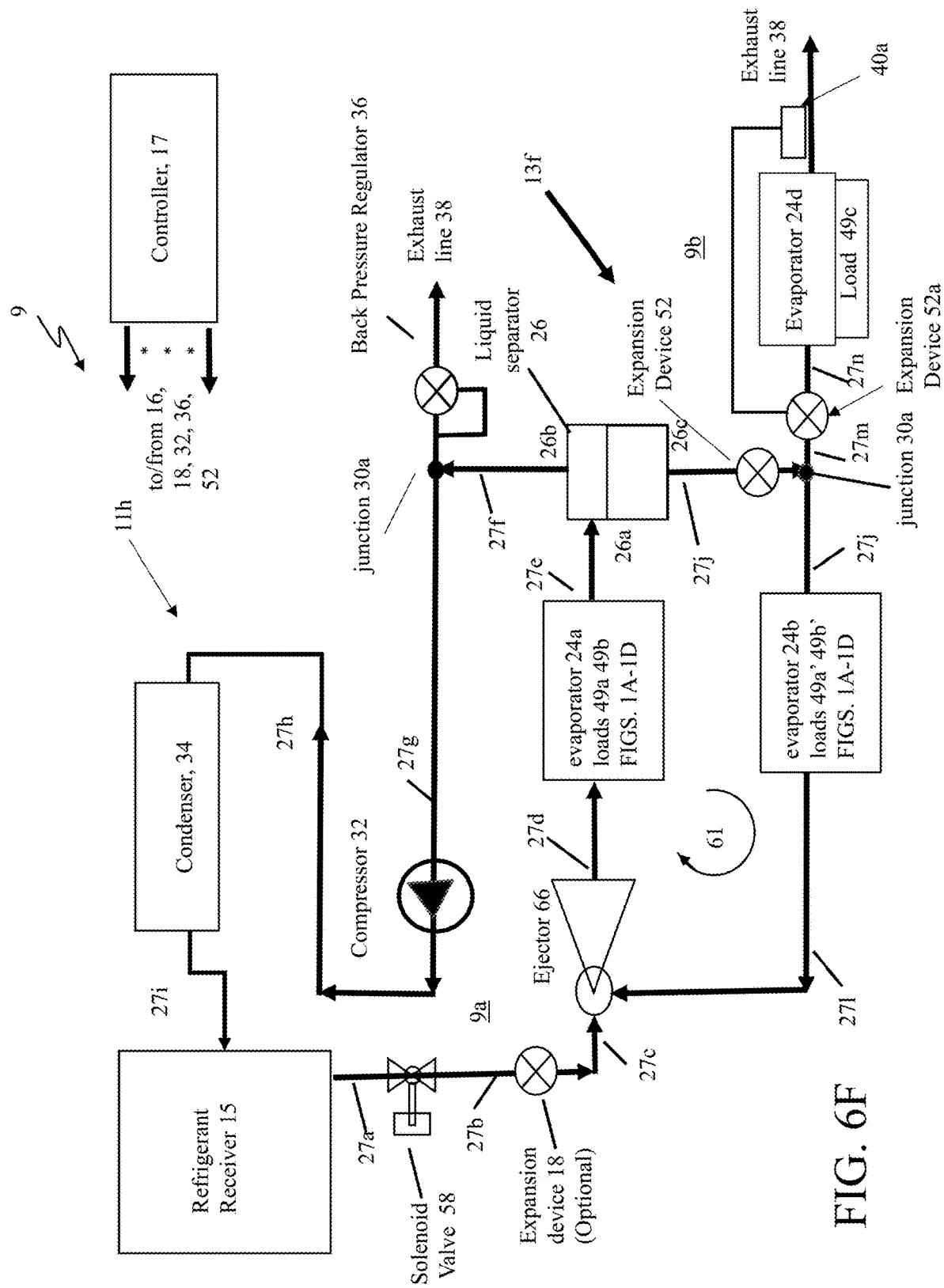

Referring now to FIG. 6F, the TMS 9 includes an E-OCRS 13f integrated with the CCRS 9a to form an OCRSCCRS 11h.

The OCRSCCRS 11h includes the receiver 15, optional solenoid control valve 16 and optional expansion valve 18, ejector 66, liquid separator 26, an expansion device 52 and the evaporators 24a, 24b, as discussed in FIG. 6E, as well as a second junction 30a, a second expansion device 52a, and a third evaporator 24d.

The evaporators 24a, 24b have the first thermal loads 49a and 49b and the second thermal loads 49a' and 49b' coupled to the evaporators 24a, 24b respectively, with the evaporators 24a, 24b configured to extract heat from the loads 49a, 49b, 49a', 49b', in contact with or in proximity to the evaporators 24a, 24b. A third thermal load 49c is coupled to the evaporator 24d that is configured to extract heat from the load 49c. The evaporator 24d is coupled to the expansion device 52a that is disposed between the outlet of expansion valve 52 and inlet to the evaporator 24d. Conduits 27a-27n couple the various aforementioned items, as shown.

The evaporators 24a, 24b operate in two phase (liquid/gas) and the third evaporator 24d operates in superheated region with controlled superheat. OCRSCCRS 11h includes the controllable expansion device 52a that has an inlet attached to the outlet of expansion valve 52 and has an outlet attached to the third evaporator 24d. The expansion valve 52a has a control port that is fed from a sensor 40. The sensor 40 controls the expansion valve 52a and provides a mechanism to measure and control superheat.

Closed circuit and open circuit operation as generally as discussed above for FIG. 6E, except for provision of the third evaporator 24d. In the various embodiments above, the vapor quality of the refrigerant fluid in open circuit operation after passing through evaporator can be controlled either directly or indirectly with respect to a vapor quality set point by the controller 17.

In some embodiments, as shown in FIGS. 5A, 5B, 6E and 6F, the TMS 9 includes a sensor 40 or 40a that provides a measurement of superheat, and indirectly, vapor quality. For example, in FIG. 6E, sensor 40 is a combination of temperature and pressure sensors that measure the refrigerant fluid superheat downstream from the heat load, and transmits the measurements to the controller 17. The controller 17 adjusts the expansion valve device 52 based on the measured superheat relative to a superheat set point value. By doing so, controller 17 indirectly adjusts the vapor quality of the refrigerant fluid emerging from evaporator 24b.

Figure 6G:
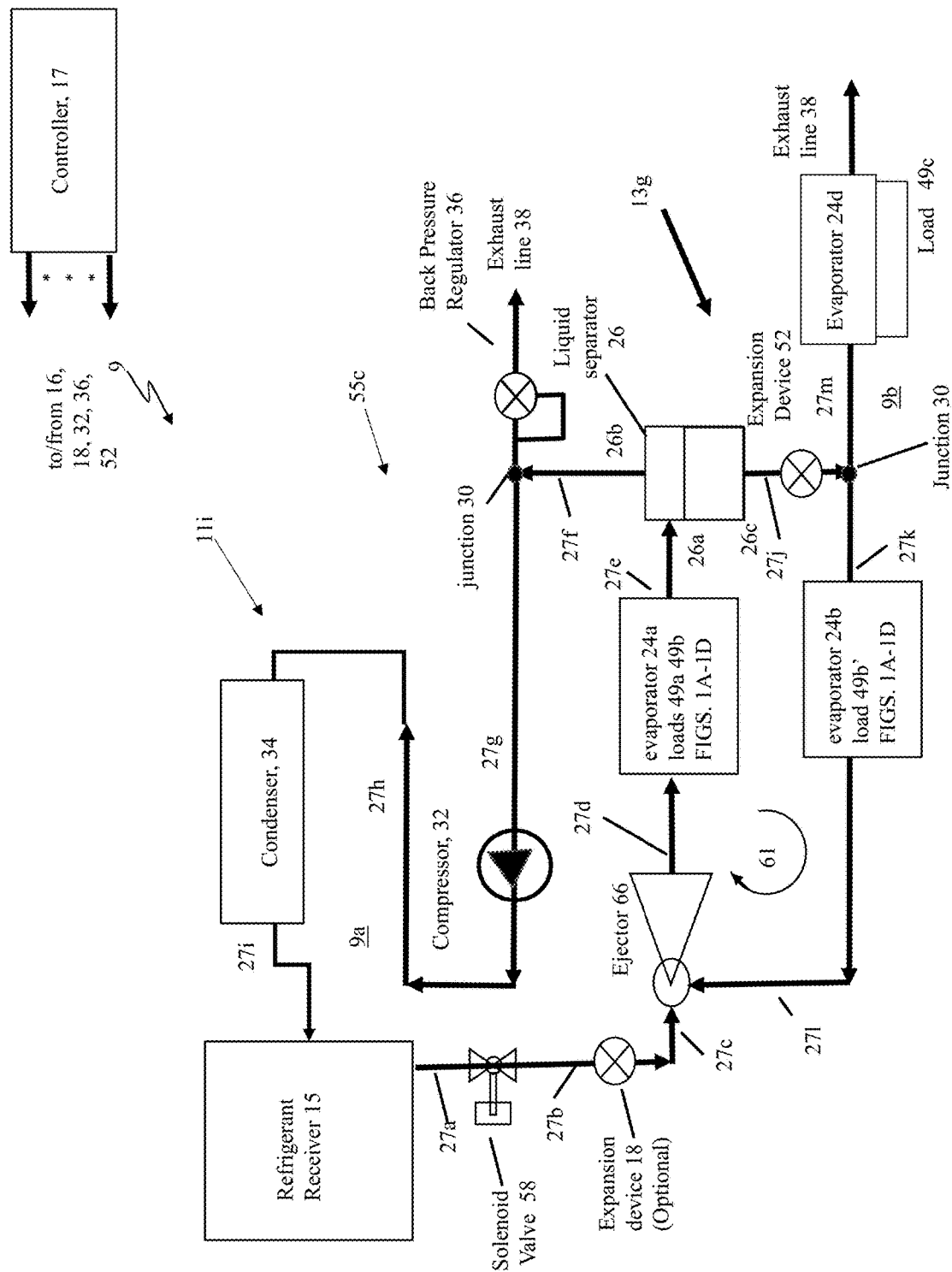

Referring now to FIG. 6G, the TMS 9 includes an E-OCRS 13g integrated with the CCRS 9a to form an OCRSCCRS 11i.

OCRSCCRS 11i includes the receiver 15, optional solenoid control valve 16, optional expansion valve 18, ejector 66, liquid separator 26, the expansion device 52, the evaporators 24a, 24b, 24d, and thermal load 49a, 49b and 49c, as discussed in FIG. 6F, (but without the expansion device 52a and sensor 40 of FIG. 6F).

In this embodiment, the third evaporator 24d? shares the same expansion valve, i.e., expansion valve 52, as the evaporators 24a, 24b. The evaporators 24a, 24b operate in two phase (liquid/gas) and evaporator 24d operates in superheated region with controlled superheat. Conduits 27a-27m couple the various aforementioned items, as shown. Additional conduits (not referenced) couple the evaporator 33 to a second exhaust line 38a and second back pressure regulator.

Figure 7:
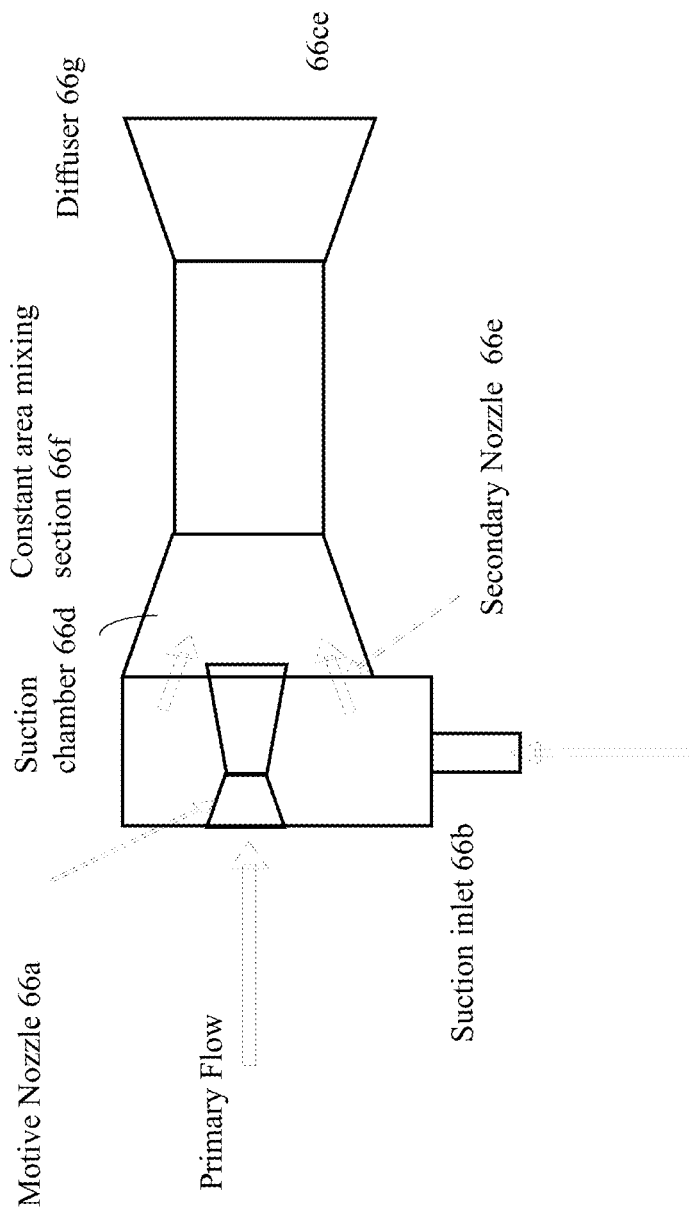
FIG. 7 is a schematic diagram of an ejector.

Referring now also to FIG. 7, a typical configuration for the ejector 66 is shown. This exemplary ejector 66 includes a high-pressure motive nozzle or primary inlet 66a, a suction or secondary inlet 66b, a secondary nozzle 66e that feeds a suction chamber 66d, a mixing chamber 66f for the primary flow of refrigerant and secondary flow of refrigerant to mix, and a diffuser 66g. In one embodiment, the ejector 66 is passively controlled by built-in flow control. Also, the E-OCRSE 13a-13g may employ the optional flow control devices 16, 18 upstream of the ejector 66.

Liquid refrigerant from the refrigerant receiver 15 is the primary flow. In the motive nozzle 66a potential energy of the primary flow is converted into kinetic energy reducing the potential energy (the established static pressure) of the primary flow. The secondary flow from the outlet of the evaporator 24 has a pressure that is higher than the established static pressure in the suction chamber 66d, and thus the secondary flow is entrained through the suction inlet 66b and the secondary nozzle(s) internal to the ejector 66. The two streams (primary flow and secondary flow) mix together in the mixing chamber 66e. In the diffuser section 66f, the kinetic energy of the mixed streams is converted into potential energy elevating the pressure of the mixed flow liquid/vapor refrigerant that leaves the ejector 66 and is fed to the liquid separator 26.

In the context of open-circuit refrigeration systems, the use of the ejector 66 allows for recirculation of liquid refrigerant captured by the liquid separator 66 to increase the efficiency of the OCRS 13a-13g of the TMS 9. That is, by allowing for some recirculation of refrigerant, but without the need for a compressor or a condenser, as in the CCRS 9a, this recirculation reduces the required amount of refrigerant needed for a given amount of cooling of high heat loads 49b over a given period of operation of the OCRS 13a-13g.

V. Thermal Management Systems with Closed Circuit Refrigeration Systems Integrated with Open Circuit Refrigeration Systems with Open Circuit Refrigeration Systems with Pump Assist FIGS. 8A-8E show pump assisted type alternative configurations 14a-14e for the OCRS portion of OCRSCCRS's 11j-m. Items illustrated and referenced, but not mentioned in the discussion below are discussed and referenced in FIG. 1, etc.

Figure 8A:
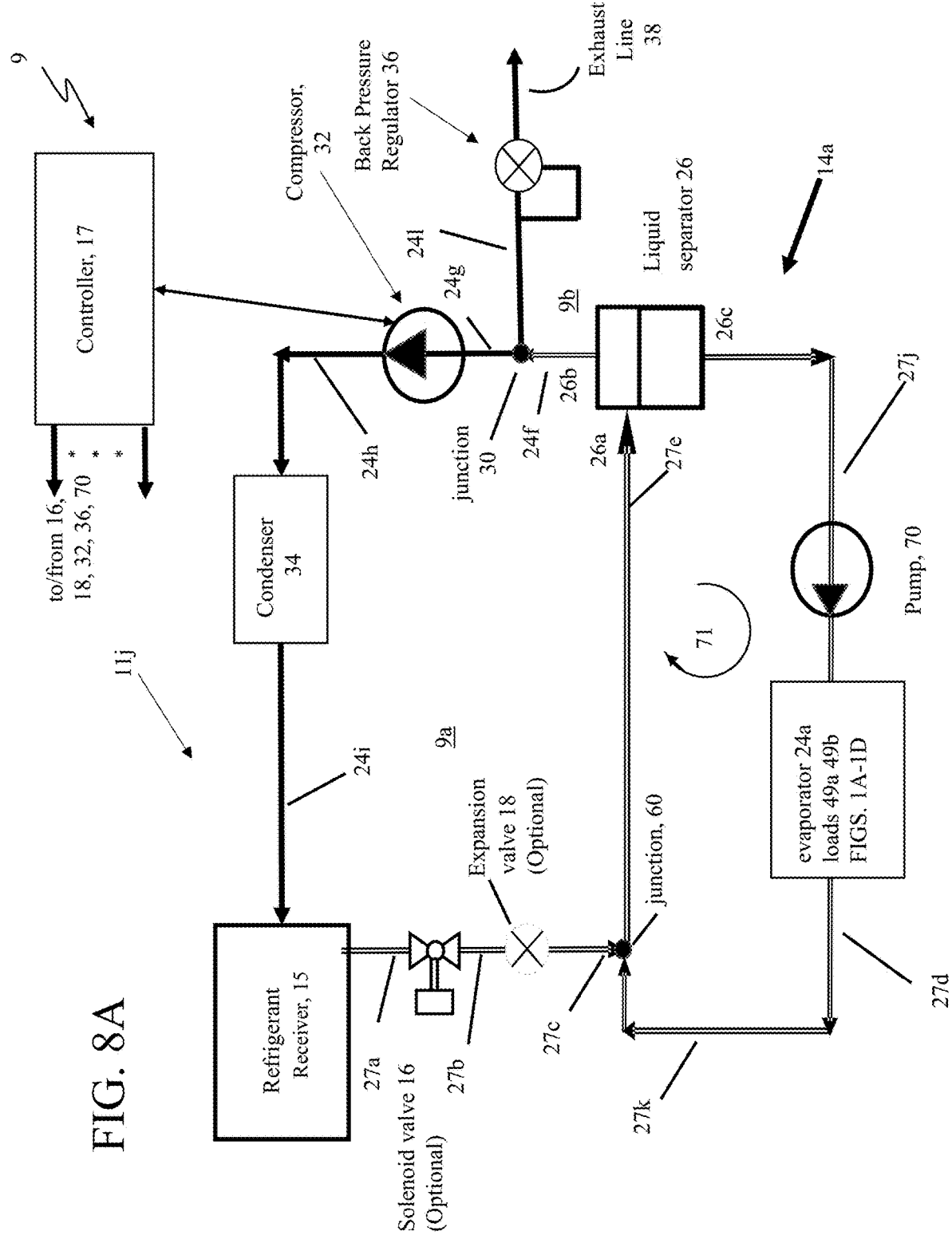
FIGS. 8A-8E are schematic diagrams of examples of a thermal management system that includes an open-circuit/closed-circuit refrigeration system with a pump.

Referring now to FIG. 8A, the TMS 9 includes an OCRSP 14a integrated with the CCRS 9a to form an OCRSCCRS 11j. The OCRSP 14a portion of the OCRSCCRS 11 is one of several open-circuit refrigeration system with pump 14a-14e system configurations that will be discussed herein. The OCRSCCRS 11j can include plural refrigerant receivers (not shown).

The CCRS 9a provides cooling for low heat loads over long time intervals while the OCRSP 14a provides cooling for high heat loads over short time intervals, as generally discussed above. The TMS 9 includes the OCRSCCRS 11j and the heat loads 49a, 49b. The heat load 49a is a low heat load 49a whereas the heat load 49b is a high heat load 49b, as discussed above.

OCRSP 14a includes the refrigerant receiver 15 that is configured to store liquid refrigerant, i.e., subcooled liquid refrigerant, optional solenoid control valve 16, optional control device, e. g., expansion valve 18, and a junction device 60 that has first and second ports configured as inlets, and a third port configured as an outlet. OCRSP 14a also includes evaporator 24, liquid separator 26, and a pump 70. OCRSP 14a also includes the compressor 32 and the condenser 34 having the outlet coupled to the inlet of receiver 15, as discussed above. The CCRS 9a includes a loop circuit having the junction 60, the evaporator 24, the liquid separator 26, and the pump 70.

The junction device 60 has the first port coupled to the receiver 15 (e.g., through optional valves 16 and 18), the second port as an inlet coupled to the outlet of the pump 70 and the third port as the outlet coupled to the inlet of the evaporator 24. The liquid separator 26 has the inlet 26a, the vapor side outlet 26b and liquid side outlet 26c. The vapor side outlet 26b of the liquid separator 26 is coupled via junction 30 to an inlet (not referenced) of the compressor 32 that controls a vapor pressure in the evaporator 24 and feeds vapor to the condenser 34. The liquid separator 26 vapor side outlet 26b is coupled to one port of the junction device 30 that feeds compressor 32 and the back-pressure regulator 36. The back-pressure regulator 36 has an outlet that feeds an exhaust line 38. The liquid side outlet 26c of the liquid separator 26 is coupled to an inlet of the pump 70. Conduits 27a-27l couple the various aforementioned items as shown.

In OCRSP 14a, refrigerant liquid from the liquid side outlet 26c of the liquid separator 26 is fed to pump inlet (not referenced) and is pumped from the pump 70 into the inlet of the evaporator 24. Refrigerant exiting from the evaporator outlet is fed along with the primary refrigerant flow from the expansion valve 18 back to the liquid separator 26. These liquid refrigerant streams from the refrigerant receiver 15 and the pump 70 are mixed downstream from the expansion valve device 18. Thermal loads 49a, 49b are coupled to the evaporator 24. The evaporator 24 is configured to extract heat from the loads 49a, 49b and to control the vapor quality at the outlet of the evaporator 24.

A. Closed Circuit Refrigeration Operation

The CCRS 9a operates as follows. The back-pressure regulator 36 is placed in an OFF position. The liquid refrigerant from the receiver 15 is fed to the expansion valve device 18 (if used) and expands at a constant enthalpy in the expansion valve device 18 turning into a two-phase (gas/liquid) mixture. This two-phase liquid/vapor refrigerant is fed to the inlet 26a of the liquid separator 26, where the liquid separator 26 separates the discharge refrigerant with only or substantially only liquid exiting the liquid separator 26 at the liquid side outlet 26c and only or substantially only vapor exiting the liquid separator 26 at vapor side outlet 26b. The liquid stream exiting at liquid side outlet 26c enters and is pumped by the pump 70 into the evaporator 24 that provides cooling duty and discharges the refrigerant in a two-phase state at a relatively high exit vapor quality (fraction of vapor to liquid). The discharged refrigerant is fed to the second inlet of the junction 60. Vapor from the vapor side 26b of the liquid separator 26 is fed to the compressor 32 on to the condenser 34 back into the receiver 15 for closed circuit operation.

B. Open/Closed Circuit Refrigeration Operation

On the other hand, when a high heat load 49b is applied, a mechanism such as the controller 17 causes the OCRSC-CRS 11j to operate in both a closed and open cycle configuration, as discussed above. The closed cycle portion would be similar to that described above under the heading "Closed Circuit Refrigeration Operation."

The OCRSP 14a has the controller 17 configured to cause the back-pressure regulator 36 to be placed in an ON position, opening the back-pressure regulator 36 to permit the back-pressure regulator 36 to exhaust vapor through the exhaust line 38. The back-pressure regulator 36 maintains a back pressure at an inlet to the back-pressure regulator 36, according to a set point pressure, while allowing the back-pressure regulator 36 to exhaust refrigerant vapor to the exhaust line 38.

In OCRSP 14a, the pump 70 can operate across a reduced pressure differential (pressure difference between inlet and outlet of the pump 70). In the context of open circuit refrigeration systems, the use of the pump 70 allows for some recirculation of liquid refrigerant from the liquid separator 26 to enable operation at reduced vapor quality at the evaporator 24 outlet, avoiding the discharge of remaining liquid out of the system at less than the separation efficiency of the liquid separator 26 allows. This recirculation reduces the required amount of refrigerant needed for a given amount of cooling over a given period of operation. The configuration above reduces the vapor quality at the evaporator 24 inlet and thus may improve refrigerant distribution (of the two-phase mixture) in the evaporator 24.

Various types of pumps can be used for pump 70. Exemplary types include gear, centrifugal, rotary vane, types. When choosing a pump, the pump should be capable to withstand the expected fluid flows, including criteria such as temperature ranges for the fluids, and materials of the pump should be compatible with the properties of the fluid. A subcooled refrigerant can be provided at the pump 70 outlet to avoid cavitation. To do that a certain liquid level in the liquid separator 26 may provide hydrostatic pressure corresponding to that sub-cooling.

Figure 8B:
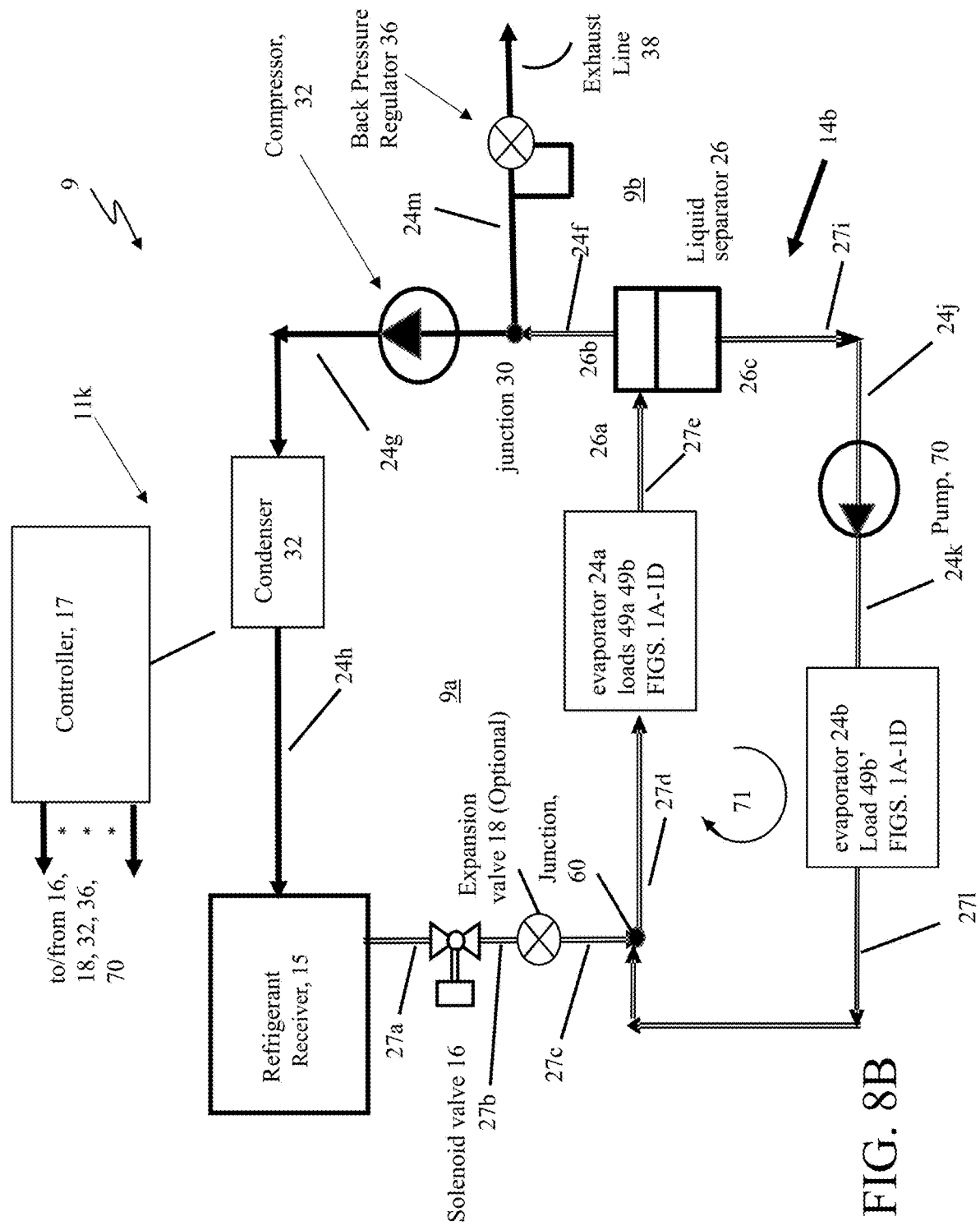

Referring now to FIG. 8B, the TMS 9 includes an OCRSP 14b integrated with the CCRS 9a to form an OCRSCCRS 11k.

OCRSP 14b includes the functional components of FIG. 8A, as discussed above, except that there is a first evaporator 24a coupled between the outlet of the junction device 60 and the inlet 26a of the liquid separator 26 (as evaporator 24 FIG. 8A) and there is a second evaporator 24b having an inlet that is coupled to the outlet of the pump 70 and having an outlet coupled to a second inlet of the junction device 60.

The liquid separator 26 has the inlet 26a, the vapor side outlet 26b and liquid side outlet 26c. The vapor side outlet 26b of the liquid separator 26 is coupled to via junction 30 to an inlet (not referenced) of the compressor 32 that controls a vapor pressure in the evaporator 24a and feeds vapor to the condenser 34. The liquid separator 26 vapor outlet 26b also feeds the back-pressure regulator 36. The back-pressure regulator 36 has an outlet that feeds an exhaust line 38. The liquid side outlet 26c of the liquid separator 26 is coupled to an inlet of the pump 70.

Thermal loads 49a, 49a are coupled to the evaporator 24a and thermal loads 49a' (optionally) and 49b' are coupled to the evaporator 24b. The evaporators 24a, 24b are configured to extract heat from the respective loads 49a, 49b; 49a', 49b' that are in contact with the corresponding evaporators 24a, 24b. Conduits 27a-27k couple the various aforementioned items as shown.

An operating advantage of the OCRSP 14b is that by placing evaporators 24a, 24b at both the outlet and the second inlet of the junction device 60, it is possible to combine loads which require operation in two-phase region and which allows operation with superheat.

Figure 8C:
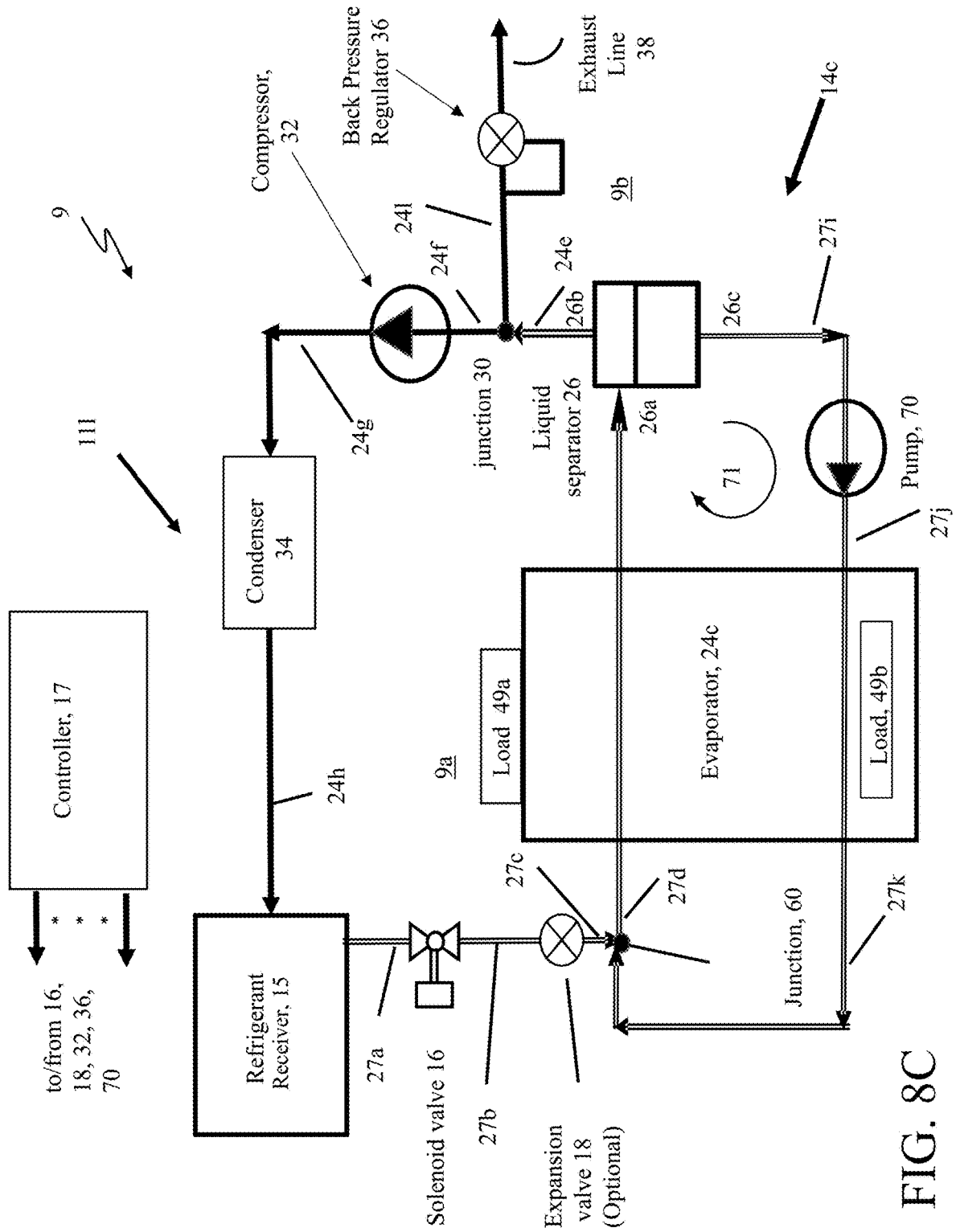

Referring now to FIG. 8C, the TMS 9 includes an OCRSP 14c integrated with the CCRS 9a to form an OCRSCCRS 11l.

OCRSP 14c includes the functional components, as discussed above for FIG. 8B but includes a single evaporator

24c that is attached downstream from and upstream of the junction device 60. A first thermal load 49a is coupled to the evaporator 24c and the evaporator 24c is configured to extract heat from the first load 49a. A second thermal load 49b is also coupled to the evaporator 24c and the evaporator 24c is similarly configured to extract heat from the second load 49b.

The evaporator 24c has a first inlet that is coupled to the outlet of the junction device 60 and a first outlet that is coupled to the inlet 26a of the liquid separator 26. The evaporator 24c has a second inlet that is coupled to the outlet of the pump 70 and has a second outlet that is coupled to the inlet of the junction device 60. The second outlet 26c (liquid side outlet) of the liquid separator 26 is coupled to the inlet of the pump 70. Conduits 27a-27m couple the various aforementioned items, as shown.

Figure 8D:
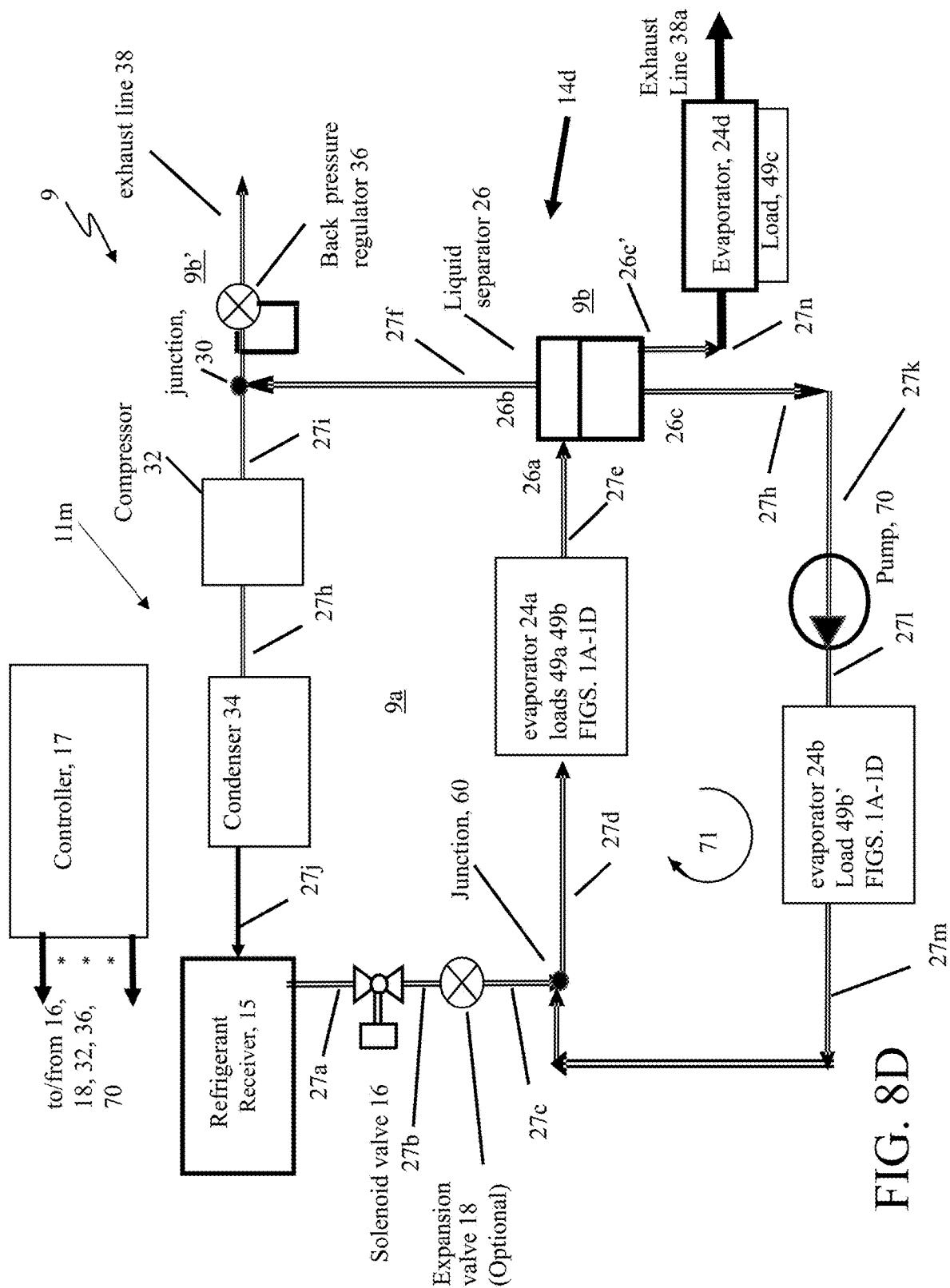

In this embodiment, the single evaporator 27c is attached downstream from and upstream of the junction 60 and requires a single evaporator in comparison with the configuration of FIG. 8D having the two evaporators 24a, 24b.

Referring now to FIG. 8D, the TMS 9 includes an OCRSP 14d and a second open circuit portion 9b' are integrated with the CCRS 9a to form an OCRSCCRS 11m.

OCRSP 14d includes the receiver 15, optional solenoid control valve 16, optional expansion valve device 18, a pump 70, a liquid separator 26', and a compressor 32 coupled to a condenser 34, as discussed above. The OCRSP 14d also includes the evaporators 24a, 24b (or can be a single evaporator as in FIG. 8C).

In this embodiment, the liquid separator 26' is configured to have a second, liquid side outlet 26c' the other inlet and outlets not referenced). Alternatively, such a function could be provided with another junction device, not shown. The second outlet 26c' diverts a portion of the liquid exiting the liquid separator 26' into a third evaporator 24d that is in thermal contact with a load 49c. The third evaporator 24d extracts heat from the load 49c and exhausts vapor from a second vapor exhaust line 38a. Exhaust lines 38, 38a can be combined or can be separated.

An operating advantage of the OCRSP 14f is that by placing evaporators 24a, 24b at both the outlet and the second inlet of the junction device 60, it is possible to run the evaporators 24a, 24b with changing refrigerant rates through the junction device 60 to change at different temperatures or change recirculating rates. By using the evaporators 24a, 24b, the configuration reduces vapor quality at the outlet of the evaporator 24b and thus increases circulation rate, as the pump 70 would be 'pumping' less vapor and more liquid. That is, with OCRSP 14d the evaporator 24b is downstream from the pump 70 and better refrigerant distribution could be provided with this component configuration since liquid refrigerant enters the evaporator 24b rather than a liquid/vapor stream as could be for the evaporator 24a.

In addition, some heat loads that may be cooled by an evaporator in the superheated phase region, at the same time do not need to actively control superheat. The OCRSP 14f employs the additional evaporator circuit 24d to cool heat loads in two-phase and superheated regions. The exhaust lines 38, 38a may or may not be combined. The third evaporator 24d can be fed a portion of the liquid refrigerant and operate in superheated region without the need for active superheat control.

Figure 8E:
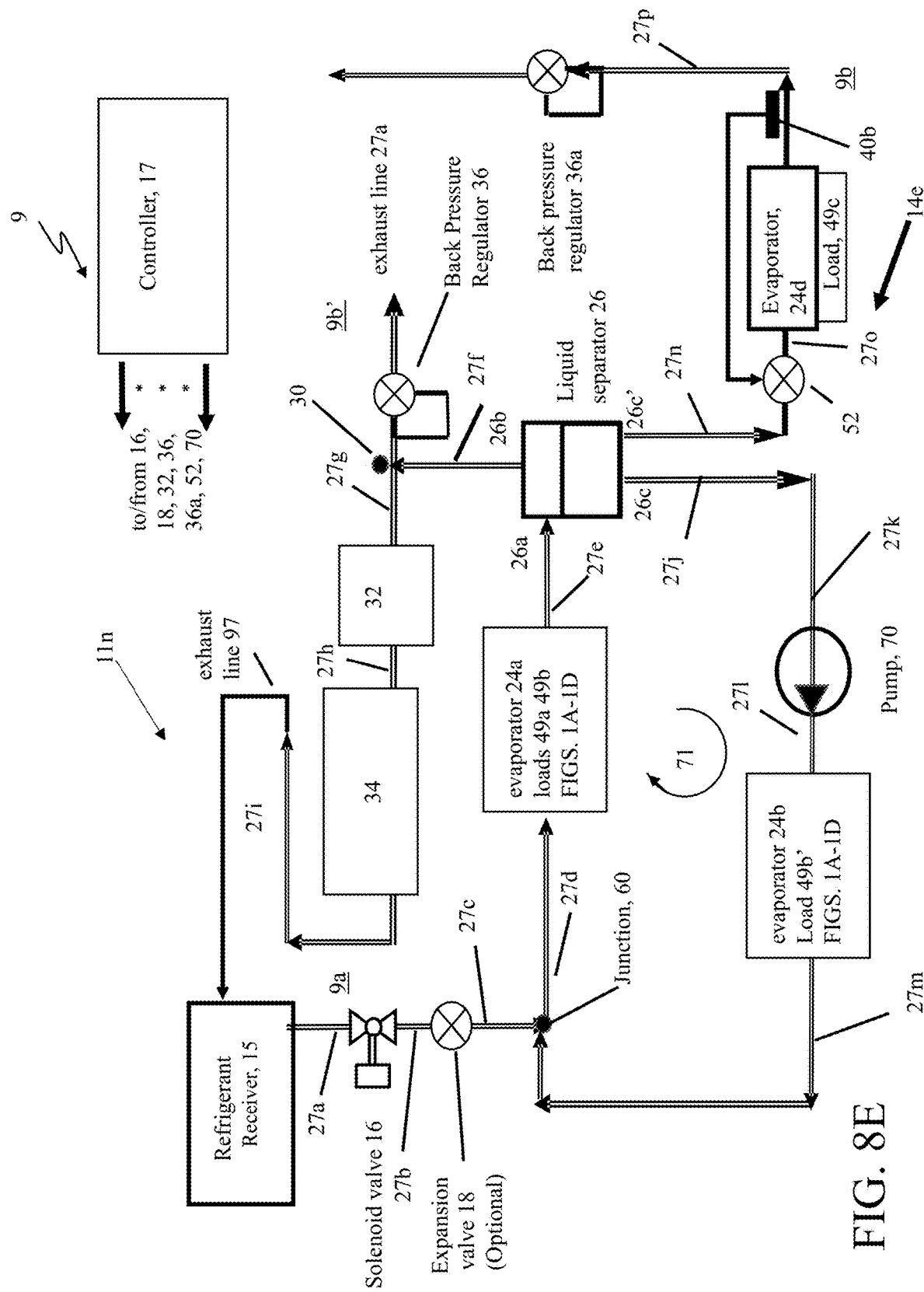

Referring now to FIG. 8E, the TMS 9 includes an OCRSP 14e and a second OCRS 9b' that are integrated with the CCRS 9a to form an OCRSCCRS 11n. OCRSP 14e includes the receiver 15, an optional solenoid control valve 16, optional expansion valve device 18, pump 70, and the liquid separator 26'. The OCRSP 14e also includes the compressor 32 coupled to the condenser 34 that feeds the input to the receiver 15.

As with FIG. 8D, the OCRSP 14e also includes the evaporators 24a, 24b (or can be a single evaporator as in FIG. 8C). In this embodiment, the OCRSP 14e also has a liquid separator 26' that is configured to have the second outlet as discussed above. The second outlet diverts a portion of the liquid exiting the liquid separator 26' into the third evaporator 24d that is in thermal contact with load 49c, which extracts heat from the load and exhausts vapor from a second vapor exhaust line 38a, via a second back-pressure regulator 36a. Conduits 27a-27l couple the various aforementioned items, as shown.

OCRSP 14e also includes a sensor device 40b and the second expansion device 52. The sensor 40 disposed proximate to the outlet of the evaporator 24d to provide a measurement of superheat, and indirectly, vapor quality. For example, sensor 40 is a combination of temperature and pressure sensors that measures the refrigerant fluid superheat downstream from the heat load and transmits the measurements to the controller 17. The controller 17 adjusts the expansion valve device 52 based on the measured superheat relative to a superheat set point value. By doing so, controller 17 indirectly adjusts the vapor quality of the refrigerant fluid emerging from evaporator 24d. The evaporators 24a, 24b operate in two phase (liquid/gas) and the third evaporator 24d operates in superheated region with controlled superheat. OCRSP 14e includes the controllable expansion device 52 that has a control port that is fed from the sensor 40 or controller 17 and provides a mechanism to measure and control superheat.

FIG. 9A shows an alternative location for the junction device 60 having one of the inlets and the outlet interposed between solenoid valve 16 and expansion valve device 18 having its other inlet coupled to the outlet of the evaporator 24.

FIG. 9B shows another alternative location for the junction device 60 having one of the inlets and the outlet interposed between the outlet of the expansion valve device 18 and the evaporator 24 (FIG. 2) or liquid separator 26 (FIG. 3) and having its other inlet coupled to the outlet of the evaporator 24.

Any of the configurations discussed in FIGS. 8A to 8E can have the junction device 60 placed in the various locations shown in FIGS. 9A or 9B. If both of the optional solenoid control valve 16 and optional expansion valve device 18 are not included, then all of the locations for the junction device 60 are, in essence, the same provided that there are no other intervening functional devices between the outlet of the receiver 15 and the inlet of the junction device 60.

Refrigerants and Considerations for Choosing Configurations

A variety of different refrigerant fluids can be used in thermal management system 9. Depending on the application for both open circuit refrigeration system operation and closed circuit refrigeration system operation, emissions regulations and operating environments may limit the types of refrigerant fluids that can be used.

For example, in certain embodiments, the refrigerant fluid can be ammonia having very large latent heat; after passing through the cooling circuit, the ammonia refrigerant vapor in the open circuit operation can be disposed of by incineration, by chemical treatment (i.e., neutralization), and/or by direct venting to the atmosphere. In certain embodiments, the refrigerant fluid can be an ammonia-based mixture that includes ammonia and one or more other substances. For example, mixtures can include one or more additives that facilitate ammonia absorption or ammonia burning.

More generally, any fluid can be used as a refrigerant in the open circuit refrigeration systems disclosed herein, provided that the fluid is suitable for cooling heat loads 49a-49b (e.g., the fluid boils at an appropriate temperature) and, in embodiments where the refrigerant fluid is exhausted directly to the environment, regulations and other safety and operating considerations do not inhibit such discharge.

One example of refrigerant is ammonia. Ammonia under standard conditions of pressure and temperature is in a liquid or two-phase state. Thus, the receiver 15 typically will store ammonia at a saturated pressure corresponding to the surrounding temperature. The pressure in the receiver 15 storing ammonia will change during operation. The use of the control device 18 can stabilize pressure in the receiver 15 during operation, by adjusting the control device 18 (e.g., automatically or by controller 17) based on a measurement of the evaporation pressure ($p_e$) of the refrigerant fluid and/or a measurement of the evaporation temperature of the refrigerant fluid.

Controller 17 can adjust control device 18 based on measurements of one or more of the following system parameter values: the pressure drop ($p_r$-$p_e$) across first control device 18, the pressure drop across evaporator 24, the refrigerant fluid pressure in receiver 15 ($p_r$), the vapor quality of the refrigerant fluid emerging from evaporator 24 (or at another location in the system), the superheat value of the refrigerant fluid in the system, the evaporation pressure ($p_e$) of the refrigerant fluid, and the evaporation temperature of the refrigerant fluid.

To adjust control device 18 based on a particular value of a measured system parameter value, controller 17 compares the measured value to a set point value (or threshold value) for the system parameter, as will be discussed below.

A variety of different refrigerant fluids can be used in any of the OCRSP configurations. For open circuit refrigeration systems in general, emissions regulations and operating environments may limit the types of refrigerant fluids that can be used. For example, in certain embodiments, the refrigerant fluid can be ammonia having very large latent heat; after passing through the cooling circuit, vaporized ammonia that is captured at the vapor port of the liquid separator can be disposed of by incineration, by chemical treatment (i.e., neutralization), and/or by direct venting to the atmosphere. Any liquid captured in the liquid separator is recycled back into the OCRSP (either directly or indirectly).

Since liquid refrigerant temperature is sensitive to ambient temperature, the density of liquid refrigerant changes even though the pressure in the receiver 15 remains the same. Also, the liquid refrigerant temperature impacts the vapor quality at the evaporator inlet. Therefore, the refrigerant mass and volume flow rates change and the control devices 13 and 19 can be used.

FIG. 4 above depicted a configuration for the liquid separator 26, (implemented as a coalescing liquid separator or a flash drum for example) having ports 28a-28c coupled to conduits.

Figure 12:
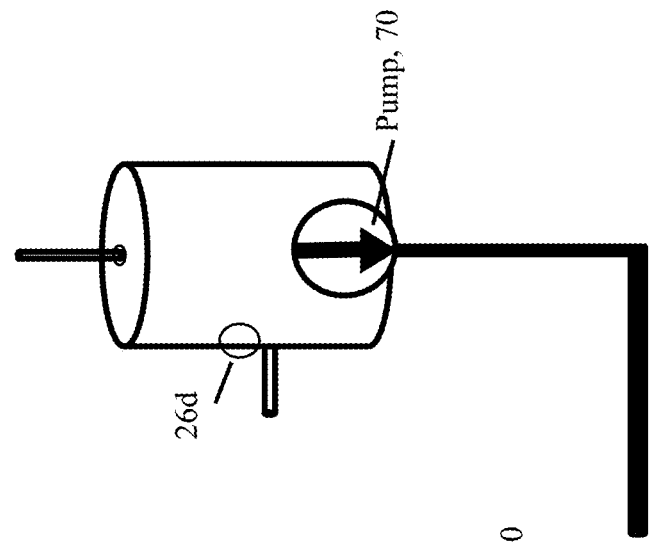
FIGS. 10-12 are diagrams of liquid separator configurations.
Figure 11:
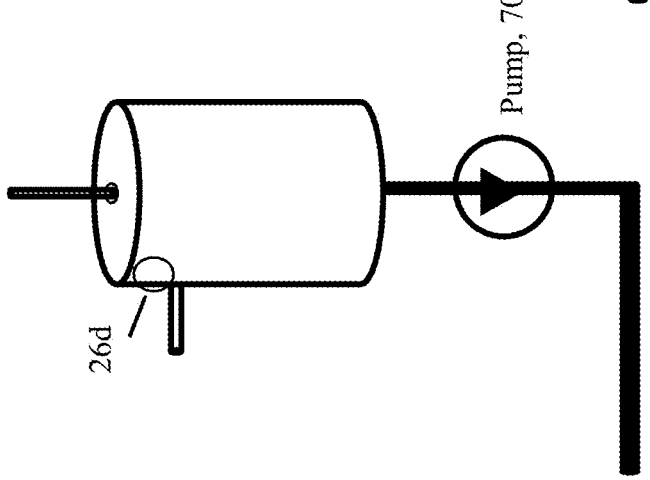
Figure 10:
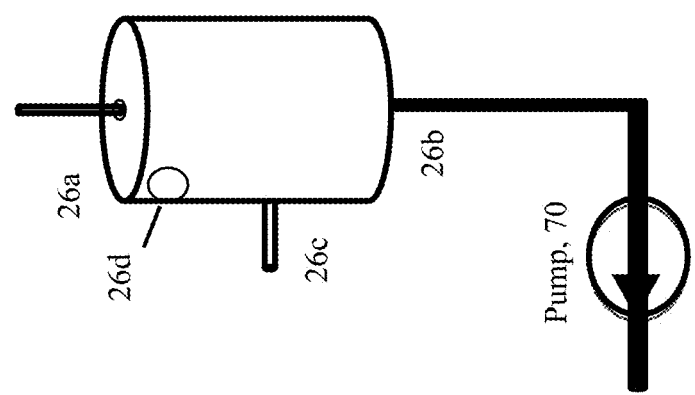

FIGS. 10-12 depict alternative configurations of the liquid separator 26 (implemented as a flash drum for example), which has ports 26a-26c, especially useful for the open circuit refrigeration system with pump (OCRSP) configurations.

In FIG. 10, the pump 70 is located distal from the liquid side port 26c. This configuration potentially presents the possibility of cavitation. To minimize the possibility of cavitation one of the configurations of FIG. 11 or 12 can be used.

In FIG. 11, the pump 70 is located distal from the liquid side outlet port 26c, but the height at which the inlet 26a is located is higher than that of FIG. 10. This would result in an increase in liquid pressure at the liquid side outlet 26c of the liquid separator 26 and concomitant therewith an increase in liquid pressure at the inlet of the pump 70. Increasing the pressure at the inlet to the pump 70 should minimize possibility of cavitation.

Another strategy is presented in FIG. 12, where the pump 70 is located proximate to or indeed, as shown, inside of the liquid side outlet 26c. In addition, although not shown, the height at which the inlet is located can be adjusted to that of FIG. 11, rather than the height of as shown in FIG. 12. This would result in an increase in liquid pressure at the inlet of the pump 70 further minimizing the possibility of cavitation.

Another alternative strategy that can be used for any of the configurations depicted involves the use of a sensor 26d that produces a signal that is a measure of the height of a column of liquid in the liquid separator. The signal is sent to the controller 17 that will be used to start the pump 70, once a sufficient height of liquid is contained by the liquid separator 26.

Another alternative strategy that can be used for any of the configurations depicted involves the use of a heat exchanger. The heat exchanger is an evaporator, which brings in thermal contact two refrigerant streams. In the above systems, a first of the streams is the liquid stream leaving the liquid separator 26. A second stream is the liquid refrigerant expanded to a pressure lower than the evaporator pressure in the evaporator 24 and evaporating the related evaporating temperature lower than the liquid temperature at the liquid separator exit. Thus, the liquid from the liquid separator 26 exit is subcooled rejecting thermal energy to the second side of the heat exchanger. The second side absorbs the rejected thermal energy due to evaporating and superheating of the second refrigerant stream.

Various combinations of the sensors can be used to measure thermodynamic properties of the TMS 9 that are used to adjust the control devices or pumps discussed above and which signals are processed by the controller 17. Connections (wired or wireless) are provided between each of the sensors and controller 17. In many embodiments, system includes only certain combinations of the sensors (e.g., one, two, three, or four of the sensors) to provide suitable control signals for the control devices.

Figure 13:
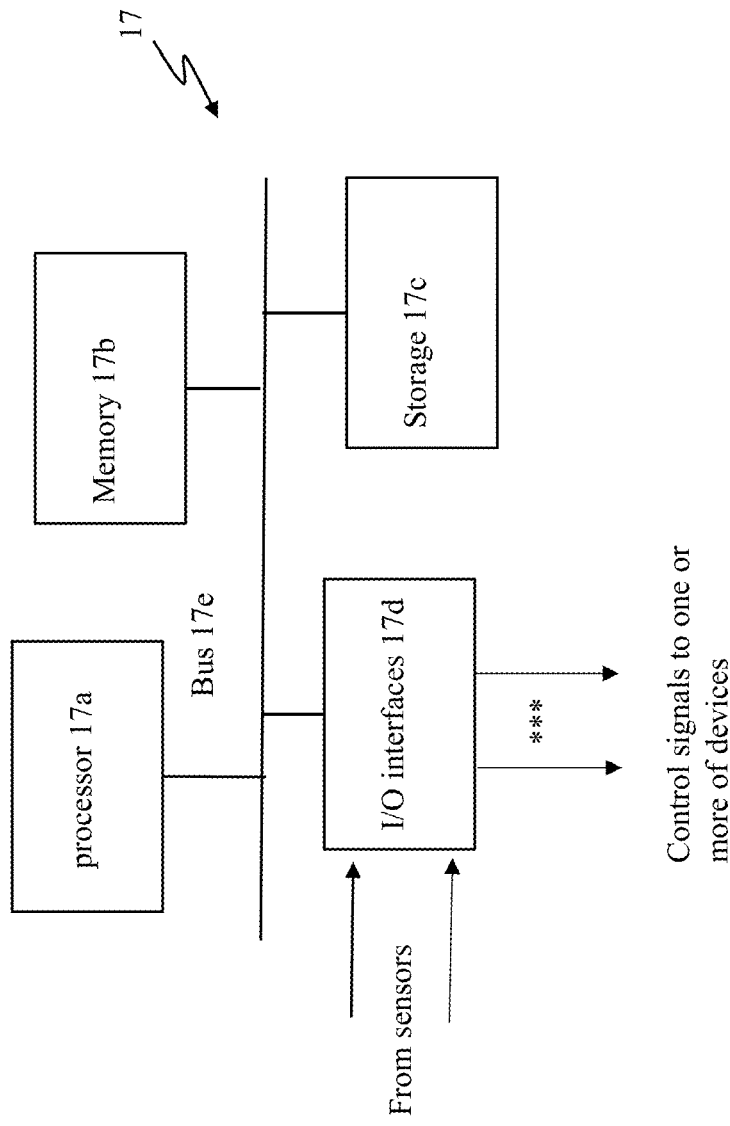
FIG. 13 is a block diagram of a controller.

FIG. 13 shows the controller 17 that includes a processor 17a, memory 17b, storage 17c, and I/O interfaces 17d, all of which are connected/coupled together via a bus 17e. Any two of the optional devices, as pressure sensors, upstream and downstream from a control device, can be configured to measure information about a pressure differential $p_r$-$p_e$ across the respective control device and to transmit electronic signals corresponding to the measured pressure from which a pressure difference information can be generated by the controller 17. Other sensors such as flow sensors and temperature sensors can be used as well. In certain embodiments, sensors can be replaced by a single pressure differential sensor, a first end of which is connected adjacent to an inlet and a second end of which is connected adjacent to an outlet of a device to which differential pressure is to be measured, such as the evaporator. The pressure differential sensor measures and transmits information about the refrigerant fluid pressure drop across the device, e.g., the evaporator 24.

Temperature sensors can be positioned adjacent to an inlet or an outlet of e.g., the evaporator 24 or between the inlet and the outlet. Such a temperature sensor measures temperature information for the refrigerant fluid within evaporator 24 (which represents the evaporating temperature) and transmits an electronic signal corresponding to the measured information. A temperature sensor can be attached to heat loads 49a, 49b, which measures temperature information for the load and transmits an electronic signal corresponding to the measured information. An optional temperature sensor can be adjacent to the outlet of evaporator 24 that measures and transmits information about the temperature of the refrigerant fluid as it emerges from evaporator 24.

In certain embodiments, the systems disclosed herein are configured to determine superheat information for the refrigerant fluid based on temperature and pressure information for the refrigerant fluid measured by any of the sensors disclosed herein. The superheat of the refrigerant vapor refers to the difference between the temperature of the refrigerant fluid vapor at a measurement point in the system 9 and the saturated vapor temperature of the refrigerant fluid defined by the refrigerant pressure at the measurement point in the thermal management system 9.

To determine the superheat associated with the refrigerant fluid, the system controller 17 (as described) receives information about the refrigerant fluid vapor pressure after emerging from a heat exchanger downstream from evaporator 24, and uses calibration information, a lookup table, a mathematical relationship, or other information to determine the saturated vapor temperature for the refrigerant fluid from the pressure information. The controller 17 also receives information about the actual temperature of the refrigerant fluid, and then calculates the superheat associated with the refrigerant fluid as the difference between the actual temperature of the refrigerant fluid and the saturated vapor temperature for the refrigerant fluid.

The foregoing temperature sensors can be implemented in a variety of ways in TMS 9. As one example, thermocouples and thermistors can function as temperature sensors in TMS 9. Examples of suitable commercially available temperature sensors for use in TMS 9 include, but are not limited to, the 88000 series thermocouple surface probes (available from OMEGA Engineering Inc., Norwalk, Conn.).

TMS 9 can include a vapor quality sensor that measures vapor quality of the refrigerant fluid emerging from evaporator 24. Typically, such a sensor is implemented as a capacitive sensor that measures a difference in capacitance between the liquid and vapor phases of the refrigerant fluid. The capacitance information can be used to directly determine the vapor quality of the refrigerant fluid (e.g., by system controller 17). Alternatively, sensor can determine the vapor quality directly based on the differential capacitance measurements and transmit an electronic signal that includes information about the refrigerant fluid vapor quality. Examples of commercially available vapor quality sensors that can be used in TMS 9 include, but are not limited to, HBX sensors (available from HB Products, Hasselager, Denmark).

It should generally understood that the systems disclosed herein can include a variety of combinations of the various sensors described above, and controller 17 can receive measurement information periodically or aperiodically from any of the various sensors. Moreover, it should be understood any of the sensors described can operate autonomously, measuring information and transmitting the information to controller 17 (or directly to the first and/or second control device) or, alternatively, any of the sensors described above can measure information when activated by controller 17 via a suitable control signal, and measure and transmit information to controller 17 in response to the activating control signal.

To adjust a control device on a particular value of a measured system parameter value, controller 17 compares the measured value to a set point value (or threshold value) for the system parameter. Certain set point values represent a maximum allowable value of a system parameter, and if the measured value is equal to the set point value (or differs from the set point value by 10% or less (e.g., 5% or less, 3% or less, 1% or less) of the set point value), controller 17 adjusts a respective control device to modify the operating state of the TMS 9. Certain set point values represent a minimum allowable value of a system parameter, and if the measured value is equal to the set point value (or differs from the set point value by 10% or less (e.g., 5% or less, 3% or less, 1% or less) of the set point value), controller 17 adjusts the respective control device to modify the operating state of the system 9, and increase the system parameter value. The controller 17 executes algorithms that use the measured sensor value(s) to provide signals that cause the various control devices to adjust refrigerant flow rates, etc.

Some set point values represent "target" values of system parameters. For such system parameters, if the measured parameter value differs from the set point value by 1% or more (e.g., 3% or more, 5% or more, 10% or more, 20% or more), controller 17 adjusts the respective control device to adjust the operating state of the system, so that the system parameter value more closely matches the set point value.

Optional pressure sensors are configured to measure information about the pressure differential $p_r$-$p_e$ across a control device and to transmit an electronic signal corresponding to the measured pressure difference information. Two sensors can effectively measure $p_r$, $p_e$. In certain embodiments two sensors can be replaced by a single pressure differential sensor. Where a pressure differential sensor is used, a first end of the sensor is connected upstream of a first control device and a second end of the sensor is connected downstream from first control device.

System also includes optional pressure sensors positioned at the inlet and outlet, respectively, of evaporator 24. A sensor measures and transmits information about the refrigerant fluid pressure upstream from evaporator 24, and a sensor measure and transmit information about the refrigerant fluid pressure downstream from evaporator 24. This information can be used (e.g., by a system controller) to calculate the refrigerant fluid pressure drop across evaporator 24. As above, in certain embodiments, sensors can be replaced by a single pressure differential sensor to measure and transmit the refrigerant fluid pressure drop across evaporator 24.

To measure the evaporating pressure ($p_e$) a sensor can be optionally positioned between the inlet and outlet of evaporator 24, i.e., internal to evaporator 24. In such a configuration, the sensor can provide a direct a direct measurement of the evaporating pressure.

To measure refrigerant fluid pressure at other locations within system, sensor can also optionally be positioned, for example, in-line along a conduit. Pressure sensors at each of these locations can be used to provide information about the refrigerant fluid pressure downstream from evaporator 24, or the pressure drop across evaporator 24.

It should be appreciated that, in the foregoing discussion, any one or various combinations of two sensors discussed in connection with system can correspond to the first measurement device connected to control device 18, and any one or various combination of two sensors can correspond to the second measurement device. In general, as discussed previously, the first measurement device provides information corresponding to a first thermodynamic quantity to the first control device, and the second measurement device provides information corresponding to a second thermodynamic quantity to the second control device, where the first and second thermodynamic quantities are different, and therefore allow the first and second control device to independently control two different system properties (e.g., the vapor quality of the refrigerant fluid and the heat load temperature, respectively).

In some embodiments, one or more of the sensors shown in system are connected directly to control device 18. The first and second control device can be configured to adaptively respond directly to the transmitted signals from the sensors, thereby providing for automatic adjustment of the system's operating parameters. In certain embodiments, the first and/or second control device can include processing hardware and/or software components that receive transmitted signals from the sensors, optionally perform computational operations, and activate elements of the first and/or second control device to adjust the control device in response to the sensor signals.

In addition, controller 17 is optionally connected to control device 18. In embodiments where control device 18 is implemented as a device controllable via an electrical control signal, controller 17 is configured to transmit suitable control signals to the first and/or second control device to adjust the configuration of these components. In particular, controller 17 is configured to adjust control device 18 to control the vapor quality of the refrigerant fluid in the system 9.

During operation of the system 9, controller 17 typically receives measurement signals from one or more sensors. The measurements can be received periodically (e.g., at consistent, recurring intervals) or irregularly, depending upon the nature of the measurements and the manner in which the measurement information is used by controller 17. In some embodiments, certain measurements are performed by controller 17 after particular conditions—such as a measured parameter value exceeding or falling below an associated set point value—are reached.

By way of example, Table 1 summarizes various examples of combinations of types of information (e.g., system properties and thermodynamic quantities) that can be measured by the sensors of system and transmitted to controller 17, to allow controller 17 to generate and transmit suitable control signals to control device 18 and/or other control devices. The types of information shown in Table 1 can generally be measured using any suitable device (including combination of one or more of the sensors discussed herein) to provide measurement information to controller 17.

TABLE 1

| | | Measurement Information Used to Adjust First Control Device | | | | | | | |
|---|---|---|---|---|---|---|---|---|---|
| | | FCM Press Drop | Evap Press Drop | Rec Pres | VQ | SH | Evap VQ | Evap P/T | HL Temp |
| Measurement Information Used to Adjust Second Control Device | FCM Press Drop | | | | | | | x | x |
| | Evap Press Drop | | | | | | | x | x |
| | Rec Press | | | | | | | x | x |
| | VQ | | | | | | | x | x |
| | SH | | | | | | | x | x |
| | Evap VQ | | | | | | | x | x |
| | Evap P/T | x | x | x | x | x | x | | x |
| | HL Temp | x | x | x | x | x | x | x | |

FCM Press Drop = refrigerant fluid pressure drop across first control device
Evap Press Drop = refrigerant fluid pressure drop across evaporator
Rec Press = refrigerant fluid pressure in receiver
VQ = vapor quality of refrigerant fluid
SH = superheat of refrigerant fluid
Evap VQ = vapor quality of refrigerant fluid at evaporator outlet
Evap P/T = evaporation pressure or temperature
HL Temp = heat load temperature For example, in some embodiments, control device 18 is adjusted (e.g., automatically or by controller 17) based on a measurement of the evaporation pressure ($p_e$) of the refrigerant fluid and/or a measurement of the evaporation temperature of the refrigerant fluid. In certain embodiments, control device 18 is adjusted (e.g., automatically or by controller 17) based on a measurement of the temperature of thermal load 49b.

To adjust any of the control devices 18, 52, 52a, the compressor 32, or the pump 70 based on a particular value of a measured system parameter value, controller 17 compares the measured value to a set point value (or threshold value) for the system parameter. Certain set point values represent a maximum allowable value of a system parameter, and if the measured value is equal to the set point value (or differs from the set point value by 10% or less (e.g., 5% or less, 3% or less, 1% or less) of the set point value), controller 17 adjusts control device 18 to adjust the operating state of the system, and reduce the system parameter value.

Certain set point values represent a minimum allowable value of a system parameter, and if the measured value is equal to the set point value (or differs from the set point value by 10% or less (e.g., 5% or less, 3% or less, 1% or less) of the set point value), controller 17 adjusts control device 18, etc. to adjust the operating state of the system, and increase the system parameter value.

Some set point values represent "target" values of system parameters. For such system parameters, if the measured parameter value differs from the set point value by 1% or more (e.g., 3% or more, 5% or more, 10% or more, 20% or more), controller 17 adjusts control device 18, etc. to adjust the operating state of the system, so that the system parameter value more closely matches the set point value.

Measured parameter values are assessed in relative terms based on set point values (i.e., as a percentage of set point values). Alternatively, in some embodiments, measured parameter values can be accessed in absolute terms. For example, if a measured system parameter value differs from a set point value by more than a certain amount (e.g., by 1 degree C. or more, 2 degrees C. or more, 3 degrees C. or more, 4 degrees C. or more, 5 degrees C. or more), then controller 17 adjusts control device 18, etc. to adjust the operating state of the system, so that the measured system parameter value more closely matches the set point value.

In the foregoing examples, measured parameter values are assessed in relative terms based on set point values (i.e., as a percentage of set point values). Alternatively, in some embodiments, measured parameter values can be in absolute terms. For example, if a measured system parameter value differs from a set point value by more than a certain amount (e.g., by 1 degree C. or more, 2 degrees C. or more, 3 degrees C. or more, 4 degrees C. or more, 5 degrees C. or more), then controller 17 adjusts control device 18, etc. to adjust the operating state of the system, so that the measured system parameter value more closely matches the set point value.

In certain embodiments, refrigerant fluid emerging from evaporator 24 can be used to cool one or more additional thermal loads. In addition, systems can include a second thermal load connected to a heat exchanger. A variety of mechanical connections can be used to attach second thermal load to heat exchanger, including (but not limited to) brazing, clamping, welding, and any of the other connection types discussed herein.

Heat exchanger includes one or more flow channels through which high vapor quality refrigerant fluid flows after leaving evaporator 24. During operation, as the refrigerant fluid vapor phases through the flow channels, it absorbs heat energy from second thermal load, cooling second thermal load. Typically, second thermal load is not as sensitive as thermal load 49b to fluctuations in temperature. Accordingly, while second thermal load is generally not cooled as precisely relative to a particular temperature set point value as thermal load 49b, the refrigerant fluid vapor provides cooling that adequately matches the temperature constraints for second thermal load.

In general, the systems disclosed herein can include more than one (e.g., two or more, three or more, four or more, five or more, or even more) thermal loads in addition to thermal loads depicted. Each of the additional thermal loads can have an associated heat exchanger; in some embodiments, multiple additional thermal loads are connected to a single heat exchanger, and in certain embodiments, each additional thermal load has its own heat exchanger. Moreover, each of the additional thermal loads can be cooled by the superheated refrigerant fluid vapor after a heat exchanger attached to the second load or cooled by the high vapor quality fluid stream that emerges from evaporator 24.

Although evaporator 24 and heat exchanger are implemented as separate components, in certain embodiments, these components can be integrated to form a single heat exchanger, with thermal load and second thermal load both connected to the single heat exchanger. The refrigerant fluid vapor that is discharged from the evaporator portion of the single heat exchanger is used to cool second thermal load, which is connected to a second portion of the single heat exchanger.

The vapor quality of the refrigerant fluid after passing through evaporator 24 can be controlled either directly or indirectly with respect to a vapor quality set point by controller 17. In some embodiments, the system includes a vapor quality sensor that provides a direct measurement of vapor quality, which is transmitted to controller 17. Controller 17 adjusts control device depending on configuration to control the vapor quality relative to the vapor quality set point value.

In certain embodiments, the system includes a sensor that measures superheat and indirectly, vapor quality. For example, a combination of temperature and pressure sensors measure the refrigerant fluid superheat downstream from a second heat load, and transmit the measurements to controller 17. Controller 17 adjusts control device according to the configuration based on the measured superheat relative to a superheat set point value. By doing so, controller 17 indirectly adjusts the vapor quality of the refrigerant fluid emerging from evaporator 24.

As the two refrigerant fluid streams flow in opposite directions within recuperative heat exchanger, heat is transferred from the refrigerant fluid emerging from evaporator 24 to the refrigerant fluid entering control device 18. Heat transfer between the refrigerant fluid streams can have a number of advantages. For example, recuperative heat transfer can increase the refrigeration effect in evaporator 24, reducing the refrigerant mass transfer rate implemented to handle the heat load presented by high heat load 49b. Further, by reducing the refrigerant mass transfer rate through evaporator 24, the amount of refrigerant used to provide cooling duty in a given period of time is reduced. As a result, for a given initial quantity of refrigerant fluid introduced into receiver 15, the operational time over which the system can operate before an additional refrigerant fluid charge is needed can be extended. Alternatively, for the system to effectively cool high heat load 49b for a given period of time, a smaller initial charge of refrigerant fluid into receiver 15 can be used.

Because the liquid and vapor phases of the two-phase mixture of refrigerant fluid generated following expansion of the refrigerant fluid in control device 18 can be used for different cooling applications, in some embodiments, the system can include a phase separator to separate the liquid and vapor phases into separate refrigerant streams that follow different flow paths within the TMS 9.

Further, eliminating (or nearly eliminating) the refrigerant vapor from the refrigerant fluid stream entering evaporator 24 can help to reduce the cross-section of the evaporator and improve film boiling in the refrigerant channels. In film boiling, the liquid phase (in the form of a film) is physically separated from the walls of the refrigerant channels by a layer of refrigerant vapor, leading to poor thermal contact and heat transfer between the refrigerant liquid and the refrigerant channels. Reducing film boiling improves the efficiency of heat transfer and the cooling performance of evaporator 24.

In addition, by eliminating (or nearly eliminating) the refrigerant vapor from the refrigerant fluid stream entering evaporator 24, distribution of the liquid refrigerant within the channels of evaporator 24 can be made easier. In certain embodiments, vapor present in the refrigerant channels of evaporator 24 can oppose the flow of liquid refrigerant into the channels. Diverting the vapor phase of the refrigerant fluid before the fluid enters evaporator 24 can help to reduce this difficulty.

In addition to phase separator, or as an alternative to phase separator, in some embodiments the systems disclosed herein can include a phase separator downstream from evaporator 24. Such a configuration can be used when the refrigerant fluid emerging from evaporator is not entirely in the vapor phase, and still includes liquid refrigerant fluid.

VIII. Additional Features of Thermal Management Systems

The foregoing examples of thermal management systems illustrate a number of features that can be included in any of the systems within the scope of this disclosure. In addition, a variety of other features can be present in such systems.

In certain embodiments, refrigerant fluid that is discharged from evaporator 24 and passes through conduit can be directly discharged as exhaust from conduit without further treatment. Direct discharge provides a convenient and straightforward method for handling spent refrigerant, and has the added advantage that over time, the overall weight of the system is reduced due to the loss of refrigerant fluid. For systems that are mounted to small vehicles or are otherwise mobile, this reduction in weight can be important.

In some embodiments, however, refrigerant fluid vapor can be further processed before it is discharged. Further processing may be desirable depending upon the nature of the refrigerant fluid that is used, as direct discharge of unprocessed refrigerant fluid vapor may be hazardous to humans and/or may be deleterious to mechanical and/or electronic devices in the vicinity of the TMS 9. For example, the unprocessed refrigerant fluid vapor may be flammable or toxic, or may corrode metallic device components. In situations such as these, additional processing of the refrigerant fluid vapor may be desirable.

In general, refrigerant processing apparatus can be implemented in various ways. In some embodiments, refrigerant processing apparatus is a chemical scrubber or water-based scrubber. Within apparatus, the refrigerant fluid is exposed to one or more chemical agents that treat the refrigerant fluid vapor to reduce its deleterious properties. For example, where the refrigerant fluid vapor is basic (e.g., ammonia) or acidic, the refrigerant fluid vapor can be exposed to one or more chemical agents that neutralize the vapor and yield a less basic or acidic product that can be collected for disposal or discharged from apparatus.

As another example, where the refrigerant fluid vapor is highly chemically reactive, the refrigerant fluid vapor can be exposed to one or more chemical agents that oxidize, reduce, or otherwise react with the refrigerant fluid vapor to yield a less reactive product that can be collected for disposal or discharged from apparatus.

In certain embodiments, refrigerant processing apparatus can be implemented as an adsorptive sink for the refrigerant fluid. Apparatus can include, for example, an adsorbent material bed that binds particles of the refrigerant fluid vapor, trapping the refrigerant fluid within apparatus and preventing discharge. The adsorptive process can sequester the refrigerant fluid particles within the adsorbent material bed, which can then be removed from apparatus and sent for disposal.

In some embodiments, where the refrigerant fluid is flammable, refrigerant processing apparatus can be implemented as an incinerator. Incoming refrigerant fluid vapor can be mixed with oxygen or another oxidizing agent and ignited to combust the refrigerant fluid. The combustion products can be discharged from the incinerator or collected (e.g., via an adsorbent material bed) for later disposal.

As an alternative, refrigerant processing apparatus can also be implemented as a combustor of an engine or another mechanical power-generating device. Refrigerant fluid vapor from conduit can be mixed with oxygen, for example, and combusted in a piston-based engine or turbine to perform mechanical work, such as providing drive power for a vehicle or driving a generator to produce electricity. In certain embodiments, the generated electricity can be used to provide electrical operating power for one or more devices, including high heat load 49*b*. For example, high heat load 49*b* can include one or more electronic devices that are powered, at least in part, by electrical energy generated from combustion of refrigerant fluid vapor in refrigerant processing apparatus.

The thermal management systems disclosed herein can optionally include a phase separator upstream from the refrigerant processing apparatus.

Particularly during start-up of the systems disclosed herein, liquid refrigerant may be present in conduits because the systems generally begin operation before high heat load 49*b* and/or heat loads 49*a*, 49*b* are activated. Accordingly, phase separator functions in a manner similar to phase separators to separate liquid refrigerant fluid from refrigerant vapor. The separated liquid refrigerant fluid can be re-directed to another portion of the system, or retained within phase separator until it is converted to refrigerant vapor. By using phase separator, liquid refrigerant fluid can be prevented from entering refrigerant processing apparatus.

IX. Integration with Power Systems

In some embodiments, the refrigeration systems disclosed herein can be combined with power systems to form integrated power and thermal systems, in which certain components of the integrated systems are responsible for providing refrigeration functions and certain components of the integrated systems are responsible for generating operating power.

Figure 14:
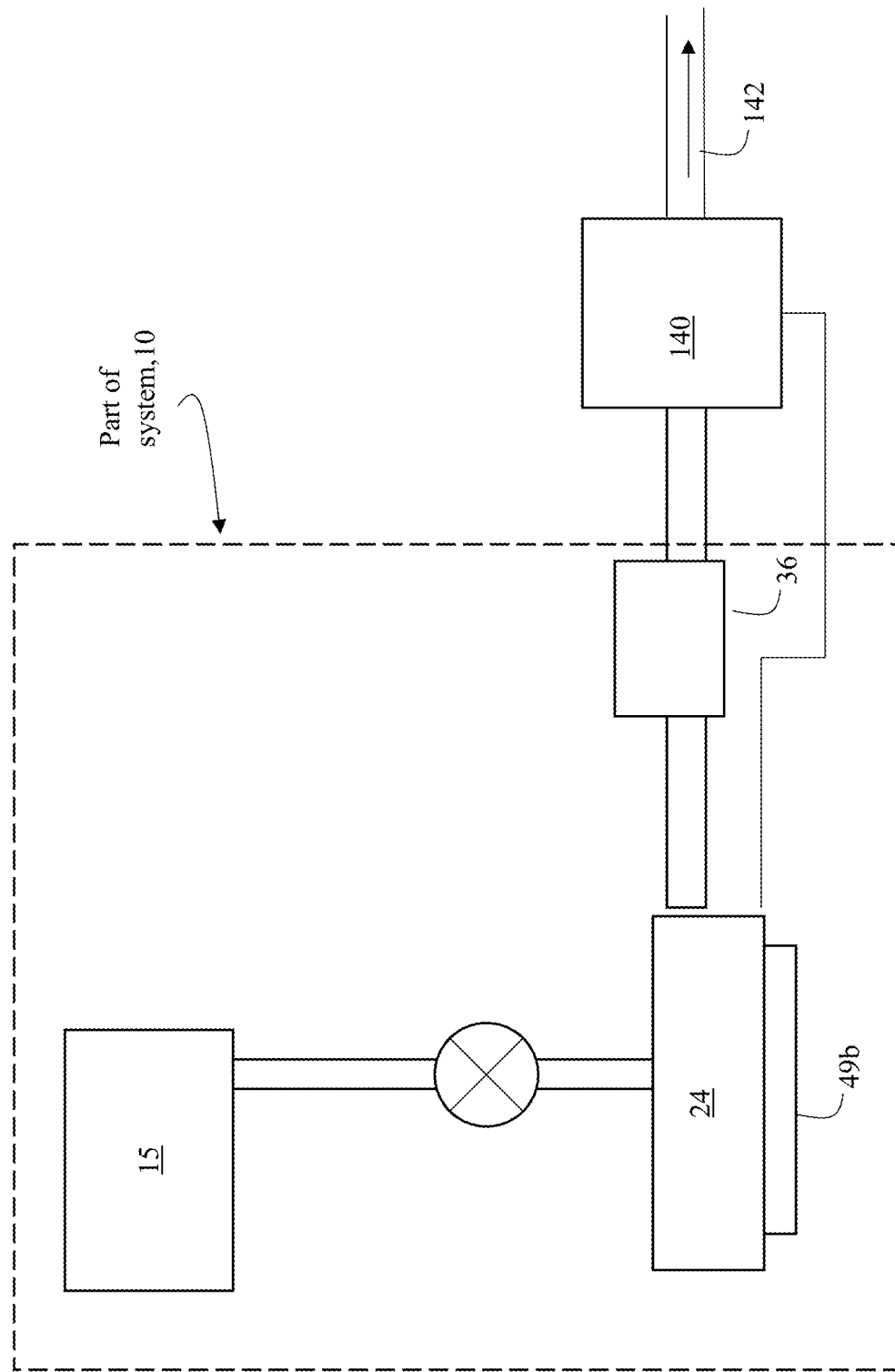
FIG. 14 is a schematic diagram of an example of a thermal management system that includes a power generation apparatus.

FIG. 14 shows an integrated power and TMS 9 that includes many features similar to those discussed above (e.g., see FIG. 1) with only aspects of the open circuit portion 9*b* shown. In addition, TMS 9 includes an engine 140 with an inlet that receives the stream of waste refrigerant fluid. Engine 140 can combust the waste refrigerant fluid directly, or alternatively can mix the waste refrigerant fluid with one or more additives (such as oxidizers) before combustion. Where ammonia is used as the refrigerant fluid in system 9, suitable engine configurations for both direct ammonia combustion as fuel, and combustion of ammonia mixed with other additives, can be implemented. In general, combustion of ammonia improves the efficiency of power generation by the engine.

The energy released from combustion of the refrigerant fluid can be used by engine 140 to generate electrical power, e.g., by using the energy to drive a generator. The electrical power can be delivered via electrical connection to thermal load 49*b* to provide operating power for the load. For example, in certain embodiments, thermal load 49*b* includes one or more electrical circuits and/or electronic devices, and engine 140 provides operating power to the circuits/devices via combustion of refrigerant fluid. Byproducts 142 of the combustion process can be discharged from engine 140 via exhaust conduit, as shown in FIG. 14.

Various types of engines and power-generating devices can be implemented as engine 140 in TMS 9. In some embodiments, for example, engine 140 is a conventional four-cycle piston-based engine, and the waste refrigerant fluid is introduced into a combustor of the engine. In certain embodiments, engine 140 is a gas turbine engine, and the waste refrigerant fluid is introduced via the engine inlet to the afterburner of the gas turbine engine. As discussed above, in some embodiments, TMS 9 can include phase separator (not shown) positioned upstream from engine 140. Phase separator functions to prevent liquid refrigerant fluid from entering engine 140, which may reduce the efficiency of electrical power generation by engine 140.

X. Start-Up and Temporary Operation

In certain embodiments, the thermal management systems disclosed herein operate differently at, and immediately following, system start-up, compared to the manner in which the systems operate after an extended running period. Upon start-up, the compressor 32 and a device (usually a fan) moving a cooling fluid (usually ambient air) through the condenser 34 are powered. The compressor 32 discharges compressed refrigerant into the condenser 34. The refrigerant is condensed and subcooled in the condenser 34. Liquid refrigerant fluid enters receiver 15 at a pressure and temperature generated by operation of the compressor 32 and condenser 34.

XI. Integration with Directed Energy Systems

The thermal management systems and methods disclosed herein can be implemented as part of (or in conjunction with) directed energy systems such as high energy laser systems. Due to their nature, directed energy systems typically present a number of cooling challenges, including certain heat loads for which temperatures are maintained during operation within a relatively narrow range.

Figure 15:
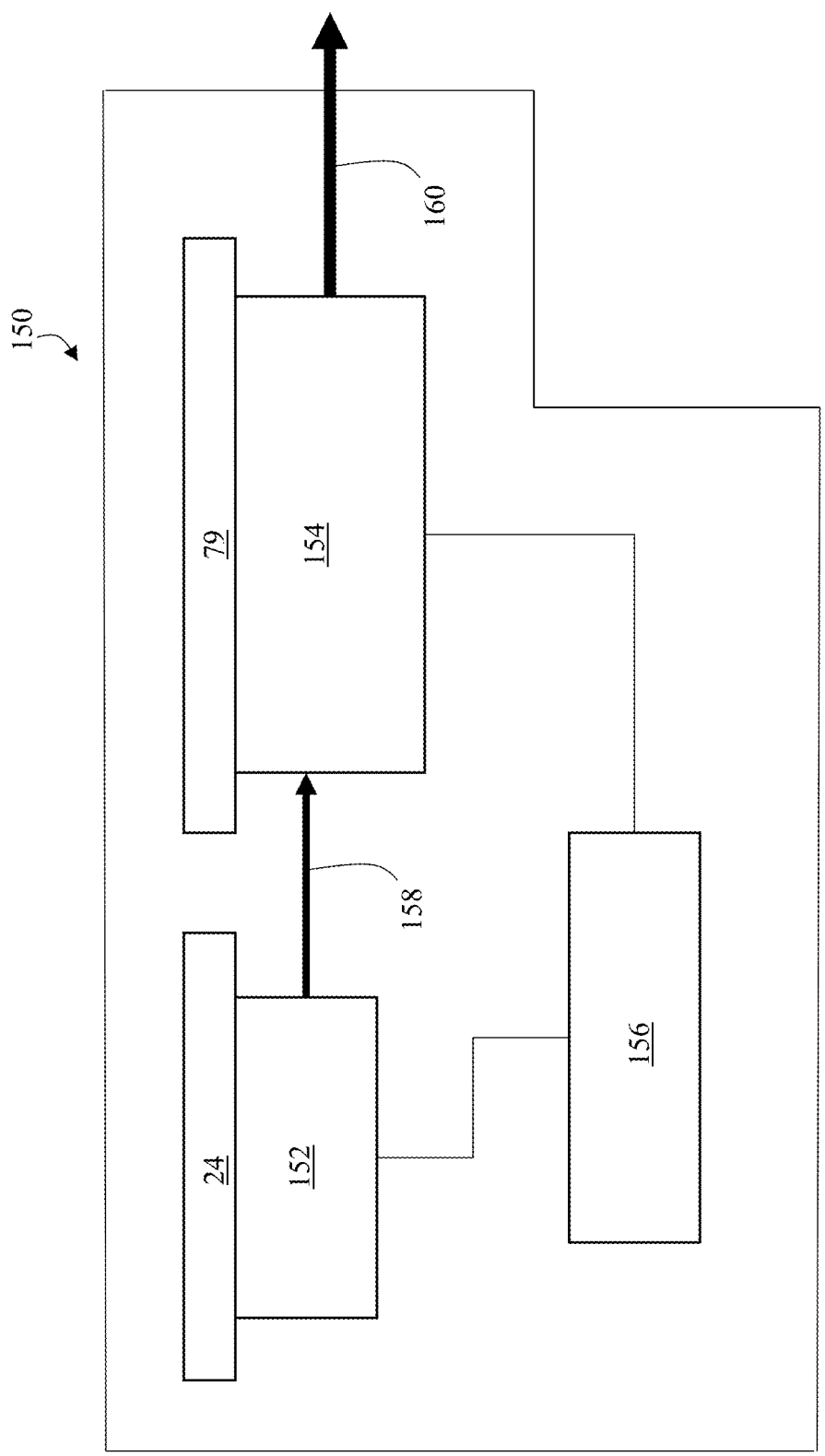
FIG. 15 is a schematic diagram of an example of directed energy system that includes a thermal management system.

FIG. 15 shows one example of a directed energy system, specifically, a high energy laser system 150. System 150 includes a bank of one or more laser diodes 152 and an amplifier 154 connected to a power source 156. During operation, laser diodes 152 generate an output radiation beam 158 that is amplified by amplifier 154, and directed as output beam 160 onto a target. Generation of high energy output beams can result in the production of significant quantities of heat. Certain laser diodes, however, are relatively temperature sensitive, and the operating temperature of such diodes is regulated within a relatively narrow range of temperatures to ensure efficient operation and avoid thermal damage. Amplifiers are also temperature-sensitively, although typically less sensitive than diodes.

To regulate the temperatures of various components of directed energy systems such as diodes 152 and amplifier 154, such systems can include components and features of the thermal management systems disclosed herein. In FIG. 15, evaporator 24 (FIGS. 1, etc.) is coupled to diodes 152, while heat exchanger 79 is coupled to amplifier 154. The other components of the thermal management systems disclosed herein are not shown for clarity. However, it should be understood that any of the features and components discussed above can optionally be included in directed energy systems. Diodes 152, due to their temperature-sensitive nature, effectively function as high heat load 49b in system 150, while amplifier 154 functions as low heat load 49a.

System 150 is one example of a directed energy system that can include various features and components of the thermal management systems and methods described herein. However, it should be appreciated that the thermal management systems and methods are general in nature, and can be applied to cool a variety of different heat loads under a wide range of operating conditions.

XII. Hardware and Software Implementations

Controller 17 can generally be implemented as any one of a variety of different electrical or electronic computing or processing devices, and can perform any combination of the various steps discussed above to control various components of the disclosed thermal management systems.

Controller 17 can generally, and optionally, include any one or more of a processor (or multiple processors), a memory, a storage device, and input/output device. Some or all of these components can be interconnected using a system bus. The processor is capable of processing instructions for execution. In some embodiments, the processor is a single-threaded processor. In certain embodiments, the processor is a multi-threaded processor. Typically, the processor is capable of processing instructions stored in the memory or on the storage device to display graphical information for a user interface on the input/output device, and to execute the various monitoring and control functions discussed above. Suitable processors for the systems disclosed herein include both general and special purpose microprocessors, and the sole processor or one of multiple processors of any kind of computer or computing device.

The memory stores information within the system, and can be a computer-readable medium, such as a volatile or non-volatile memory. The storage device can be capable of providing mass storage for the controller 17. In general, the storage device can include any non-transitory tangible media configured to store computer readable instructions. For example, the storage device can include a computer-readable medium and associated components, including: magnetic disks, such as internal hard disks and removable disks; magneto-optical disks; and optical disks. Storage devices suitable for tangibly embodying computer program instructions and data include all forms of non-volatile memory including by way of example, semiconductor memory devices, such as EPROM, EEPROM, and flash memory devices; magnetic disks such as internal hard disks and removable disks; magneto-optical disks; and CD-ROM and DVD-ROM disks. Processors and memory units of the systems disclosed herein can be supplemented by, or incorporated in, ASICs (application-specific integrated circuits).

The input/output device provides input/output operations for controller 17, and can include a keyboard and/or pointing device. In some embodiments, the input/output device includes a display unit for displaying graphical user interfaces and system related information.

The features described herein, including components for performing various measurement, monitoring, control, and communication functions, can be implemented in digital electronic circuitry, or in computer hardware, firmware, or in combinations of them. Methods steps can be implemented in a computer program product tangibly embodied in an information carrier, e.g., in a machine-readable storage device, for execution by a programmable processor (e.g., of controller 17), and features can be performed by a programmable processor executing such a program of instructions to perform any of the steps and functions described above. Computer programs suitable for execution by one or more system processors include a set of instructions that can be used directly or indirectly, to cause a processor or other computing device executing the instructions to perform certain activities, including the various steps discussed above.

Computer programs suitable for use with the systems and methods disclosed herein can be written in any form of programming language, including compiled or interpreted languages, and can be deployed in any form, including as stand-alone programs or as modules, components, subroutines, or other units suitable for use in a computing environment.

In addition to one or more processors and/or computing components implemented as part of controller 17, the systems disclosed herein can include additional processors and/or computing components within any of the control device (e.g., control device 18) and any of the sensors discussed above. Processors and/or computing components of the control devices and sensors, and software programs and instructions that are executed by such processors and/or computing components, can generally have any of the features discussed above in connection with controller 17.

OTHER EMBODIMENTS

A number of embodiments have been described. Nevertheless, it will be understood that various modifications may be made without departing from the spirit and scope of the disclosure. Accordingly, other embodiments are within the scope of the following claims.

What is claimed is:

1. A thermal management system comprising:
a refrigerant receiver having a refrigerant receiver outlet and a refrigerant receiver inlet, with the refrigerant receiver configured to store a refrigerant fluid;
an ejector having a primary flow inlet coupled to the refrigerant receiver outlet, the ejector configured to receive the refrigerant fluid, and with the ejector further having a secondary flow inlet and an outlet;
a liquid separator having an inlet, a vapor side outlet, and a liquid side outlet;
an evaporator arrangement configured to extract heat from at least one heat load that is proximate or in thermal contact with the evaporator arrangement, with the evaporator arrangement coupled to the ejector and the liquid separator;
a closed-circuit refrigeration system having a closed-circuit fluid path including the refrigerant receiver, the evaporator arrangement, and the liquid separator, the closed-circuit refrigeration system configured to receive refrigerant fluid from the refrigerant receiver; and
an open-circuit refrigeration system having:
an open-circuit fluid path that includes the receiver, the evaporator arrangement, and the liquid separator, with the open-circuit refrigeration system configured to receive refrigerant fluid from the refrigerant receiver;
a back-pressure regulator having an inlet coupled to the vapor side outlet of the liquid separator and an inlet of a compressor of the closed-circuit refrigeration system; and
an exhaust line coupled to the back-pressure regulator, with refrigerant vapor from the exhaust line not returning to the refrigerant receiver during cooling of the at least one heat load by the evaporator arrangement.

2. The system of claim 1, wherein the evaporator arrangement is coupled between the secondary flow inlet of the ejector and the liquid side outlet of the liquid separator.

3. The system of claim 1, wherein the evaporator arrangement is coupled between the outlet of the ejector and the inlet of the liquid separator.

4. The system of claim 1, wherein the evaporator arrangement has a first evaporator, with the first evaporator coupled between the secondary flow inlet of the ejector and the liquid side outlet of the liquid separator, and the system further comprises:
a second evaporator coupled between the outlet of the ejector and the inlet of the liquid separator.

5. The system of claim 1, wherein the evaporator arrangement is coupled downstream from and upstream of the ejector.

6. The system of claim 4, further comprising:
a control device configured to measure a superheat condition at an outlet of the first evaporator.

7. The system of claim 4, further comprising:
an expansion valve device having an expansion valve device inlet coupled to the liquid side outlet of the liquid separator and an expansion device outlet, with the expansion valve device configured to control a flow of refrigerant liquid from the liquid side outlet to regulate a superheat at an outlet of the first evaporator;
a junction device having a first port coupled to the expansion valve device outlet, a second port coupled to an inlet of the first evaporator, and a third port; and
a third evaporator having an inlet and an outlet, with the inlet coupled to the third port of the junction device.

8. The system of claim 7, wherein the expansion valve device is a first expansion valve device, and the system further comprises:
a second expansion valve device coupled between the third port of the junction device and the inlet of the third evaporator.

9. The system of claim 7, further comprising a sensor device that senses temperature to provide a measure of a superheat at the outlet of the third evaporator to control the second expansion valve device to regulate superheat at the outlet of the third evaporator.

10. The system of claim 1, further comprising:
an expansion valve device configured to control a flow of the refrigerant liquid from the refrigerant receiver through the primary flow inlet of the ejector.

11. The system of claim 10, wherein the expansion valve device controls vapor quality of the refrigerant fluid emerging from the evaporator arrangement by regulating mass flow rate of the refrigerant fluid through the expansion valve device.

12. The system of claim 1, wherein the at least one heat load comprises:
a first heat load coupled to or proximate to the evaporator arrangement from which heat is removed by the closed-circuit refrigerant system; and
a second heat load coupled to or proximate to the evaporator arrangement from which heat is removed by the open-circuit refrigerant system.

13. The system of claim 12, wherein the second heat load is a high heat load, relative to the first heat load, which high heat load has one or more characteristics of being a high heat flux load or a highly temperature sensitive load or is operative for short periods of time, relative to one or more corresponding characteristics of the first heat load.

14. The system of claim 1, wherein the refrigerant is ammonia.

15. The system of claim 1, wherein the open-circuit refrigeration system is configured to operate with a controlled vapor quality at an outlet of the evaporator arrangement, where vapor quality is a ratio of mass of vapor to mass of liquid plus mass of vapor.

16. The system of claim 15, wherein the vapor quality is in a range of 0.5 to 1.0.

17. The system of claim 15, wherein the vapor quality is substantially 1.0.

18. The system of claim 10, further comprising:
a controller device that receives sensor signals from the thermal management system and is configured to generate control signals to control one or more of the back-pressure regulator or the expansion valve device.

19. The system of claim 10, wherein the compressor comprises an outlet, and the inlet of the compressor is coupled to the vapor side outlet of the liquid separator and the exhaust line, and the closed-circuit refrigeration system further comprises:

a condenser coupled to the outlet of the compressor, with refrigerant from the condenser returning to the refrigerant receiver.

20. A thermal management method comprising:
transporting a refrigerant fluid from a refrigerant receiver that stores refrigerant fluid, through a closed-circuit refrigeration system having a closed-circuit fluid path with the refrigerant receiver, through an ejector, an evaporator arrangement, and a liquid separator that are disposed in the closed fluid circuit path; and
upon a control signal being initiated:
transporting a portion of the refrigerant fluid from the refrigerant receiver through an open-circuit refrigeration system that has an open-circuit fluid path with the refrigerant receiver, the ejector, the evaporator arrangement, and the liquid separator, to an exhaust line, and out of the exhaust line to an ambient environment so that the portion of the refrigerant vapor is not returned to the closed-circuit fluid path;
during exhausting the portion of the refrigerant fluid out of the exhaust line, extracting heat from at least one heat load thermally contacting the evaporator arrangement, with the heat being transferred to another portion of the refrigerant fluid converting at least a portion of the another portion of the refrigerant fluid to a refrigerant vapor; and
after extracting heat, discharging the another portion of the refrigerant vapor from the exhaust line to the ambient environment so that the discharged another portion of the refrigerant vapor is not returned to the closed-circuit fluid path.

21. The thermal management method of claim 20, further comprising:
transporting a primary flow of the refrigerant fluid along the refrigerant fluid flow path that extends from the refrigerant receiver through a primary inlet of the ejector; and
transporting a secondary flow of the refrigerant fluid into a secondary inlet of the ejector within which the primary flow and secondary flow are mixed to provide a mixed flow.

22. The thermal management method of claim 21, further comprising:
transporting the mixed flow towards the liquid separator.

23. The thermal management method of claim 22, wherein transporting the mixed flow comprises:
transporting the mixed flow towards the liquid separator through the evaporator arrangement.

24. The thermal management method of claim 22, further comprising:
transporting refrigerant liquid received by the evaporator arrangement from a liquid side outlet of the liquid separator to the secondary inlet of the ejector.

25. The thermal management method of claim 23, wherein the evaporator arrangement is a first evaporator arrangement, the method further comprising:
transporting refrigerant liquid received by a second evaporator arrangement at the liquid side outlet of the liquid separator to the secondary inlet of the ejector.

26. The method of claim 20, wherein the closed-circuit refrigeration system is configured to cool a first heat load of the at least one heat load, and the open-circuit refrigeration system is configured to cool a second heat load of the at least one heat load on demand.

27. The method of claim 26, wherein the first heat load is a low heat flux load and the second heat load is a high flux heat load relative to the first heat flux load.

28. The method of claim 20, further comprising:
receiving a control signal by a back-pressure regulator that is coupled to the exhaust line.

29. The method of claim 20, wherein the refrigerant is ammonia.

30. A thermal management system, comprising:
a refrigerant receiver having a refrigerant receiver outlet and a refrigerant receiver inlet, with the refrigerant receiver configured to store a refrigerant fluid;
an ejector having a primary flow inlet coupled to the refrigerant receiver outlet, the ejector configured to receive the refrigerant fluid, and with the ejector further having a secondary flow inlet and an outlet;
a liquid separator having an inlet, a vapor side outlet, and a liquid side outlet;
an expansion valve device having an expansion valve device inlet coupled to the liquid side outlet of the liquid separator and an expansion device outlet;
a junction device having a first port coupled to the expansion valve device outlet and a third port;
an evaporator arrangement configured to extract heat from a heat load that is proximate or in contact with the evaporator arrangement, with the evaporator arrangement coupled to the ejector and the liquid separator, the evaporator arrangement comprising:
a first evaporator coupled between the secondary flow inlet of the ejector and the liquid side outlet of the liquid separator, with the expansion valve device configured to control a flow of refrigerant liquid from the liquid side outlet to regulate a superheat at an outlet of the first evaporator, and the junction device having a second port coupled to an inlet of the first evaporator;
a second evaporator coupled between the outlet of the ejector and the inlet of the liquid separator; and
a third evaporator having an inlet and an outlet, with the inlet coupled to the third port of the junction device;
a closed-circuit refrigeration system having a closed-circuit fluid path including the refrigerant receiver, the evaporator arrangement, and the liquid separator, the closed-circuit refrigeration system configured to receive refrigerant fluid from the refrigerant receiver; and
an open-circuit refrigeration system having an open-circuit fluid path that includes the receiver, the evaporator arrangement, and the liquid separator, with the open-circuit refrigeration system configured to receive refrigerant fluid from the refrigerant receiver.

31. The system of claim 30, wherein the expansion valve device is a first expansion valve device, and the system further comprises:
a second expansion valve device coupled between the third port of the junction device and the inlet of the third evaporator.

32. The system of claim 30, further comprising a sensor device that senses temperature to provide a measure of a superheat at the outlet of the third evaporator to control the second expansion valve device to regulate superheat at the outlet of the third evaporator.

33. The system of claim 30, wherein the open-circuit refrigeration system further comprises:
a back-pressure regulator having an inlet coupled to the vapor side outlet of the liquid separator; and an exhaust line coupled to the back-pressure regulator, with refrigerant vapor from the exhaust line not returning to the refrigerant receiver.

34. The system of claim 30, further comprising:
a control device configured to measure a superheat condition at an outlet of the first evaporator.

35. The system of claim 30, wherein the expansion valve device is configured to control a flow of the refrigerant liquid from the refrigerant receiver through the primary flow inlet of the ejector.

36. The system of claim 35, wherein the expansion valve device is configured to control vapor quality of the refrigerant fluid emerging from the evaporator arrangement by regulating mass flow rate of the refrigerant fluid through the expansion valve device.

37. The system of claim 30, further comprising:
a first heat load coupled to or proximate to the evaporator arrangement from which heat is removed by the closed-circuit refrigerant system; and
a second heat load coupled to or proximate to the evaporator arrangement from which heat is removed by the open-circuit refrigerant system.

38. The system of claim 37, wherein the second heat load is a high heat load, relative to the first heat load, which high heat load has one or more characteristics of being a high heat flux load or a highly temperature sensitive load or is operative for short periods of time, relative to one or more corresponding characteristics of the first heat load.

39. The system of claim 30, wherein the refrigerant is ammonia.

40. The system of claim 30, wherein the open-circuit refrigeration system is configured to operate with a controlled vapor quality at an outlet of the evaporator arrangement, where vapor quality is a ratio of mass of vapor to mass of liquid plus mass of vapor.

* * * * *